(12) United States Patent
Smith

(10) Patent No.: US 11,959,277 B1
(45) Date of Patent: *Apr. 16, 2024

(54) PRE-STRESSED SINUSOIDAL MEMBER IN ASSEMBLY AND APPLICATIONS

(71) Applicant: William E. Smith, Lebanon, IL (US)

(72) Inventor: William E. Smith, Lebanon, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 17/704,856

(22) Filed: Mar. 25, 2022

Related U.S. Application Data

(63) Continuation-in-part of application No. 16/259,653, filed on Jan. 28, 2019, now Pat. No. 11,608,632.

(51) Int. Cl.
*E04C 3/29* (2006.01)
*E04C 3/00* (2006.01)
*B82Y 30/00* (2011.01)

(52) U.S. Cl.
CPC .............. *E04C 3/29* (2013.01); *E04C 3/005* (2013.01); *B82Y 30/00* (2013.01)

(58) Field of Classification Search
CPC ............ E04C 3/29; E04C 3/005; B82Y 30/00
See application file for complete search history.

(56) References Cited

U.S. PATENT DOCUMENTS 3,739,542 A * 6/1973 Glatz .................... E21D 11/107
52/669
3,913,109 A 10/1975 Owen
3,948,291 A * 4/1976 Persson .................. B01D 29/13
138/108
3,982,361 A * 9/1976 Deutsch .................. E04H 15/60
52/222
4,226,067 A * 10/1980 Artzer ..................... E04C 2/044
29/446

(Continued)

FOREIGN PATENT DOCUMENTS

CN  1331957 A * 1/2002 ............... A61F 2/06
CN  1640505 A * 7/2005 ............ A61M 29/00

(Continued)

*Primary Examiner* — James M Ference
(74) *Attorney, Agent, or Firm* — Grace J. Fishel

(57) ABSTRACT

Sinusoidal shaped member units and support member units are parts that form pre-stressed assemblies having flexural properties. Sinusoidal shaped members are relaxed material members that have been elastically deformed. Support members maintain the elastically deformed state of the sinusoidal shaped members. The sinusoidal shaped members and support members are organized into pre-stressed curvilinear assemblies containing stored elastic potential energy that is equal to the work done by the forces that deformed their pre-stressed structure. The assemblies' sinusoidal shaped members and support members are adapted to use materials having exceptional mechanical properties and flexural strength. This includes nano-composites and/or shape memory alloys. The assemblies' pre-stressed state enhances its mechanical, electrical and structural performance. The size, number, density and possible geometric configurations of the sinusoidal shaped member units and support member units within an assembly/structure is vast. Products of this sinusoidal building system have mechanical and structural applications and can be manufactured and/or deployed.

19 Claims, 39 Drawing Sheets

(56) References Cited

U.S. PATENT DOCUMENTS

| | | | | |
|---|---|---|---|---|
| 4,247,089 A * | 1/1981 | Crosby | | A47C 7/30 5/247 |
| 4,285,180 A * | 8/1981 | Hinton | | E04B 1/6806 404/66 |
| 4,371,153 A * | 2/1983 | Krakauer | | A47C 7/30 267/105 |
| 4,633,566 A | 1/1987 | Coppa | | |
| 4,654,748 A * | 3/1987 | Rees | | A61N 1/14 361/220 |
| 4,662,011 A * | 5/1987 | Duvivier | | A47C 27/07 5/722 |
| 4,677,803 A | 7/1987 | Mikulas et al. | | |
| 5,058,345 A * | 10/1991 | Martinez | | B21F 27/128 29/432 |
| 5,977,932 A | 11/1999 | Robinson | | |
| 6,183,506 B1 * | 2/2001 | Penn | | A61F 2/915 623/1.15 |
| 6,341,504 B1 * | 1/2002 | Istook | | D04B 21/18 66/172 E |
| 7,694,486 B2 | 4/2010 | Murphy et al. | | |
| 7,802,759 B2 | 9/2010 | Ishikawa et al. | | |
| 8,540,224 B2 | 9/2013 | Guthrie | | |
| 8,813,455 B2 | 8/2014 | Merrifield | | |
| 8,986,809 B2 | 3/2015 | Gershenfeld et al. | | |
| 8,999,453 B2 | 4/2015 | Shah et al. | | |
| 9,492,105 B1 * | 11/2016 | Kayyali | | A61B 5/0535 |
| 9,873,368 B2 | 1/2018 | de Weerdt | | |
| 10,265,683 B2 | 4/2019 | Hart et al. | | |
| 10,711,452 B1 * | 7/2020 | Smith | | B64C 3/10 |
| 11,608,632 B2 * | 3/2023 | Smith | | E04C 2/20 |
| 2002/0144822 A1 * | 10/2002 | Hackworth | | E21B 17/04 166/242.6 |
| 2002/0193865 A1 * | 12/2002 | Radisch | | C22C 5/04 623/1.34 |
| 2003/0082455 A1 * | 5/2003 | Fujiwara | | H01M 4/73 29/2 |
| 2003/0120246 A1 * | 6/2003 | Franklin | | A61F 13/4942 604/385.27 |
| 2003/0167715 A1 * | 9/2003 | Messenger | | E04C 2/044 52/309.14 |
| 2003/0167716 A1 * | 9/2003 | Messenger | | E04C 2/044 52/309.12 |
| 2004/0065034 A1 * | 4/2004 | Messenger | | E04C 2/2885 52/309.11 |
| 2005/0115186 A1 | 6/2005 | Jensen et al. | | |
| 2005/0210819 A1 | 9/2005 | McGushion | | |
| 2005/0258572 A1 * | 11/2005 | Messenger | | E04C 2/049 264/228 |
| 2006/0124193 A1 * | 6/2006 | Orr | | D03D 15/56 139/421 |
| 2006/0144000 A1 * | 7/2006 | Patrick | | E04C 5/0645 52/334 |
| 2007/0119106 A1 * | 5/2007 | Sacks | | E04F 13/06 52/255 |
| 2007/0184265 A1 * | 8/2007 | Ranganathan | | D01D 5/20 428/375 |
| 2007/0219626 A1 * | 9/2007 | Rolando | | A61F 2/915 623/1.42 |
| 2009/0149943 A1 * | 6/2009 | Tower | | A61F 2/915 623/1.16 |
| 2012/0073884 A1 | 3/2012 | Guthrie | | |
| 2012/0076969 A1 * | 3/2012 | Ponomarev | | C04B 28/02 977/700 |
| 2012/0094060 A1 | 4/2012 | Gershenfeld et al. | | |
| 2012/0151868 A1 | 6/2012 | Kang et al. | | |
| 2013/0291476 A1 | 11/2013 | Broughton, Jr. et al. | | |
| 2013/0302172 A1 * | 11/2013 | Williams | | B29D 99/0007 156/60 |
| 2013/0322955 A1 | 12/2013 | Ma | | |
| 2014/0037873 A1 | 2/2014 | Cheung et al. | | |
| 2014/0059975 A1 * | 3/2014 | Wright, III | | B21D 11/15 264/177.17 |
| 2014/0232611 A1 | 8/2014 | Ochoa et al. | | |
| 2014/0302261 A1 | 10/2014 | Cheung et al. | | |
| 2015/0191909 A1 * | 7/2015 | Linares, III | | E04C 2/46 52/745.19 |
| 2017/0340316 A1 * | 11/2017 | Wood | | A61N 1/362 |
| 2018/0199635 A1 * | 7/2018 | Longinotti-Buitoni | | A41B 1/08 |
| 2018/0271393 A1 * | 9/2018 | Lee | | A61B 5/6833 |
| 2018/0311833 A1 | 11/2018 | Lipton et al. | | |
| 2019/0070027 A1 * | 3/2019 | Wang | | A61F 2/92 |
| 2019/0242110 A1 * | 8/2019 | Rimoli | | E04B 1/1903 |
| 2020/0240139 A1 * | 7/2020 | Smith | | B29C 70/446 |
| 2021/0331431 A1 * | 10/2021 | Smith | | B29C 65/48 |

FOREIGN PATENT DOCUMENTS

| | | | | |
|---|---|---|---|---|
| CN | 209285856 U | * | 8/2019 | |
| EP | 2482378 A1 | | 1/2012 | |
| GB | 2269408 A | * | 2/1994 | E04B 2/845 |
| JP | H08509899 A | * | 10/1996 | |
| WO | WO-2006005026 A2 | * | 1/2006 | A61F 2/06 |
| WO | WO-2018068056 A1 | * | 4/2018 | E04B 1/19 |

* cited by examiner

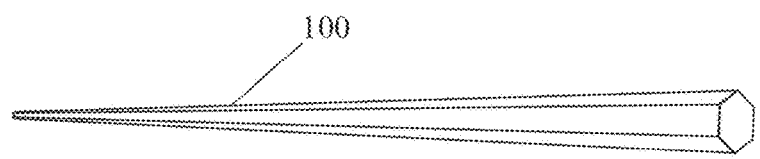
FIG. 2E
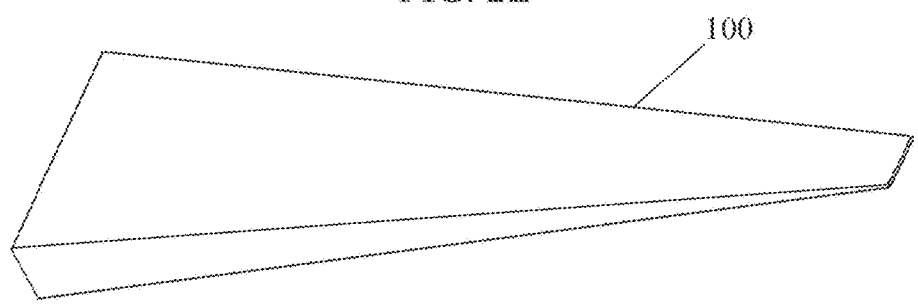
FIG. 2F
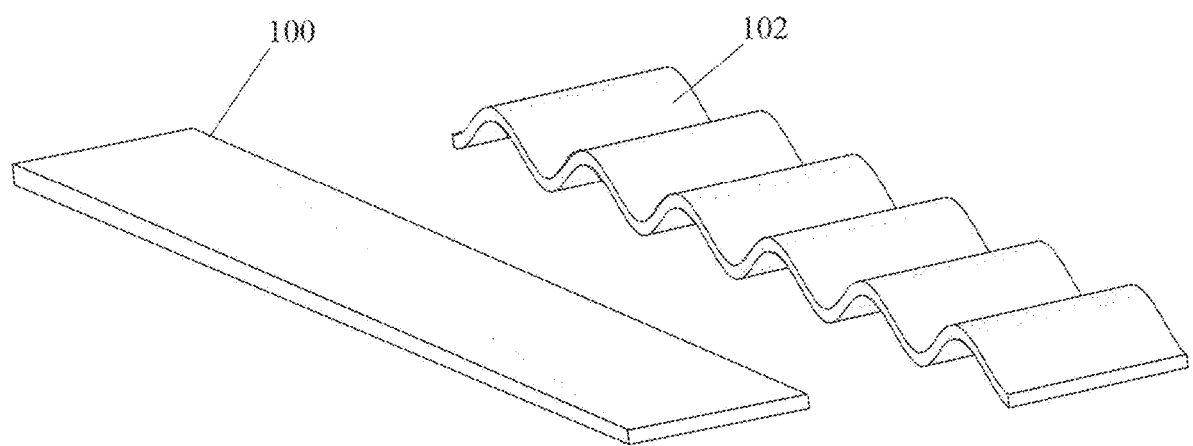
FIG. 3A
FIG. 3B

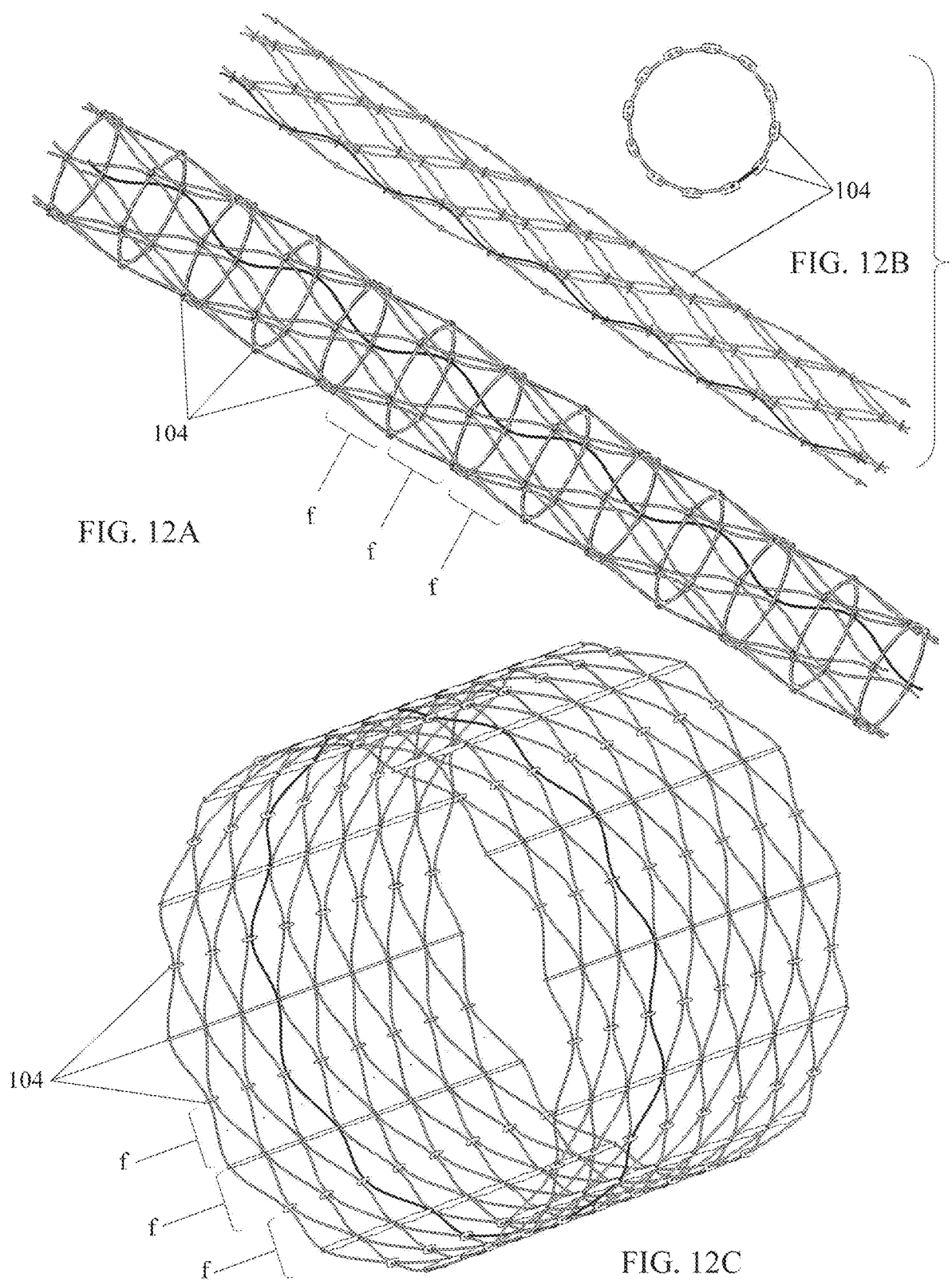

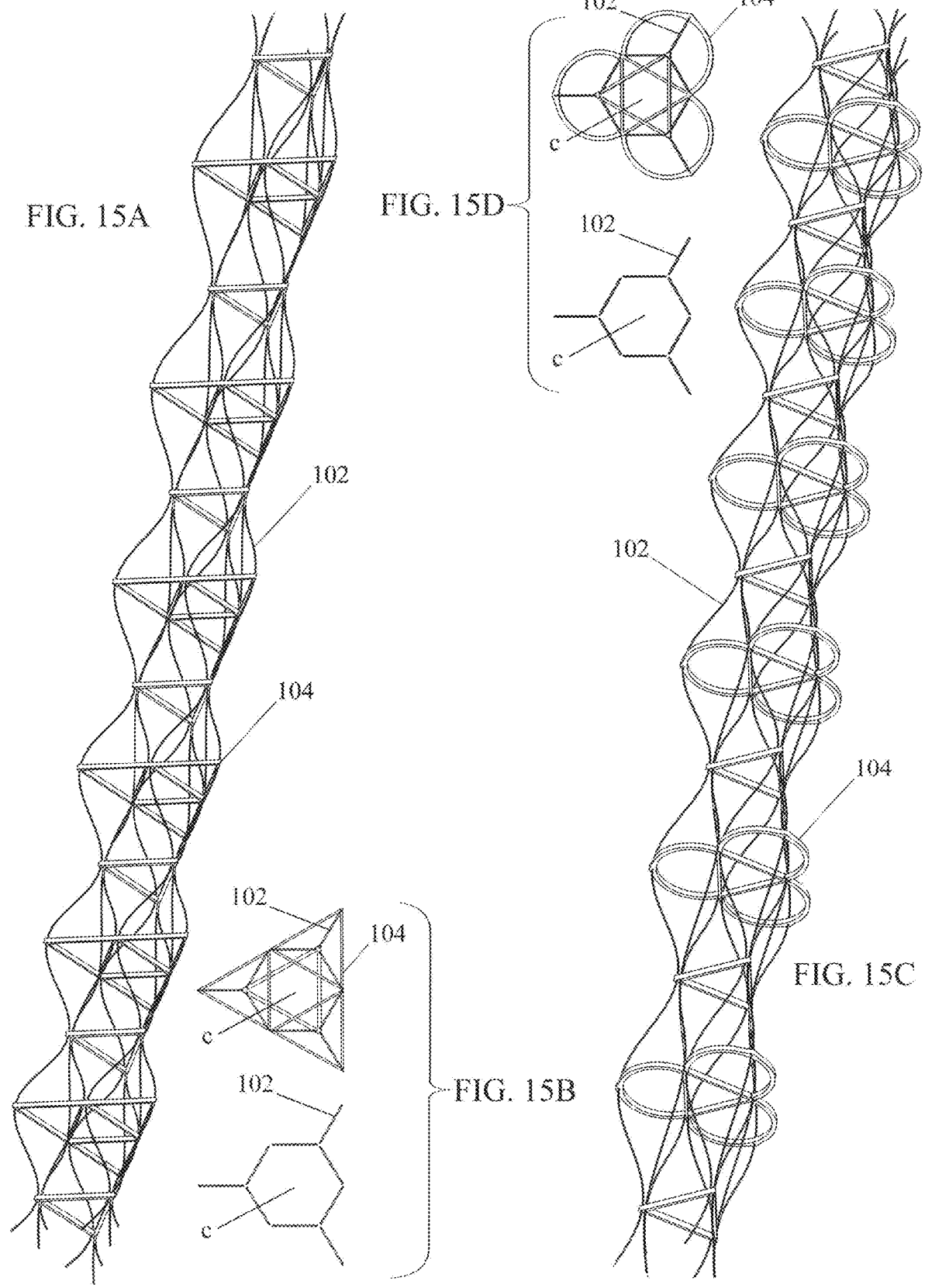

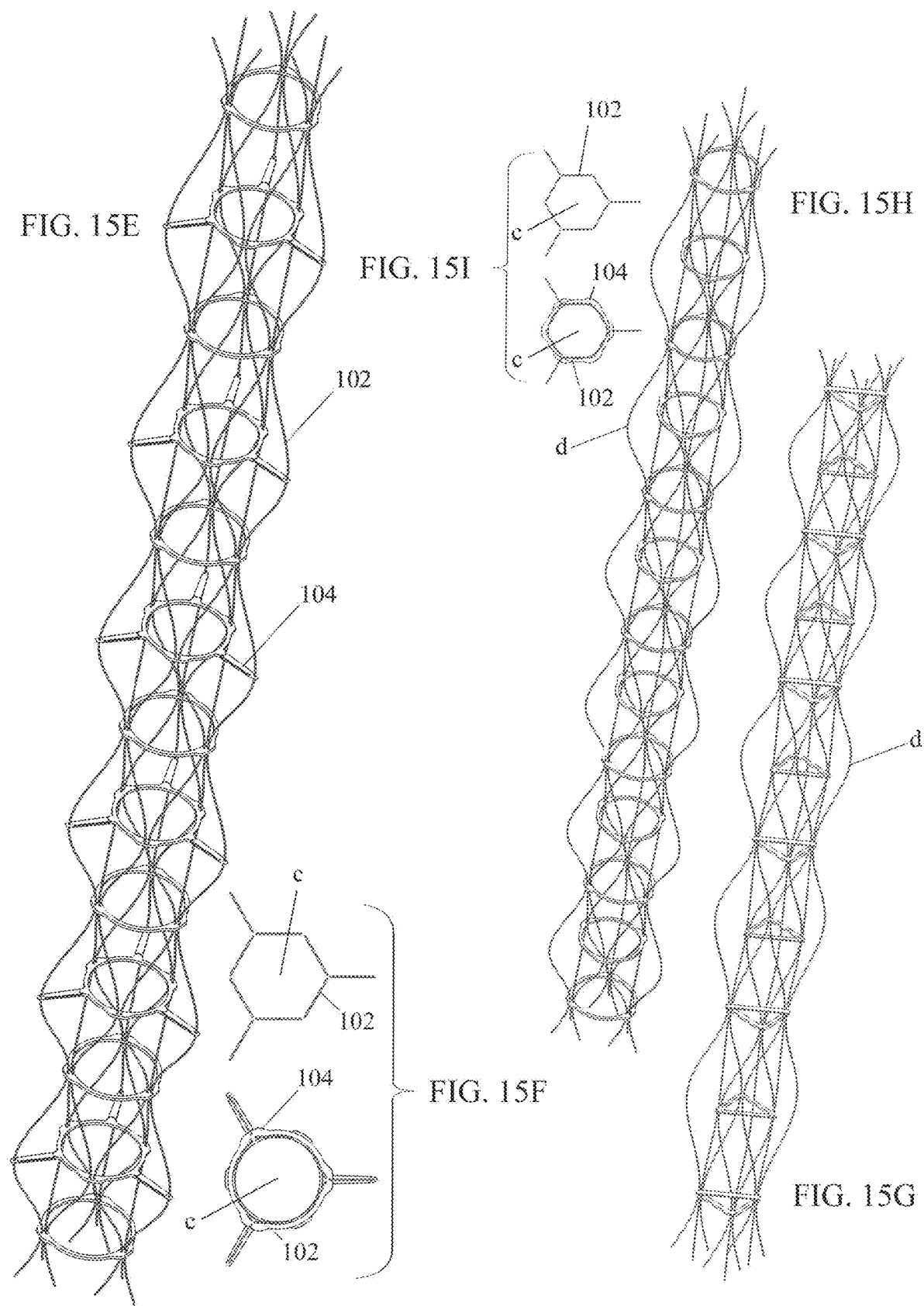

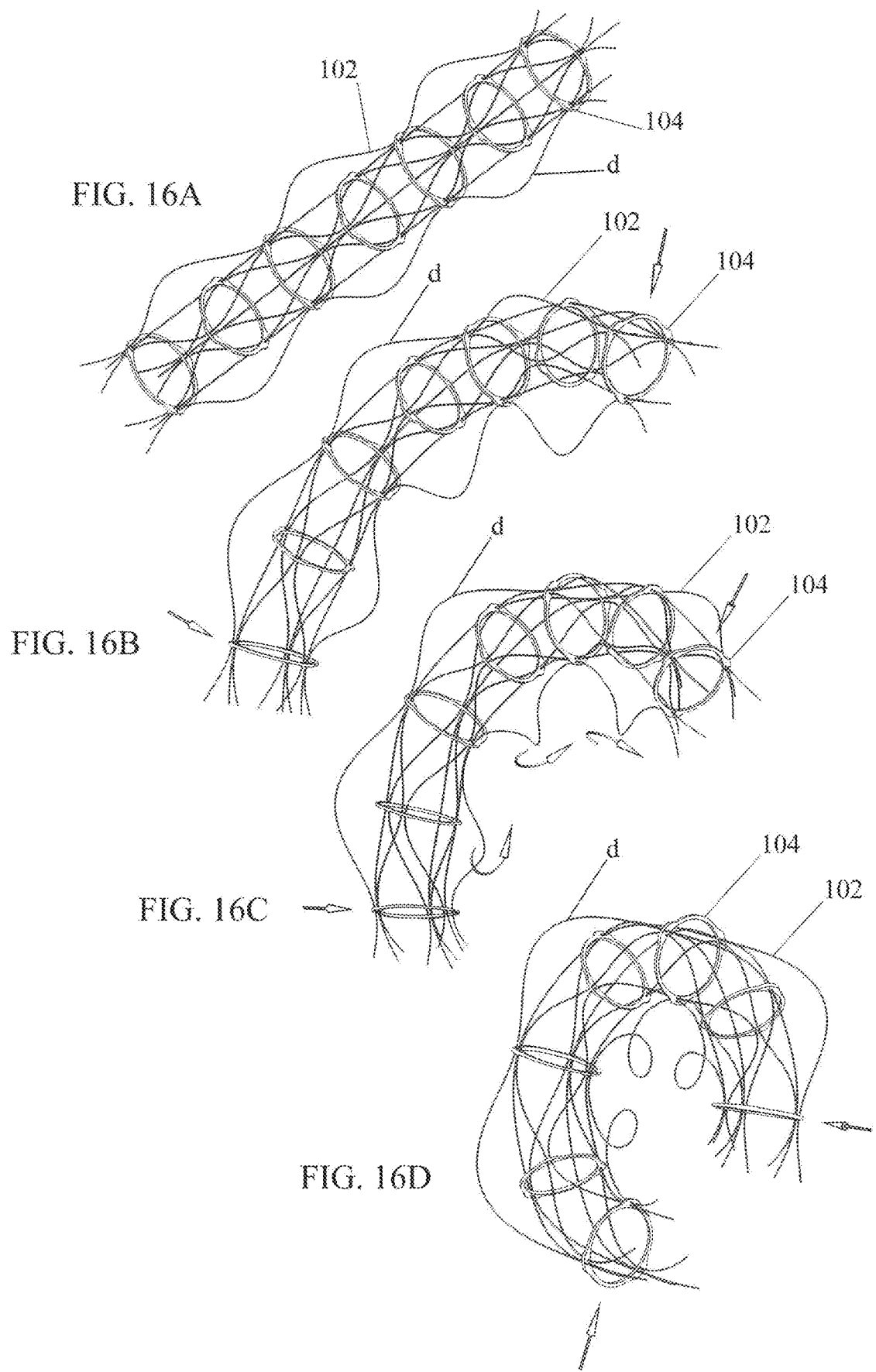

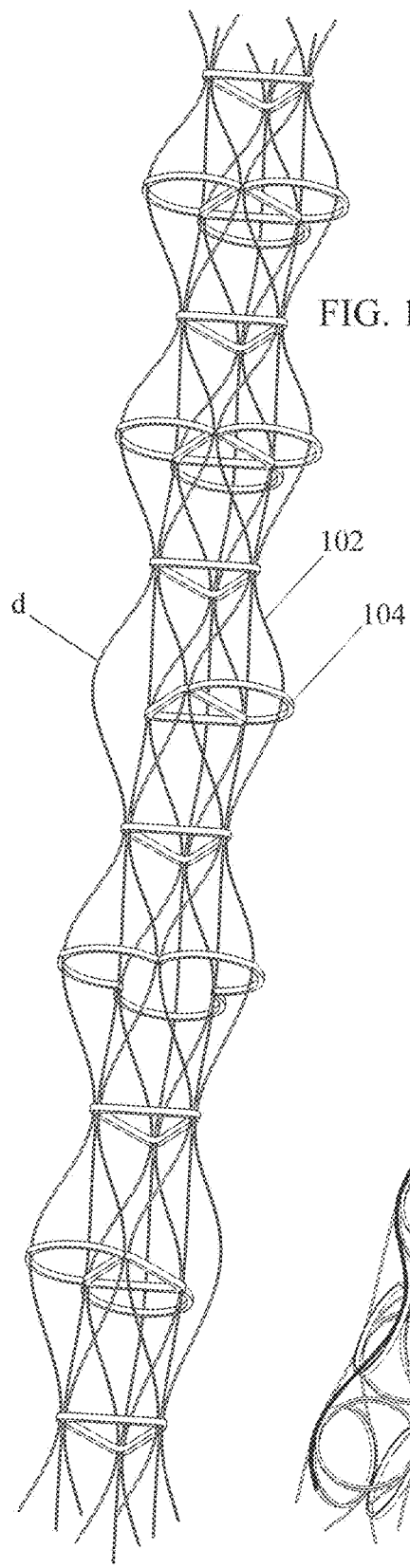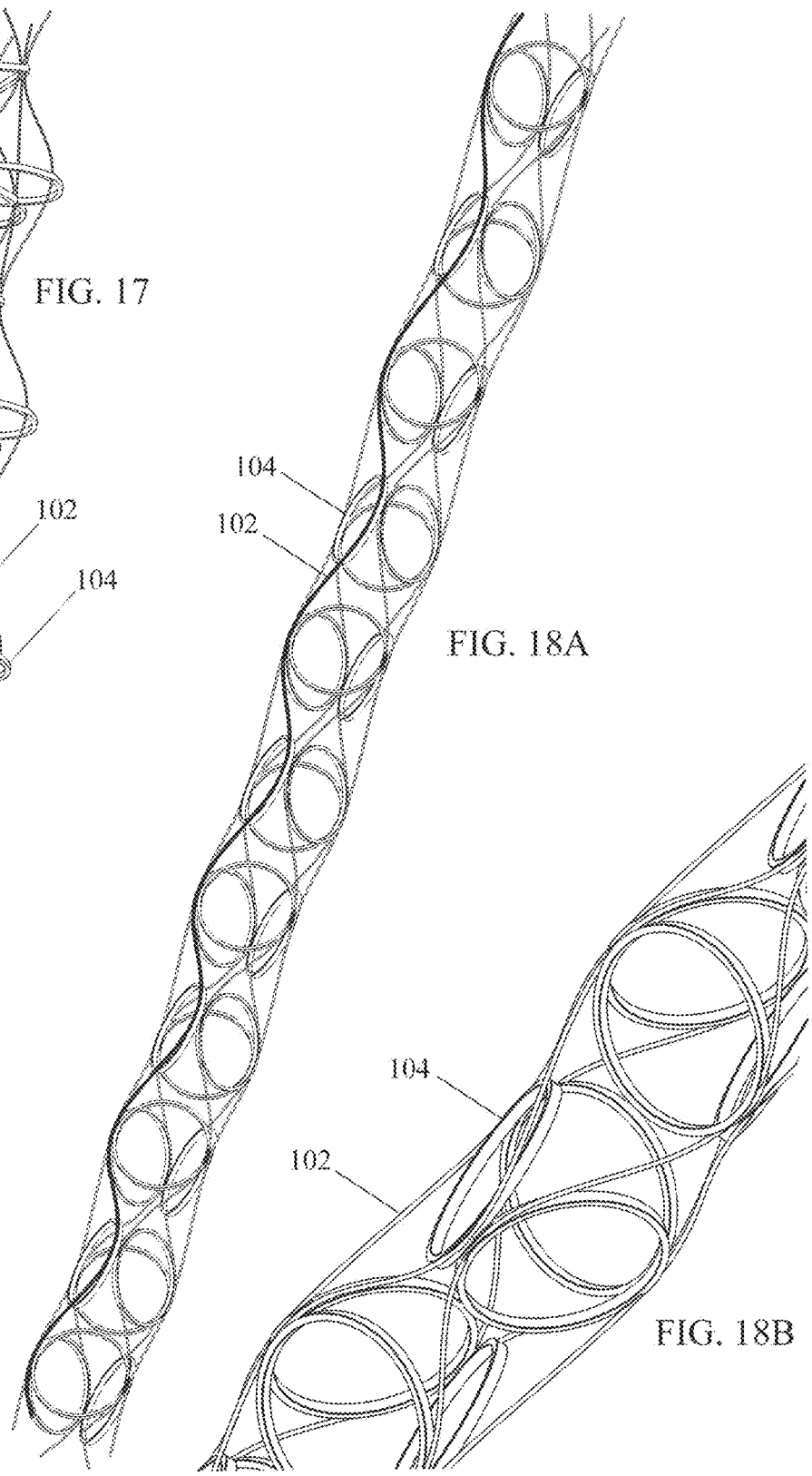

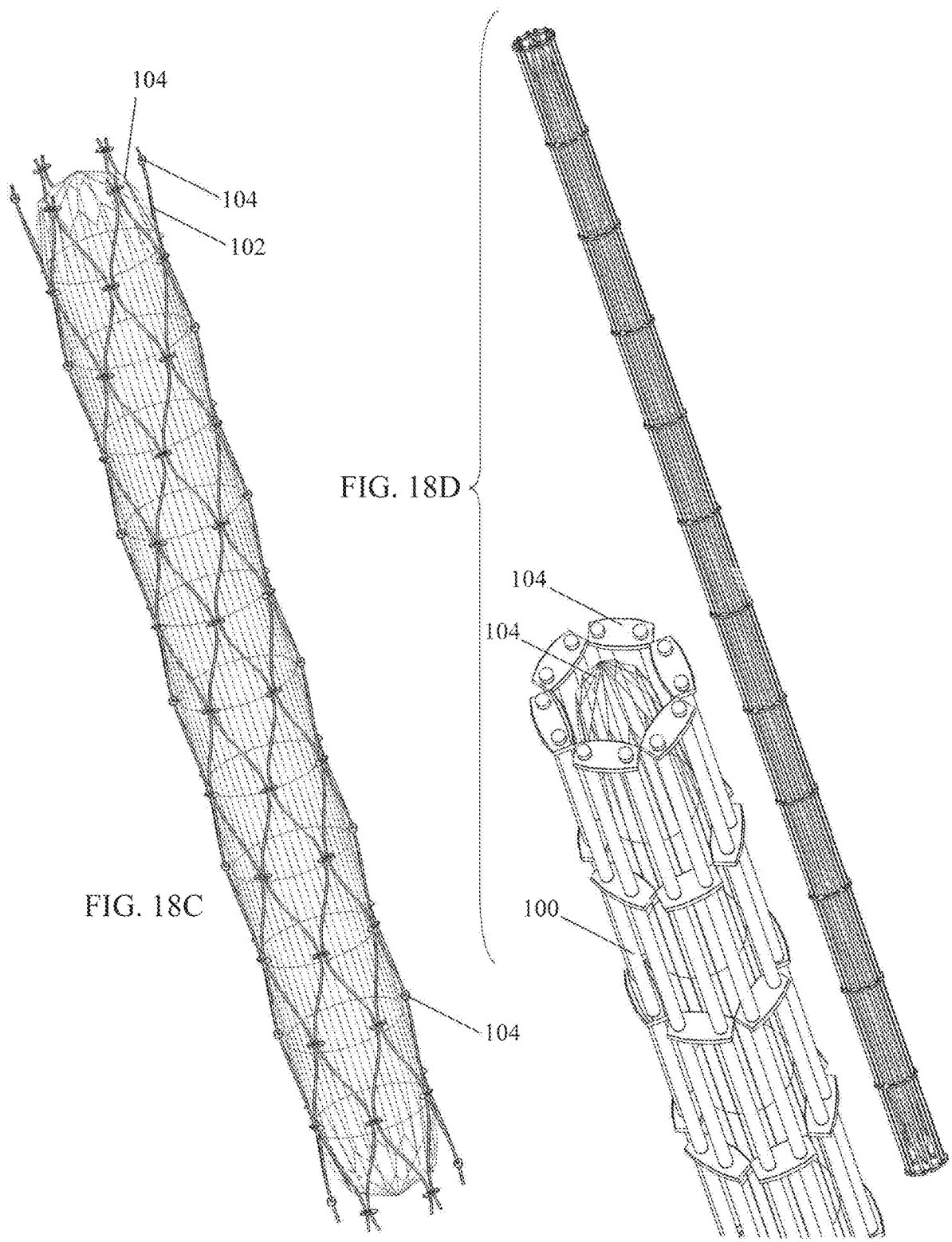

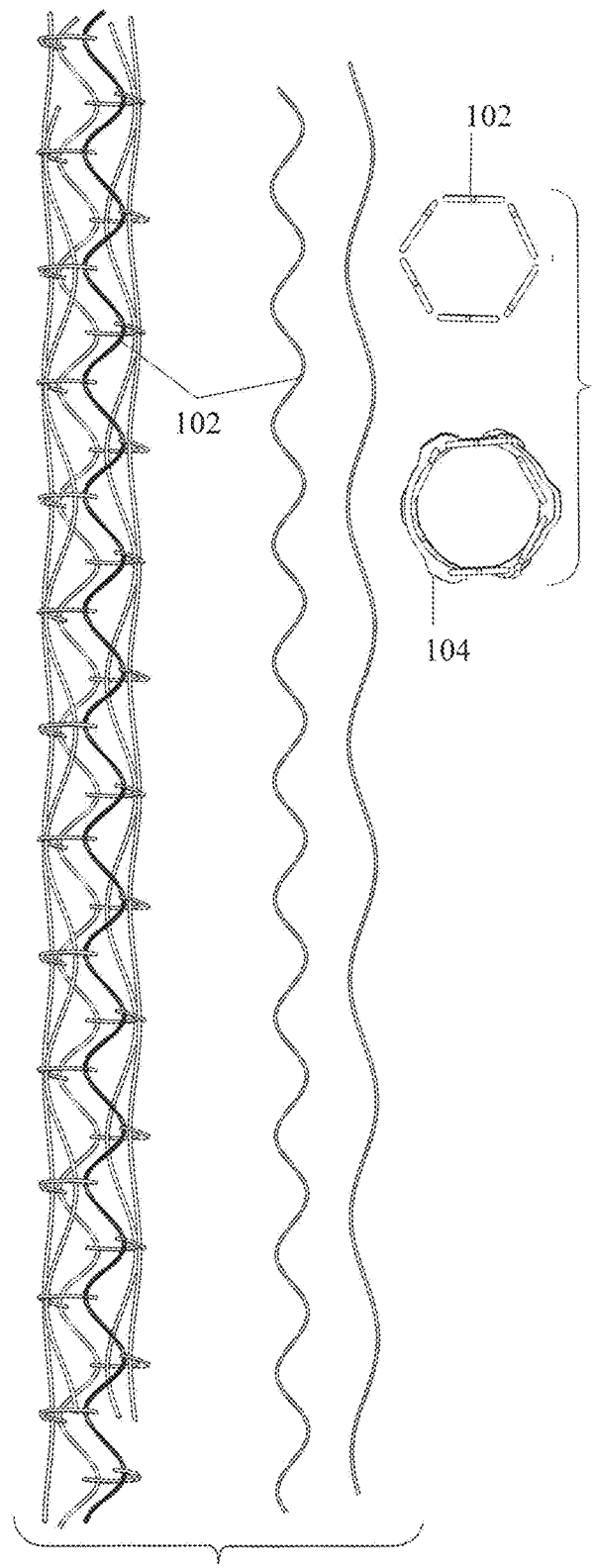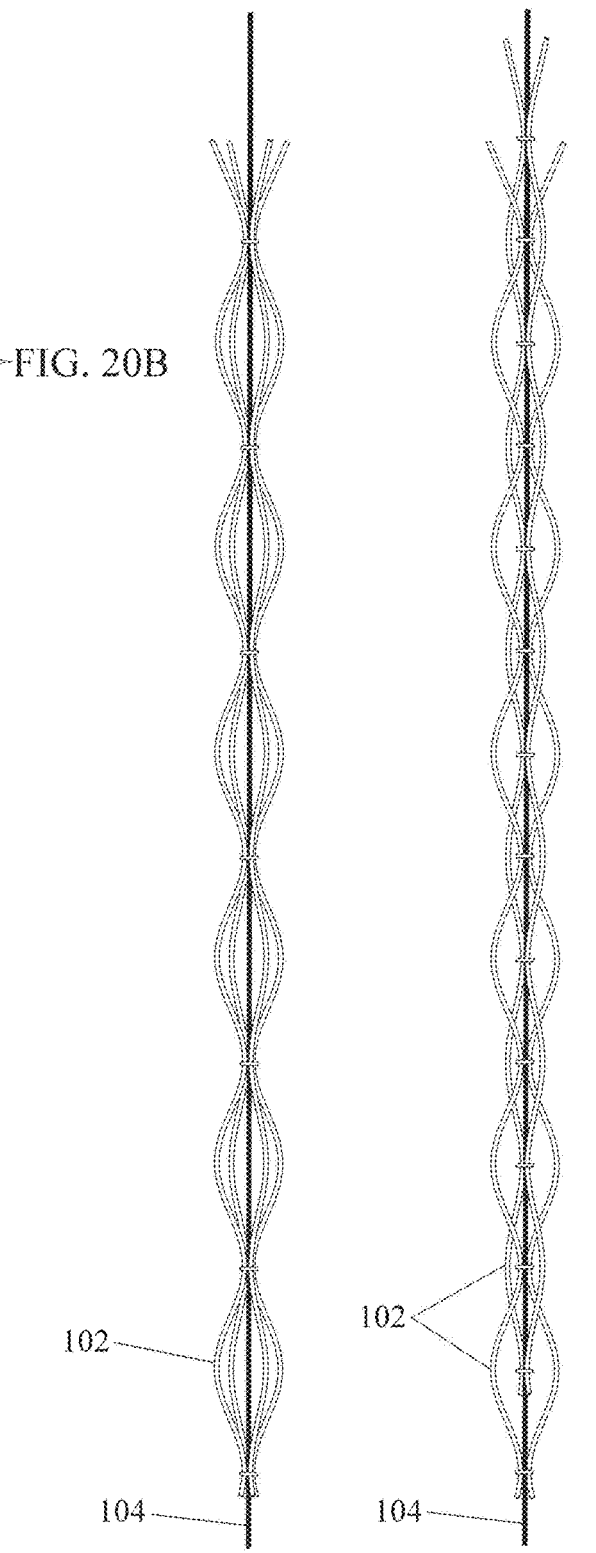
FIG. 20A  FIG. 20B  FIG. 21A  FIG. 21B

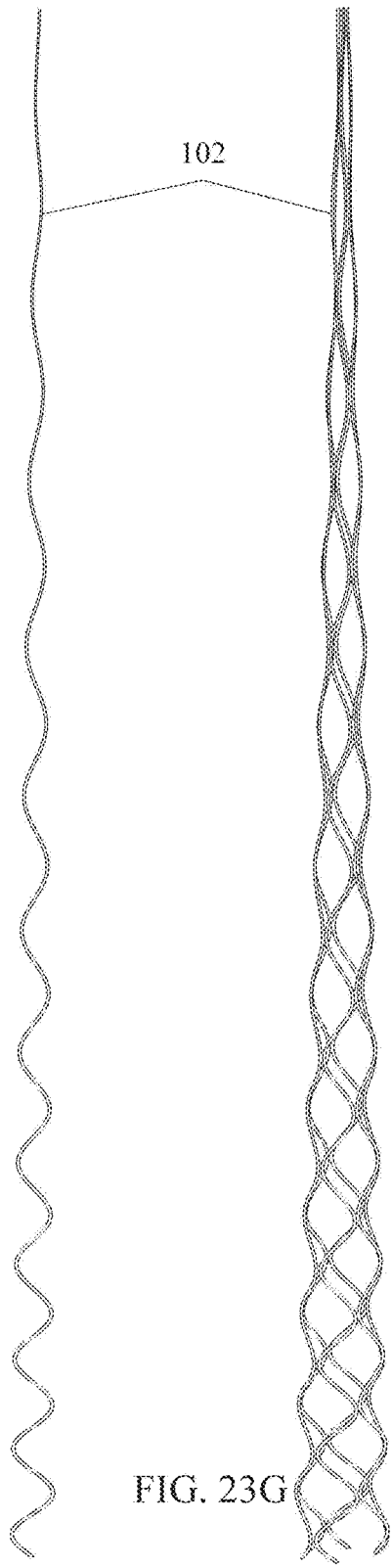
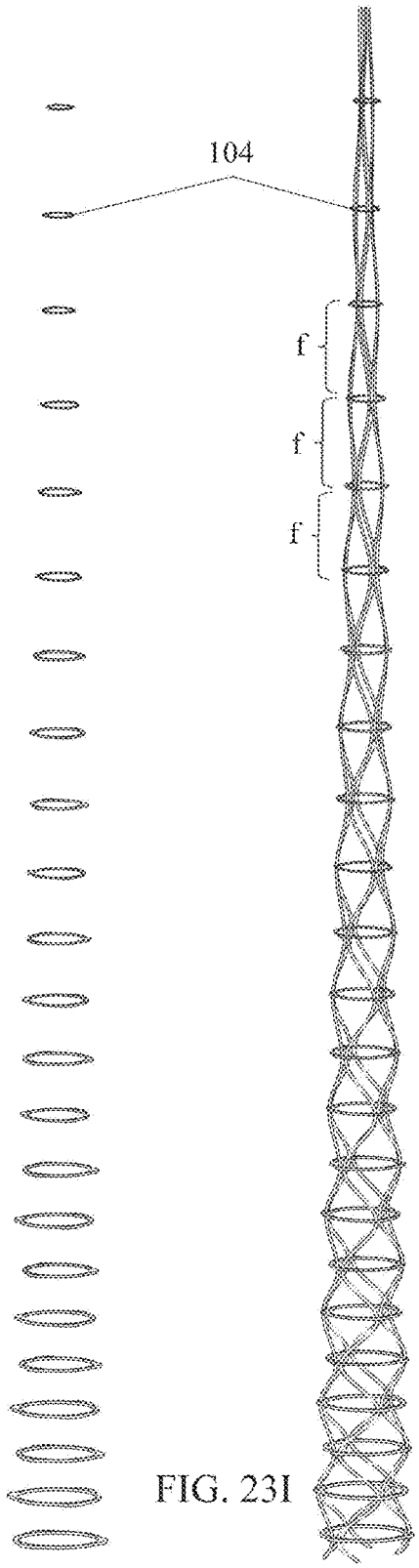
FIG. 23F  FIG. 23G  FIG. 23H  FIG. 23I

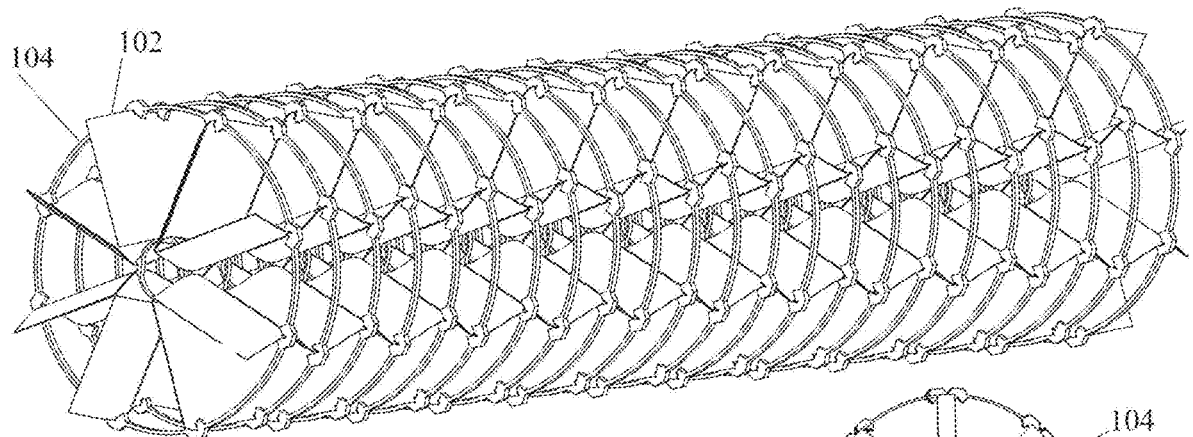
FIG. 24B
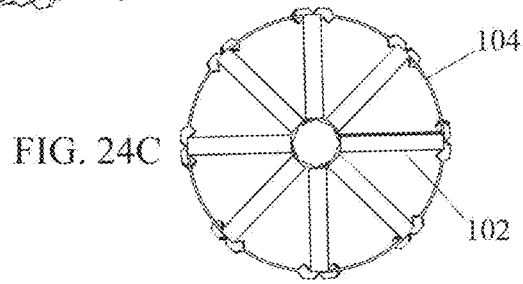
FIG. 24C
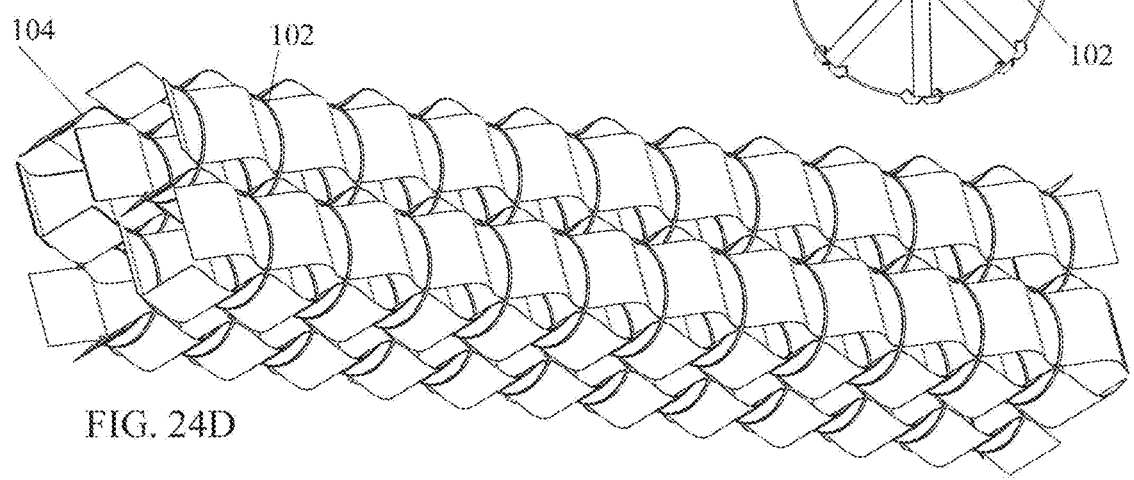
FIG. 24D
FIG. 24E
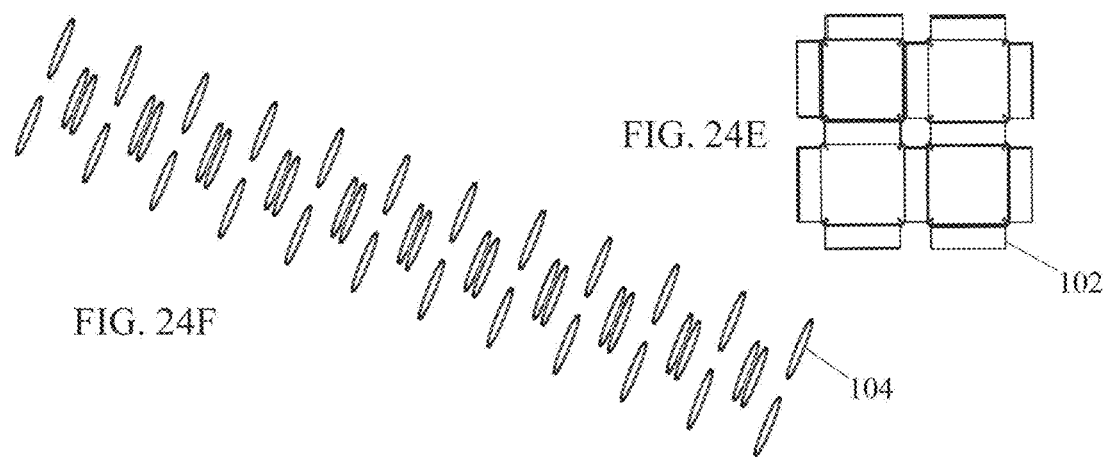
FIG. 24F

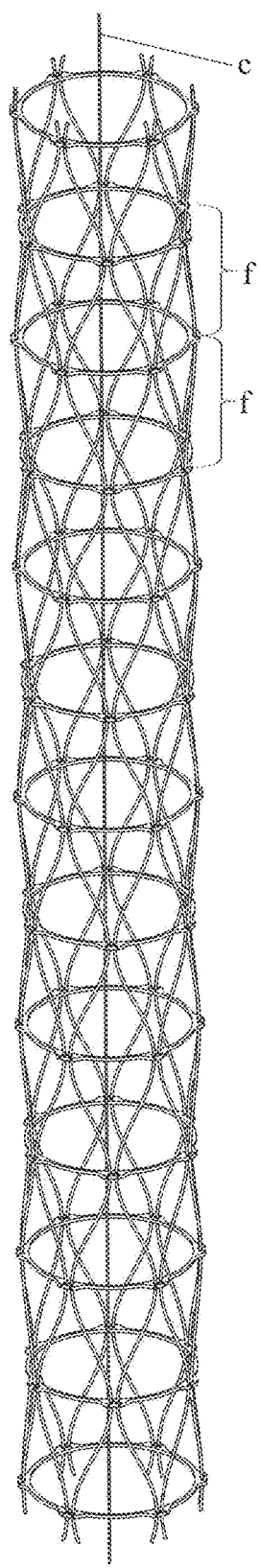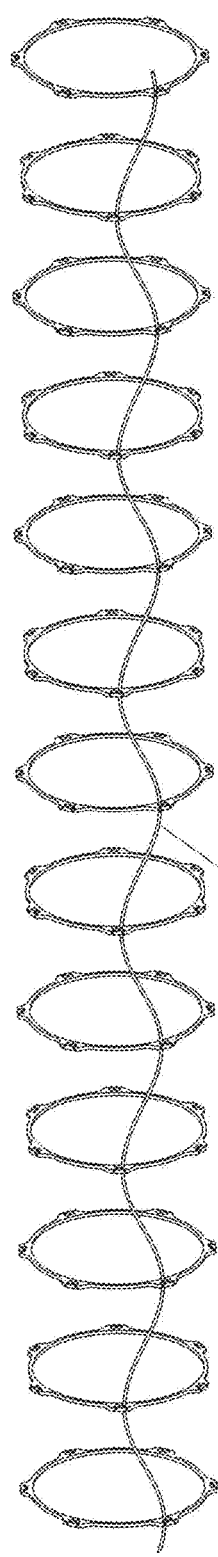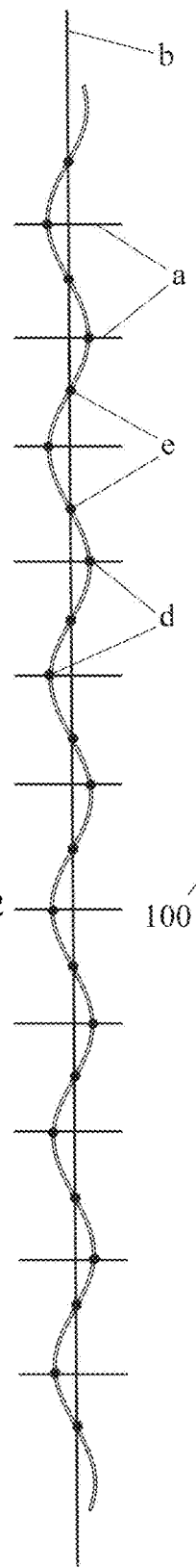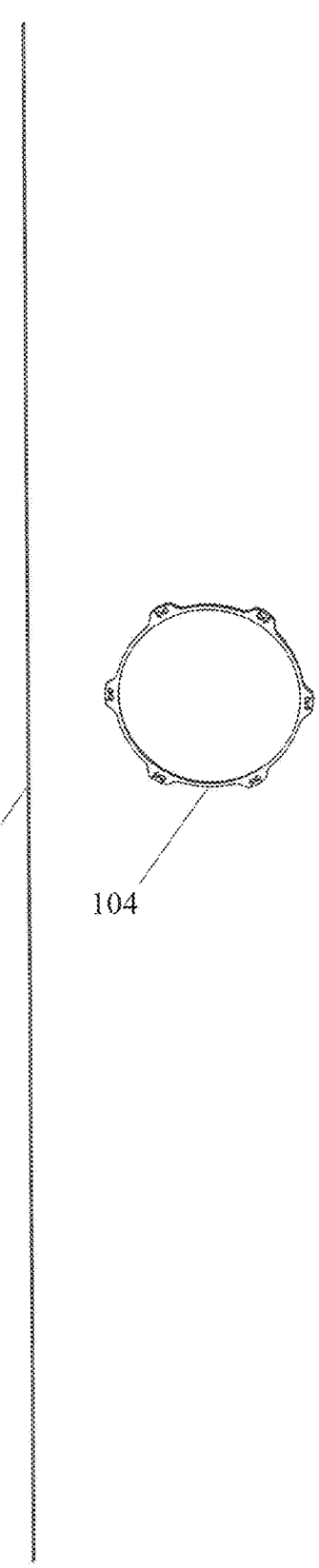
FIG. 36E   FIG. 36D   FIG. 36C   FIG. 36B   FIG. 36A

PRE-STRESSED SINUSOIDAL MEMBER IN ASSEMBLY AND APPLICATIONS

BACKGROUND OF THE INVENTION

Field of the Invention

The present invention relates to composite material and/or metal containing members having stored elastic potential energy used to form pre-stressed high performance material assemblies for structural and mechanical applications.

Brief Description of the Prior Art

New materials having physical and behavioral properties beyond or equivalent to those found in nature inspire this invention.

Current building systems and methods may not be capable of efficiently applying the properties of the new materials being formulated and adapted from nature and beyond by material science. For optimum performance a building system and its component material's properties should be complementary and possibly co-engineered.

Advances in material science will lead to the engineering of novel systems and methods that optimally use a new material's physical, engineering and mechanical properties. Systems and methods according to this invention use high performance materials efficiently by uniquely pre-stressing them into fundamental sinusoidal shaped members to form assemblies.

This fundamental system/method of interconnecting pre-stressed sinusoids provides a novel assembly platform capable of storing elastic potential energy to form superior structures and mechanisms used for mechanical and structural applications.

Pre-stressing

Methods of pre-stressing material members and assemblies to enhance their performance have been applied for thousands of years. Methods of material pre-stressing have been used in ways of trial and error long before the mathematical tools of structural engineering were developed. Pre-stressing has been seen as an unconventional solution to problems encountered during an engineering design project. The development of new materials may change that conception.

Material pre-stressing refers to the inducing of internal stresses within a material or structure to improve its performance. Pre-stressing has been and is considered useful in large scale infrastructures such as bridges, pipes, aircraft fuselages, etc. Pre-stressing is playing an increasing role in the development of micro and nano-scale devices, structures and assemblies including microelectromechanical systems (MEMS) and nanoelectromechanical systems (NEMS). Energy rich pre-stressing will also be used to form highly efficient deployable structures for aerospace applications.

Present pre-stressing techniques are primarily applied to steel and/or concrete structures. Concrete is versatile in nature and inexpensive in cost, but cannot be utilized in all applications due to its strength characteristics and heavy weight. For this reason pre-stressed structural steel is favorable in applications where weight reduction is a key issue in making the structure work.

The idea of pre-stressing steel has been shown to have considerable benefits in economy and strength. However, the pre-stressing of steel never thrived like its concrete counterpart. The pre-stressing of steel has been underutilized and rarely studied. It is not clear why this happened but it may be because steel members do not have the elastic properties necessary to effectively function within a pre-stressed assembly of weight. Pre-stressed steel may also be disadvantaged in that traditional steel structural members must be protected and maintained to prevent corrosion.

Although pre-stressed steel is useful, the use of pre-stressed high performance composite materials is far superior due to its light weight, relative strength, flexural properties and ability to elastically deform.

This invention's components are designed to use high performance composite materials and/or high performance alloys. Unlike plain steel, high performance composite materials are inherently corrosion resistant, have high strength, and light weight. High performance material structures including the products of this invention can be used to reinforced concrete or for stand-alone mechanical or structural applications. The use of carbon based composite material and/or corrosion resistant alloy structures to reinforced concrete could save billions of dollars annually in rehabilitation and replacement costs caused by the corrosion of steel reinforced concrete.

Many industries are shifting toward the use of composite materials because they display the single most significant consideration for any application: low weight compared to strength. Advances in composite material technology are occurring swiftly; their potential of coupling a material's electrical and mechanical properties through the introduction of carbon nanostructures into a nonconductive polymer will become increasingly important.

Few studies have been carried out regarding the effect of pre-stressing on the mechanical and electrical performance of composite materials. It is known that flaws in a composite material's structure can range from microscopic de-bonds to manufacturing anomalies that act to concentrate the stresses locally and may lead to material failure during deformation.

When a composite material like carbon fiber reinforced polymer (CFRP) is bent, the extreme (outer) fibers experience the greatest stress. If those fibers are free from defects, the flexural strength will be controlled by the strength of those intact fibers. Given this, the invention puts emphasis on the properties of the materials' surface and the materials' cross-sectional structure.

Although conventional composites like CFRP can fail when pre-stressed due to material imperfections, nano-composites are demonstrating improved flexural strength, flexural modulus and therefore increasingly stable pre-stressing characteristics.

The effect of pre-stressing on a composite material's microscopic constituents, like carbon nanotubes (CNTs), and assessing the macroscopic changes in response of that pre-stressing at the microscopic level have only recently begun to be studied.

Assembling carbon nanotubes (CNTs) and other carbon allotropes into robust macroscopic structures remains a challenge to exploiting their extraordinary electromechanical and structural properties. CNT-based nano-structures still suffer from creep and stress relaxation due to poor interactions between the assembled CNTs, but enhancements in the fracture toughness and overall performance of nano-composites are steadily being made. For example in 2017 graphene nano-platelets (f-GNPs) and boron nitride nano-tubes (BNNTs) were used as hybrid nano-filler causing the fracture toughness of neat epoxy to improve by 92%.

Controlling the three-dimensional micro-architectures of nano-composite containing carbon allotropes will lead to multifunctioning meta-materials with extraordinary properties. The elastic properties of CNTs predicted by finite element analysis (FEA) correspond with the reinforced polymer specimen test data. FEA results indicate that the CNT volume fraction has a significant effect on the elastic modulus of CNT reinforced polymer composites.

An exemplary material used by this invention would be a robust, purely elastic and non-dissipative nano-composite and/or super alloy. An ideal material having these physical engineering properties may be developed. Conventional composites and alloys including carbon fiber reinforced polymer (CFRP) and shape memory alloy (SMAs) will function within the context of the invention but limit the scope of possible engineering design projects. Although an alloy's strength to weight ratio is generally inferior to composites, SMAs, super alloys and high entropy alloys may have superior fracture toughness, sheer strength and tunability making them well adapted to form sinusoidal member assemblies. These sinusoidal member assemblies are flexures formed by this invention.

The physical and engineering properties of a pre-stressed high performance composite and high performance alloy materials are superior to similarly pre-stressed traditional plain steel materials. The method/system of pre-stressing described herein may be an advance in material pre-stressing technology and allow material pre-stressing to emerge as a practical structural and mechanical engineering tool.

This invention is a system of building that uses pre-stressed three-dimensional members to form assemblies. These members are pre-stressed within the assembly and held in an elastically deformed state. These pre-stressed members should experience elastic deformation that is completely recoverable (without permanent deformation) if the pre-stressing forces are removed.

As the pre-stressing/deformation of the member occurs, internal and inter-molecular forces arise that oppose the applied pre-stressing force(s). If the applied force(s) is not too great, these intra and inter-molecular forces are sufficient to completely resist the applied force(s) and allow the member to assume a new equilibrium state (a pre-stressed state). The pre-stressed member may return to its original state (relaxed state) if or when the applied force(s) are removed.

These pre-stressed three-dimensional members store elastic strain energy within their elastically deformed material. The elastic strain energy stored in the members' material and structure is potential energy and that energy is ideally equal to the work done by the applied forces that deformed the structure.

If the pre-stressed member is released from its deformed state its stored potential energy may also be completely released. From a thermodynamic point of view, a material is elastic if it is incapable of dissipating energy, i.e. the body is incapable of converting work into heat and all the mechanical work is recoverable. New classes of materials that approximate the ideal of a perfect elastic body could be used by this system. Materials having linear or non-linear stress-strain relationships may also be used.

A flexure member designed to store elastic potential energy will typically have a high elastic limit; however, all elastic members have a limit to the load they can sustain. When deformed beyond the elastic limit, the member will no longer return to its original shape. Plain steel alloys will not pre-stress and/or reversibly elastically deform to the extent that high performance composites and high performance alloys will. Composites used by this system to form flexures may include CFRP, nano-composite or metal matrix composite. Alloys used by this system to form flexures may include SMA, high entropy alloy or super alloy. Such materials having high reversible strains are well suited to form sinusoidal members used by this invention.

The pre-stressing of composite and alloy materials through recoverable elastic deformation and the impact this has on material and structural toughness, tensile strength, elastic modulus and flexural properties is of primary interest to this invention.

Methods of pre-stressing composite materials may alee act at the level of its constituent fibers and/or molecules without requiring material deformation through bending. For example, controlling composite material fiber tensioning during curing is possible. Also multi-walled carbon nanotubes (MWNT) can be pre-stressed by having a smaller inter-wall significantly enhancing their mechanical properties over those of normal MWNTs. Also there are indications that CNTs can be pre-stressed and oriented by the forces they experience during the pultrusion process. Pre-stressing a composite material at the molecular and/or fiber level during its manufacture may augment this invention's ability to pre-stress the material through elastic deformation alone.

The superior mechanical properties of many high performance materials allow forms and amounts of pre-stressing not possible with plain steel. The introduction of exotic materials, including, but not limited to cellular solids, exotic alloys and nano-composites into the realm of construction at all scales will change the way pre-stressed assemblies are designed and applied.

This invention's use of pre-stressed high performance composites and/or alloys would reduce the weight and increase the relative strength of assemblies far beyond the capabilities of steel. Composite materials and alloys having flexural properties superior to plain steel that are pre-stressed using a method designed to harness specific material attributes may produce very strong structural components that do not require cement. Pre-stressed assemblies that are light, exceedingly strong and have unique flexural properties will be feasible given the trajectory of material science.

Such high performance pre-stressed material assemblies may function on their own as a structure or mechanical device or be encased in cellular solid material shapes including those formed from foams and micro-lattices in lieu of cement products; therefore, maintaining a high performance composites' weight advantage. Specifically, advances in composite material science will allow the pre-stressing of very high strength-to-weight ratio assemblies to become sufficiently advanced to make their use common practice in a range of applications.

Materials such as steel lack the flexural properties necessary to elastically deform in ways required to shape flexural members into pre-stressed structural and mechanical members with stored elastic energy.

Pre-stressed members have been created using tendons through bending and by pre-deflection among other methods. Moment redistribution pre-stressing arises from the manipulation of support levels to induce bending stress within a member. Moment redistribution is a more complex method of pre-stressing and is most similar to the method used by this invention. In moment redistribution the direction and the magnitude of the support displacements can be manipulated to achieve the desired moment distribution. This is similar to that used by this invention but is a less regimented pre-stressing method. By having moments of force alternate/oscillate along the member's length causing bending stress within the member, a pre-stressed sinusoidal wave shaped member can be formed. The elastic potential energy stored in the deformed member can be thought of as similar to the kinetic energy stored in a standing transvers wave.

The method of pre-stressing employed by this invention uses perpendicularly oriented, periodically distributed bending moments along the length of a member to form a sinusoidal shape under elastic strain. Pre-stressing by reversibly bending a member into a sinusoid shape is an efficient method of enhancing the member's performance given many applications. By its nature a sinusoid-like shape may be a perfect shape for pre-stressing and for elastic energy storage. The sinusoids' analog properties give it infinitely variable amplitude and wavelength that correspond with the properties of elastic energy storage and structural integrity. The relationship of a material's physical characteristics of elastic deformation and elastic energy storage to a sinusoid's amplitude and wavelength allow for the creation of a pre-stressed sinusoidal shaped member having a range of flexural properties.

The flexural buckling of slender sinusoidal shaped members is a phenomenon that may be used by this invention to augment a sinusoidal assembly's mechanical and/or structural behavior. Buckling occurs when a bent member (beam) subject to axial compression reaches a level that causes a sudden bending. Sinusoidal shaped member buckling may occur in the flexural regions of an assembly. The increased bending of a sinusoidal shaped member (flexural beam) may induce snap buckling, hysteresis and loop formation. Large deflections that cause subsequent snap buckling may result from the bending and the twisting of a member in assembly and may be reversible. The engineering of an assembly designed to exhibit flexural torsion buckling would have flexural regions containing flexure elements that function as design flexures having the ability to elastically buckle rather than suddenly fail when subjected to forces that cause large deflections.

Sinusoidal Waveforms

Wave phenomena are ubiquitous in nature. Waves are fundamental to almost every branch of physics. Examples include water waves, sound waves, electromagnetic waves (radio waves, light, X-rays, gamma rays etc.), the waves that in quantum mechanics are seen to be a description of particles and such. Some features are common for most all waves, e.g. that they can be well approximated by a fundamental trigonometric wave function.

Many physical systems that resonate or oscillate produce quasi-sinusoidal motion. If a material has the property of elasticity and the particles in a certain material region are set in vibratory motion, an elastic wave will be propagated. Vibrations are characterized by deformation. Wave forms naturally emerge when oscillatory energy is introduced into a system allowing oscillatory energy to be stored in the elastically-deformed body.

Sinusoidal wave forms emerge as one of nature's primary methods of energy storage and transfer. Waves generated in matter can be compared to waves deformed from matter.

A standing wave can be generated from a disturbance within an elastic medium and that wave contains potential energy. Similarly a straight structural member with length and cross-section that is elastically deformed into a sinusoidal shape also has potential energy. The similarity in the properties of standing sinusoidal waves and elastically deformed sinusoidal wave members would indicate that a sinusoid is an exemplary shape when used to store elastic potential energy in a material member having length and transverse section.

If a person having ordinary skill in the art was to pre-stress an elastic material part by deforming and holding it under stress as a flexural member, the shape that would provide uniform stress and require the least volume may be a wave(sinusoid). Because a wave form is an effective vehicle for the storage of elastic energy and is a shape having length and width, a sinusoid would naturally be an efficient shape to model the deformation and pre-stressing characteristics of an elastic material.

The shape of an elastically deformed sinusoidal member with flexural properties is mirrored in the complex pattern of oscillating tension and compression forces that exists along its length. The sinusoidal shape represents the molecular distortion and stress distribution within the flexural members' depth. A sinusoidal shaped member is a pre-stressed sinusoidal member.

The Structure/Assembly

This invention utilizes flexural members. A flexural member is a member that is subject to both tension and compression within its depth. The invention is a system that forms pre-stressed wave structures that use the flexural stresses and the elastic strain energy associated with elastic deformation as the tools to structurally and mechanically outperform previously designed building systems that rely on assemblies formed from straight structural members that experience tension, sheer and/or compression forces exclusively, like a truss.

A structure built with this system is not a truss and may not require struts. This invention uses pre-stressed flexural members as structural members that elastically deform within a specified range of elastic behavior without yielding. This ability to elastically deform without yielding is enhanced by the flexural members' use of high performance materials, possibly an ideally elastic or hyperelastic material. Hyperelastic materials are truly elastic in the sense that when a load is applied and then removed, the material returns to its original shape without any dissipation of energy in the process.

Conventional methods of construction build assemblies from structural members that are not pre-stressed and are not flexural members. Conventional methods of construction form structures that are not designed to be flexible along with being structural. These inflexible structures are more likely to experience uncontrolled elastic instability when external forces result in their material deformation. A structure built from pre-stressed sinusoidal members may be well adapted to exploit the elastic instability of its slender members by allowing their controlled buckling and in turn an abrupt change in the shape (a conformational change) of the assembly's they compose.

The flexural members are adapted to deformation through their being pre-stressed and pre-deflected. Pre-stressing naturally guides the members further deformation caused by external forces. The pre-stressed state of a structural member is its equilibrium state. The pre-stressed state is equal to the sum of the internal stresses holding the member in assembly. External forces alter the pre-stressed/equilibrium state. The flexural degrees of freedom designed into the assembly guide its further deformation from external loads. This method of pre-stressing is well adapted to form dynamic and flexible assemblies that absorb external loads.

Flexural members experience many forces and there is a mathematical relationship between them. Load, shear force, bending moment, slope and deflection must all be considered. The principle of superposition may be stated as the deflection at a given point in a structure produced by several loads acting simultaneously. The superposition principle is one of the most important tools for solving flexural member loading problems allowing simplification of very complicated design problems. For flexural members subjected to loads of different types, the resulting shear force, bending moment, slope and deflection can be found at any location within the body of a member.

The pre-stressing forces within a structure make up its internal load and those forces interact to form its equilibrium state. Exterior loads are the variable forces applied to the pre-stressed structure. Because of the invention's flexural nature, it may provide greater protection from failure due to complex external loading scenarios when compared to conventional structural systems designed to experience primarily axial compressive and tensile forces. This invention would be superior at absorbing energy from destructive natural forces, percussive blasts and other dynamic energy sources.

Pre-stressed lattice structures formed from this invention's method of assembly may have a superior strength to weight ratio to any manufactured truss system that relies on compressible elements as support elements. This invention's use of flexure elements having flexural properties to form flexural structures containing elastic potential energy may make it generally superior to conventional non flexural structures having little internal stress.

BRIEF SUMMARY OF THE INVENTION

Sinusoids are fundamental in physics. Many physical systems that resonate or oscillate produce quasi-sinusoidal motion. Waves are more than an abstract representation of energy having temporal, directional and spectral characteristics. This invention builds assemblies from physical sinusoidal structural members that have many of the same properties as the sinusoids/waves observed in nature.

The invention is a novel and fundamental method of building pre-stressed assemblies from elastically deformed flexural members using few part types. The fundamental part types that compose a pre-stressed assembly are three-dimensional physical sinusoidal shaped members and support members. These two fundamental part types can have a large number of variants. A support member variant could take the form of a ring, n-gon, inflatable member or linear strut. Each of these support member variants may have active or passive electronic circuits embedded in their structures.

A sinusoidal shaped member variant could have any predetermined cross-section and/or length. This method of pre-stressing and construction is not restricted by scale, specific geometric arrangement, or by the number of individual parts.

The three-dimensional physical sinusoidal shaped members are pre-stressed members having flexural properties. If the pre-stressed sinusoidal shaped members are allowed to relax by having their pre-stressing forces removed, the members will no longer be sinusoidal in shape and will become relaxed and straight.

A number of these sinusoidal shaped members are held in a pre-stressed state within an assembly. Each individual pre-stressed sinusoidal shaped member in assembly has stored elastic potential energy.

A flexure is a flexible element or combination of elements engineered to be compliant in specific degrees of freedom. A flexure can be a part of a sinusoidal shaped member or the assembly it composes. A sinusoidal shaped member is formed from a plurality of flexure elements/flexures formed along its length. The smallest flexure element making up a sinusoidal member's length is $\lambda/2$. This $\lambda/2$ flexure element/flexure is a sinusoidal shaped member's smallest defined unit containing elastic potential energy. This quantity of potential energy held in the flexure element corresponds to the bending moment(s) that formed it.

The assembly's sinusoidal shaped members connect to each other through individual support members. An assembly's support members are the scaffolding that connects the pre-stressed sinusoidal shaped members. The support members' function to position, connect and transfer forces between the sinusoidal shaped members in assembly.

Without the support members, the sinusoidal shaped members could not maintain their sinusoidal shape and would not be pre-stressed or store potential energy. The support members resist and absorb the forces applied to them by the elastically deformed sinusoidal shaped members. The support members may also be elastically deformed within the assembly and also store potential energy due to the assembly's pre-stressing forces.

Assemblies can be as simple as two sinusoidal members held in an anti-phase orientation by support members, to complex flexural lattices structures containing many discrete parts. A specific assembly's geometric organization and structural complexity would be dictated by the goals of the engineering design project. The project goals would also consider the mechanical properties of the material composing the sinusoidal shaped members and support members along with the shapes of those members.

Structures built using this pre-stressed sinusoidal building system may form sub-assemblies. A sub-assembly refers to a relatively simple assembly that combines to form a larger assembly or a complete collection of parts. A sub-assembly may also be an assembly if it is not combined with other sub-assemblies.

The sinusoidal shaped members' pre-stressing forces are maintained within the assembly and exist in an equilibrium state. The equilibrium state that exists among the pre-stressed sinusoidal shaped members can be achieved by holding and positioning them in assembly out of phase. The out of phase relationship refers to the relative physical orientation of the sinusoidal shaped members in assembly.

The phase interrelationship among all the pre-stressed sinusoidal members in an assembly allows the pre-stressing forces to balance and a static equilibrium state to be maintained in the assembly. The forces/moments associated with the phase differences are transferred from one sinusoidal shaped member to another through the support members.

Phase cancellation and force equalization may occur among the sinusoidal shaped members within an assembly when their discrete pre-stressing forces interact through their anti-phase orientations. This anti-phase configuration that exists between the sinusoidal shaped members within the assembly allows the pre-stressing forces to be in equilibrium and be stored as elastic potential energy. Each pre-stressing moment/force that is stored as elastic potential energy in the material making up a sinusoidal shaped member is counter-acted by an opposing force or forces within the assembly.

The sinusoidal members' pre-stressing forces can be evenly distributed or unevenly distributed within the assembly. If the pre-stressing forces (store of potential energy) that make up the assembly's equilibrium state are evenly distributed throughout the assembly, then the assembly will not deform and its neutral axis will be straight. If the pre-stressing forces that make up the assembly's equilibrium state are unevenly distributed, the assembly may deform and its neutral axis will mirror that structural deformation.

An assembly's pre-stressing forces can also be thought of as being evenly or unevenly distributed across the assembly's/structure's cross-sectional shape. If the assembly's potential energy/pre-stressing energy is not evenly distributed across the assembly's cross-sectional shape, the centroid axis and the neutral axis are incongruent and the assembly will be deformed. A specific assembly's shape will have the same topology regardless of how its pre-stressing forces are distributed.

The neutral axis is an axis in the cross section of an assembly/flexure (a member resisting bending) which there is no longitudinal stresses or strains. If the section is symmetric, isotropic and is not curved before a bend occurs, then the neutral axis is at the geometric centroid.

The invention's applications could include, but are not limited to, pre-stressed assemblies used to reinforce or pre-stress concrete and cellular foams, stand-alone structures and superstructure applications, aerospace design flexures and aero-structures. A flexure is a flexible element or combination of elements engineered to be compliant in specific degrees of freedom.

An exemplary application of the invention may be to pre-stress and possibly deflect a concrete structure in order to counteract the external loads applied to it when it is put into use (known as service loads), the following method applies. An exemplary pre-deflection technique may require a sinusoidal assembly in a deflected state be encased in concrete (and possibly held under axial tension) and then released. The forces imposed on the concrete by the deflected sinusoidal assembly are then oriented to counteract the external load.

Assemblies having pre-stressing forces that are evenly and unevenly distributed could take the form of assemblies that contain sinusoidal shaped members of different amplitudes, different material properties, or ones formed from smart material having controllable stiffness. The support members' designs and their orientations in assembly may also impact the distribution of the pre-stressing forces within the sinusoidal assembly.

Assemblies requiring flexural bias and/or specific degrees of freedom could be designed to fit specific applications. The structural and behavioral properties of an assembly could be predetermined by controlling the flexural properties of its constituent sinusoidal shaped members.

The use of such pre-stressed structures and mechanisms specifically engineered to function in reduced gravity environments has great potential.

Automated Assembly

Another aspect of the invention is an automated process for forming and connecting sinusoidal shaped members and support members into pre-stressed assemblies having stored elastic potential energy. This includes the steps of assembling a number of member units into a pre-stressed structure by connecting the member units to each other, each of the units being connected or adapted to be connected. The connected units form the structure of the assembly according to a pre-determined geometry.

Mechanisms may be involved in this automated process. These mechanisms elastically deform regions of the relaxed members' lengths to form flexural elements during the formation of sinusoidal shaped members. After a flexural element is completely formed, it becomes part of the structure and a functioning flexure. Note: the pre-stressing forces are introduced into the assembly after the flexural elements are formed. Those flexural elements become flexures when they become part of the assembly. The flexures lie along the flexural member's/sinusoidal shaped member's length and can be given varying degrees of stress during assembly.

The assembly is pre-stressed according to the elastic deformation of its component parts during the automated assembly process. The automated assembly process may be controlled by a specially adapted computer program, and the amount of pre-stressing force applied through bending moments to form flexural elements during assembly can be specifically controlled. The elastic deformation of the flexural regions making up the contiguous flexures along the sinusoidal shaped member's length may also be specifically controlled. This level of control may allow a highly adaptable and variable method of pre-stressing to function in real time during automated assembly. This dynamic method of assembly may allow structures to take on shapes having characteristics and properties that are tailored to specific applications. An assembly's characteristics could be predetermined or be adapted during the assembly process. Adaptive manufacturing/assembly would require real time decision making components and feedback loop mechanisms.

Through the engineering design process the mechanical and/or structural properties of the sinusoidal shaped members and support members within an assembly can be pre-determined. The shape of the different members, the elastic potential energy stored in the different members, the material properties used to form the different members and the physical geometry of the assembly will determine the assembly's functionality.

Some assembly designs or methods of manufacture may require support members and sinusoidal shaped members be formed as separate material parts while others may require they be materially contiguous (formed from the same piece of material). If they are formed from a single piece of material through a reductive or additive manufacturing process, the sinusoidal shaped members' and support members' functions, while interdependent, remain distinctly separate in the assembly.

The relaxed material used to form the sinusoidal shaped members through an automated assembly process may be any length and may be manufactured using a pultrusion process. The support members used in an automated assembly process may be planar and geometric and may be produced using an additive manufacturing process.

The support members and/or sinusoidal shaped members may incorporate complimentary methods of connecting during assembly. Such methods may be integrated into their material structure or may involve the use discrete parts or materials such as clips, pins or adhesives.

BRIEF DESCRIPTION OF THE SEVERAL VIEWS OF THE DRAWINGS

In the accompanying drawings, in which several of various possible embodiments of the invention are illustrated, corresponding reference characters refer to corresponding parts throughout the several views of the drawings in which:

FIG. 2E is a perspective view depicting a relaxed non-prismatic beam having hexagonal cross section.

FIG. 2F is a perspective view depicting a relaxed non-prismatic beam having rectangular cross section.

FIG. 3A is a perspective view of an exemplary relaxed prismatic member depicting its cross-section before being formed into a sinusoid.

FIG. 3B is a perspective view of an exemplary relaxed prismatic member depicting its cross-section after being formed into a sinusoid.

FIG. 12A is a perspective view of a tubular/n-gon assembly formed from lengthwise oriented sinusoidal shaped members and ring type support members.

FIG. 12B is a perspective view of an impossible (unsupportable) tubular/n-gon assembly formed from lengthwise oriented sinusoidal shaped members and strut type support members.

FIG. 12C is a perspective view of a tubular assembly formed from circumferentially oriented sinusoidal shaped members and strut type support members.

FIG. 15A is a perspective view of a complete assembly that incorporates equilateral triangle support members.

FIG. 15B depicts the assembly length wise, with and without support members.

FIG. 15C is a perspective view of a complete assembly that incorporates a type of flexible support member.

FIG. 15D depicts the assembly length wise, with and without support members.

FIG. 15E is a perspective view of a complete assembly that incorporates a type of flexible support member.

FIG. 15F depicts the assembly length wise, with and without support members.

FIG. 15G is a perspective view of a complete assembly that has free antinodes and truss type support members.

FIG. 15H is a perspective view of a complete assembly that has free antinodes and incorporates a type of flexible support member.

FIG. 15I depicts the FIG. 15H assembly length wise, with and without support members.

FIG. 16A shows the beam assembly un-deflected.

FIG. 16B shows the assembly bending due to external forces shown as force arrows.

FIG. 16C shows further compression at the interior of the assembly's bend and the subsequent deformation and the twisting of the slender sinusoidal shaped members.

FIG. 16D depicts the assembly's further deformation and the snap buckling (looping) of sinusoidal members at the interior of the bend.

FIG. 17 is a perspective view of an assembly that illustrates the use of various support member designs to maintain its sinusoidal shaped members' pre-stressed state.

FIG. 18A is perspective views depicting support members that are not oriented perpendicularly to an assembly's axis.

FIG. 18B is a detail of FIG. 18A

FIG. 18C is an orthogonal view of a sinusoidal structure that is supported by an axially oriented inflatable support member.

FIG. 18D is a orthogonal view of an assembly formed from relaxed members, strut support members and an inflatable support member (104) that has not placed force on the relaxed members (100) to deflect them.

FIG. 20A show orthogonal views of the sinusoidal member of different wavelength and also the complete assembly they are part of.

FIG. 20B shows lengthwise top views of the sinusoidal members in assembly.

FIG. 21A is an orthogonal view of an assembly containing sinusoidal members that have an anti-phase relationship.

FIG. 21B is an orthogonal view of an assembly containing sinusoidal members that are out of phase.

FIG. 23F is an orthogonal view of a damped and tapered sinusoidal shaped member.

FIG. 23G is an orthogonal view of an organized assembly of six constituent damped and tapered sinusoidal shaped members.

FIG. 23H is an orthogonal view of the assembly's support member organization along its length.

FIG. 23I is a perspective view of a non-prismatic beam assembly formed from damped and tapered sinusoidal shaped members and ring support members.

FIG. 24B is a perspective view of an assembly having sinusoidal shaped members having a rectangular cross section oriented radially.

FIG. 24C is a lengthwise view of the assembly depicted in FIG. 24B, Note: the slender flexible ring support members.

FIG. 24D is a perspective view of a lattice assembly formed from 4-gon oriented sub-assemblies.

FIG. 24E is a lengthwise view of the sinusoidal shaped members depicted in FIG. 24D.

FIG. 24F is a perspective view of the support members depicted in FIG. 24D.

FIG. 31B depicts lengthwise views of the exemplary lattice assemblies depicted in FIG. 31A.

FIG. 32A is a perspective view of an assembly having unevenly distributed pre-stressing forces.

FIG. 32B is a section view that depicts an assembly with unevenly distributed pre-stressing forces having its deflection normalized by placing it under tension.

FIG. 33A is a section view of an assembly shown encased in a solid material.

FIG. 33B is a perspective view of a curved sinusoidal structure composed of sinusoidal shaped members having differing amount of stress applied to them during assembly.

FIG. 33C is a perspective view of assemblies formed to have a predetermined shape.

FIG. 34A is a perspective view of a sinusoidal assembly following a helical path.

FIG. 34B is a perspective view of a sinusoidal assembly following a helical path with its helical spirals joined to form a tube.

FIG. 34C is a perspective view of a sinusoidal assembly's helical spirals being joining ("zippered") one to another.

FIG. 35A is a perspective view of a tapered hexagonal sub-assembly.

FIG. 35B is a perspective view of interconnected tapered hexagonal sub-assemblies.

FIG. 35C is a perspective view of interconnected tapered hexagonal sub-assemblies forming a curved surface.

Figure 1A:
FIG. 1A is an orthogonal view showing an exemplary conception of a relaxed member used to form a sinusoidal shaped member.

FIG. 36A is an orthogonal view of an exemplary support member.

FIG. 36B is an orthogonal view of an exemplary relaxed member.

FIG. 36C is an orthogonal view of an exemplary sinusoidal shaped member.

FIG. 36D is a perspective view of a sinusoidal shaped member being supported by support members.

FIG. 36E is a perspective view of an exemplary sinusoidal assembly.

DETAILED DESCRIPTION OF AT LEAST ONE PREFERRED EMBODIMENT OF THE INVENTION

The invention's method of pre-stressing is inspired by wave behavior in nature and how waves efficiently move, store and transfer energy within a system. This "natural" method/system of energy storage and energy transfer guides the building and pre-stressing of assemblies built from physical wave shaped members formed from high performance composite and/or alloy materials.

Waves in nature absorb and transfer energy within the context of other waves they interact with. Similarly, wave shaped members (sinusoidal shaped members) held in assembly with other pre-stressed sinusoidal shaped members act to transfer potential energy among the other members in assembly. The dynamic and complex character of wave phenomena in nature when applied to the building of manmade physical structures may transcend conventional methods of assembly in technology.

This system uses pre-stressed material members and material support members to form sparse structures whose materials are deformed during assembly. That deformation is elastic, the stress-strain relationship is called Hooke's law and the elastic strain energy is stored in the structure's material members.

During the assembly process bending moments result in the elastic deformation of the material members. This deformed material will return to its original shape if the forces applied during assembly are released. The forces applied to the materials during assembly result in material bending, stress and strain at the molecular level. The physical and behavioral characteristics of this stress and strain are defined by the material's elastic modulus and/or flexural modulus.

The strain energy reservoir held within the assembled system's structure results from the deformation of its elastic material. This energy reservoir is intended to enhance the structure's performance.

These assemblies are energetic high performance material structures that are elastically deformed through the bending of their component parts during assembly. These structures contain strain energy as an assembly that is not present in the individual straight relaxed linear members and support member parts. The assembly process flexes and places stress on all the pre-assembled straight linear material members. The assembly process bends and naturally curves the pre-assembled straight structural members into sinusoidal shaped members. The post-assembled sinusoidal shaped members and support members become a system of flexure designs working as a unit. The structure formed is pre-stressed, can be stable and its internal stresses are in equilibrium. The support member parts may also experience elastic deformation and "carry" the stress during and after assembly.

Figure 1B:
FIG. 1B is an orthogonal view showing an exemplary conception of a sinusoidal shaped member formed from a relaxed member that is linear, slender and made of a high performance composite and/or alloy material.
Figures 2A, 2B, 2C, 2D:
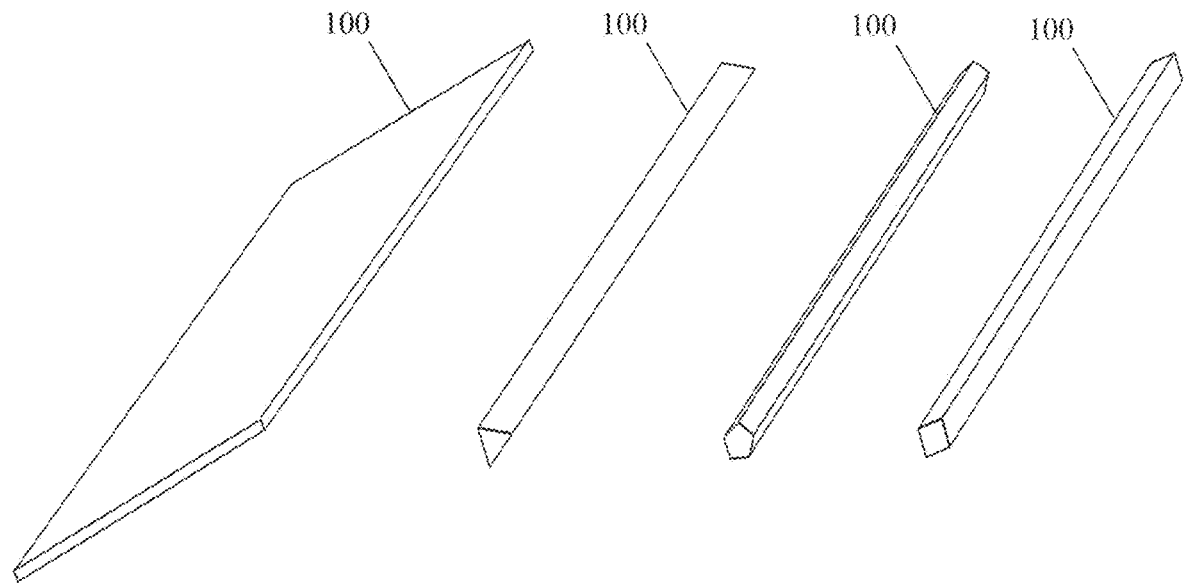
FIG. 2A is a perspective view depicting a relaxed prismatic beam having rectangular cross section.
FIG. 2B is a perspective view depicting a relaxed prismatic beam having triangular cross section.
FIG. 2C is a perspective view depicting a relaxed prismatic beam having pentagonal cross section.
FIG. 2D is a perspective view depicting a relaxed prismatic beam having square cross section.

FIG. 1A depicts a discrete, straight, relaxed linear member (100) unit having length and width. FIG. 1B depicts the same relaxed linear member elastically deformed into a discrete sinusoidal shaped member (102) unit having elastic potential energy. The relaxed linear member and the elastically deformed sinusoidal shaped member are topologically equivalent.

As depicted in FIGS. 2A-F, relaxed members (100) with length may have various transverse cross-sectional geometries. FIGS. 2A-D depict exemplary relaxed members as prismatic beams having different cross-sectional shapes; rectangular, triangular, pentagonal and square respectively. Members having non-prismatic geometry (geometry that changes longitudinally) may also function as slender elastic material members.

Examples of non-prismatic beams are depicted in FIGS. 2E-F. Elastic material strips, rods and other slender members are fundamental physical structures that because of their simplicity can exist as viable structures at many different dimensions and scales within the context of this invention. FIG. 2E depicts a tapered shaft having hexagonal cross section. FIG. 2F depicts a tapered beam having a rectangular cross section.

FIGS. 3A-B depict a relaxed linear member's transverse cross-section and the sinusoidal shaped member's transverse cross-section as being topologically equivalent. The deformation/pre-stressing of the relaxed member (100) depicted in FIG. 3A into the exemplary sinusoidal shaped member (102) depicted in FIG. 3B may not alter its cross-sectional shape. The cross-sectional shape is shaded.

Figure 4A:
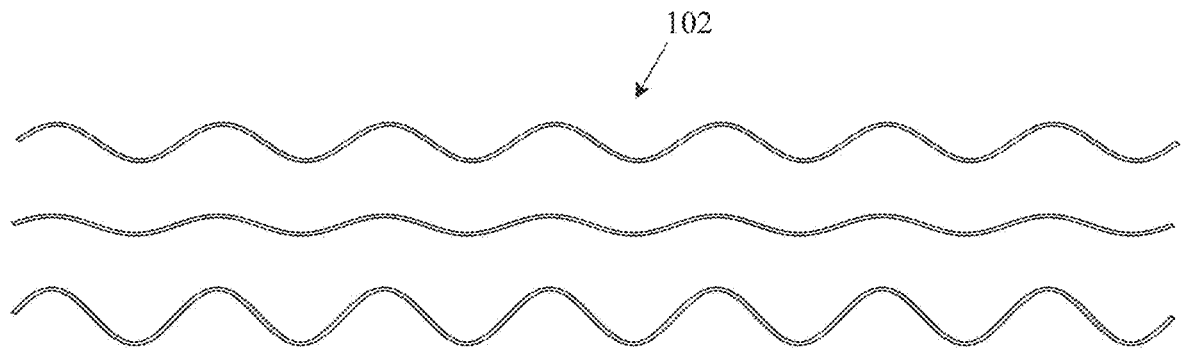
FIG. 4A is an orthogonal view depicting the physical wave parameter of wavelength.
Figure 4B:
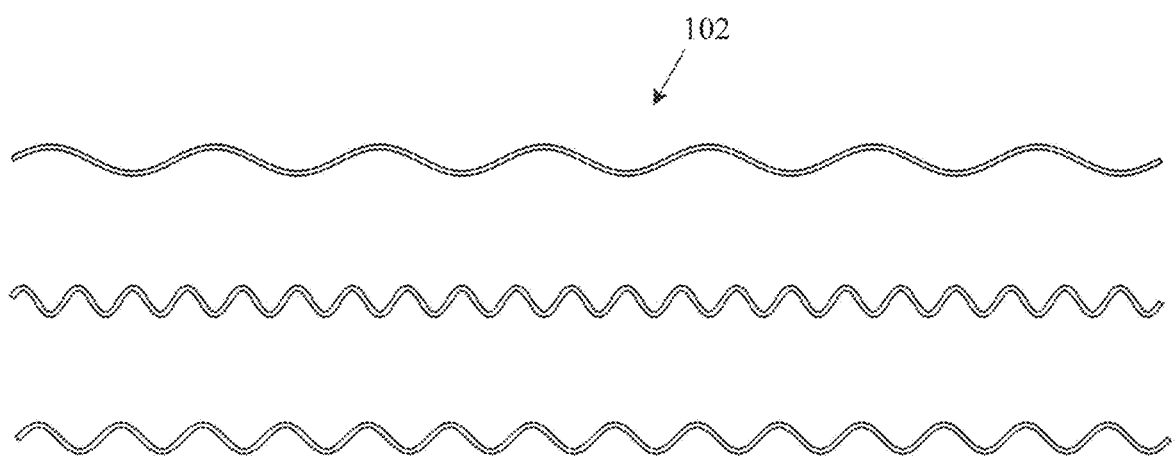
FIG. 4B is an orthogonal view depicting the physical wave parameter of amplitude.
Figure 4C:
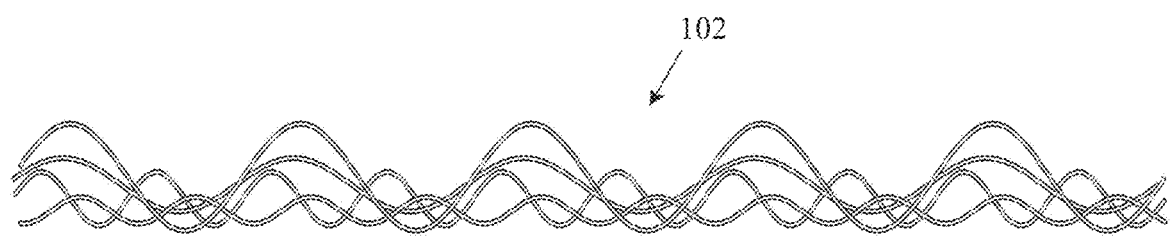
FIG. 4C is an orthogonal view depicting physical wave phase relationships.

A sinusoidal shaped member is an articulated beam having the physical wave parameters of spatial frequency, amplitude and wavelength. FIGS. 4A-C depict examples of the physical wave parameters that may be exhibited by physical sinusoidal shaped members in assembly. FIG. 4A depicts several discrete sinusoidal shaped member units (102) having the property of amplitude. FIG. 4B depicts several discrete sinusoidal shaped member units having the property of wavelength/spatial frequency. FIG. 4C depicts several discrete sinusoidal shaped member units having the property of phase offset.

Figure 5A:
FIG. 5A is an orthogonal view of a relaxed slender tapered beam.
Figure 5B:
FIG. 5B is an orthogonal view of a slender tapered beam after becoming a pre-stressed damped sinusoidal shaped member.

The physical "wave parameters" of the pre-stressed sinusoidal shaped member can vary over the length, width and depth of that member. The physical dimensions and material properties of the relaxed linear member that forms the sinusoidal shaped member can also vary along its length, width and depth. An example of this could be a composite or alloy material damped sinusoidal shaped member formed from a tapered relaxed linear member. FIG. 5A depicts a tapered/non-prismatic relaxed linear member (100). FIG. 5B depicts the same relaxed linear member elastically deformed into a discrete sinusoidal shaped member (102) unit that is damped and tapered along its length. Being tapered reflects a gradual change in amplitude (attenuation) along its length. Both the sinusoidal shaped member and the relaxed member forming it are tapered and both are non-prismatic beams. The wave parameters manifested by a sinusoidal shaped member can vary along its length, width and depth.

Figure 6A:
FIG. 6A is an orthogonal view of a sinusoidal shaped member having regular period.
Figure 6B:
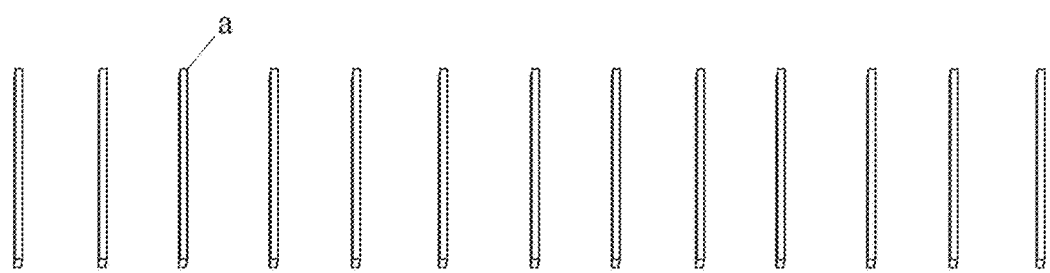
FIG. 6B is an orthogonal view of FIG. 6A's spatial frequency and is oriented to show their shared phase geometry.
Figure 6C:
FIG. 6C is an orthogonal view of a damped sinusoidal shaped member.
Figure 6D:
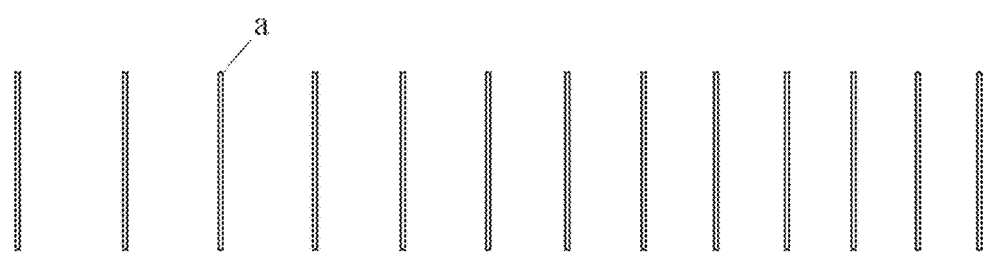
FIG. 6D is an orthogonal view of FIG. 6B's spatial frequency and is oriented to show their shared phase geometry.

FIGS. 6A-D depict a sinusoidal shaped member's structure and spatial frequency. The spatial frequency is a characteristic of any structure that is periodic across its position in space. This spatial frequency corresponds to the mathematical curve that describes the sinusoidal shaped member's smooth repetitive oscillation. Frequency based spatial damping may also apply to the sinusoidal shaped member's periodicity. FIG. 6A depicts a sinusoidal shaped member and FIG. 6B depicts its regular spatial frequency. $\lambda/2$ regions of a sinusoidal shaped member are represented by its spatial frequency. These $\lambda/2$ flexural regions punctuate the length of a sinusoidal shaped member to from a sequence of contiguous flexures. FIG. 6C depicts a damped sinusoidal shaped member and FIG. 6D depicts its spatial frequency attenuation characteristics. The damped sinusoidal shaped member is formed from a sequence of contiguous flexures that reflect the sinusoidal shaped member's gradually changing wave properties.

Figure 6E:
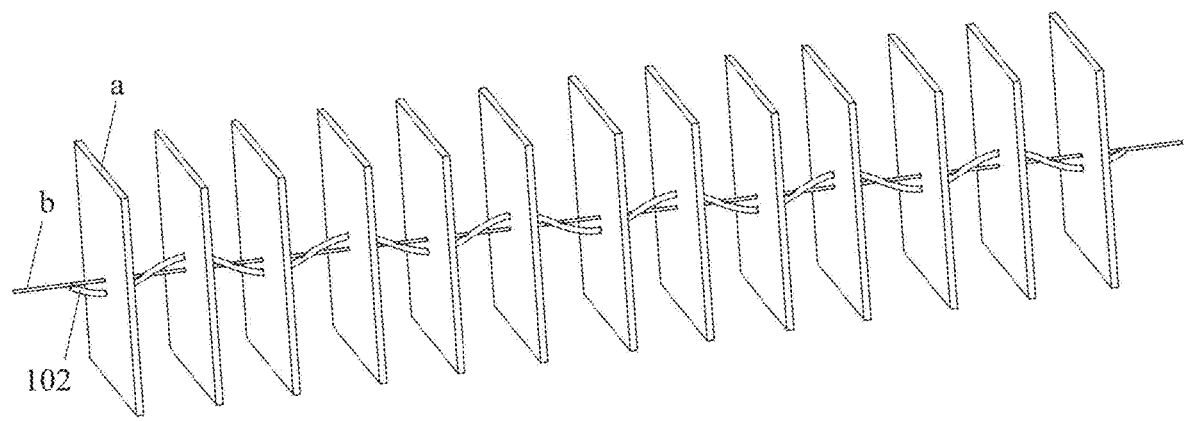
FIG. 6E is a perspective view of the members axis and spatial frequency.
Figure 6F:
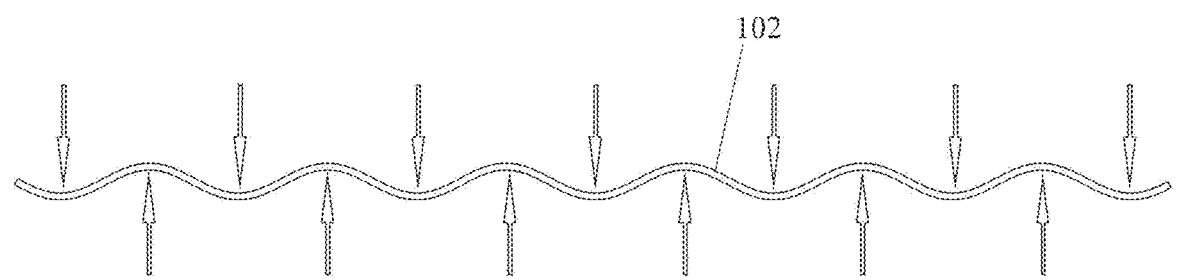
FIG. 6F is an orthogonal view showing bending moments as force arrows shaping a relaxed member into elastic sinusoidal shaped member.
Figure 6G:
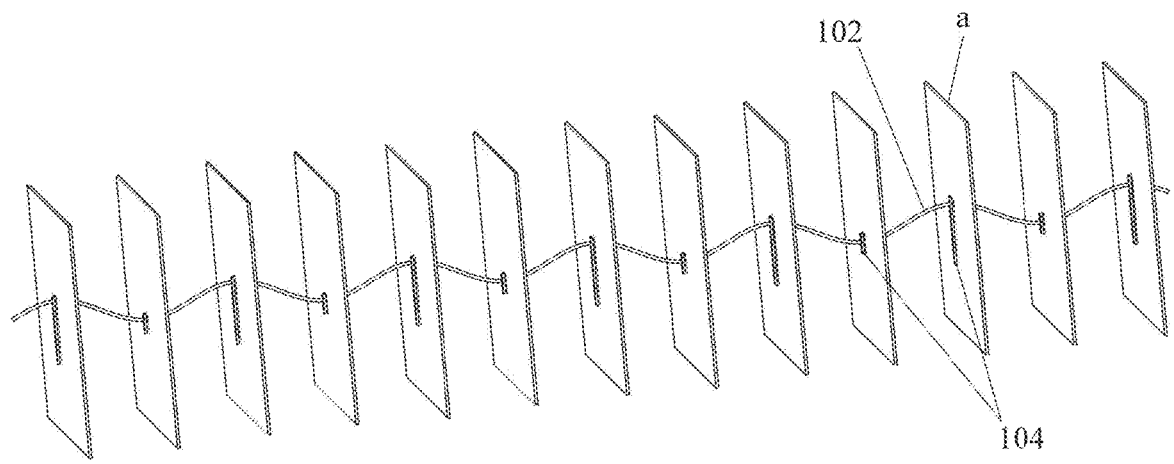
FIG. 6G is a perspective view showing the relationship between the sinusoidal shaped member, its spatial frequency and support member location.

FIGS. 6E-G depict the properties of an exemplary sinusoidal shaped member. FIG. 6E depicts the spatial frequency's (a) relationship to the sinusoidal shaped member's (102) wave structure and sinusoidal axis (b). FIG. 6F depicts a single sinusoidal shaped member (102) with periodic out of phase bending moments being applied along its length. These oscillating deformative forces and/or alternating positive and negative bending moments are represented as arrows. The force arrow's orientation and size correspond to the direction and strength of the forces being exerted on the member. FIG. 6G depicts a single sinusoidal shaped member (102) with support members (104) positioned along its length that correspond to its spatial frequency (a). The sinusoidal shaped member can be a slender sinusoidal member having spatial period and flexural strength. A sinusoidal shaped member cannot exist as an independent unit; it must connect to other sinusoidal shaped members through support members to maintain its shape.

Figure 7A:
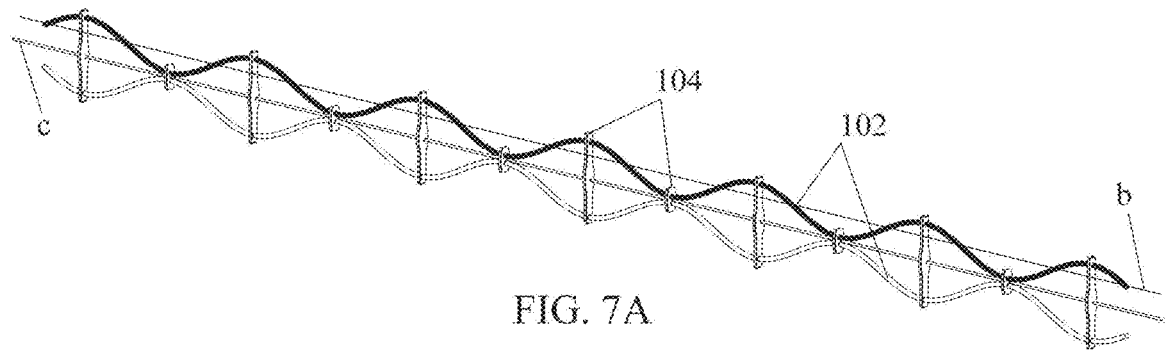
FIG. 7A is a perspective view showing a sinusoidal assembly labeling the sinusoidal shaped members, support members, assembly's axis and the axis of an individual sinusoidal member that is shaded.

FIGS. 7A-E depict aspects of sinusoidal shaped members and support members in an exemplary assembly. FIG. 7A depicts exemplary pre-stressed sinusoidal shaped members (102) and support members (104) in assembly to form a sinusoidal structure. One sinusoidal shaped member is shaded. The assembly's axis (c) and the sinusoidal member's axis (b) are represented longitudinal to the length of the assembly. This assembly specifically contains two pre-stressed sinusoidal shaped members and thirteen support members. Each sinusoidal shaped member contains six complete wave cycles, fourteen nodes and thirteen anti-nodes. The support members' position mirrors the sinusoidal shaped members' physical wave parameters. A minimum of two sinusoidal shaped members is required to form an assembly. The sinusoidal shaped members have an anti-phase relationship within the spatially periodic assembly.

Figure 7B:
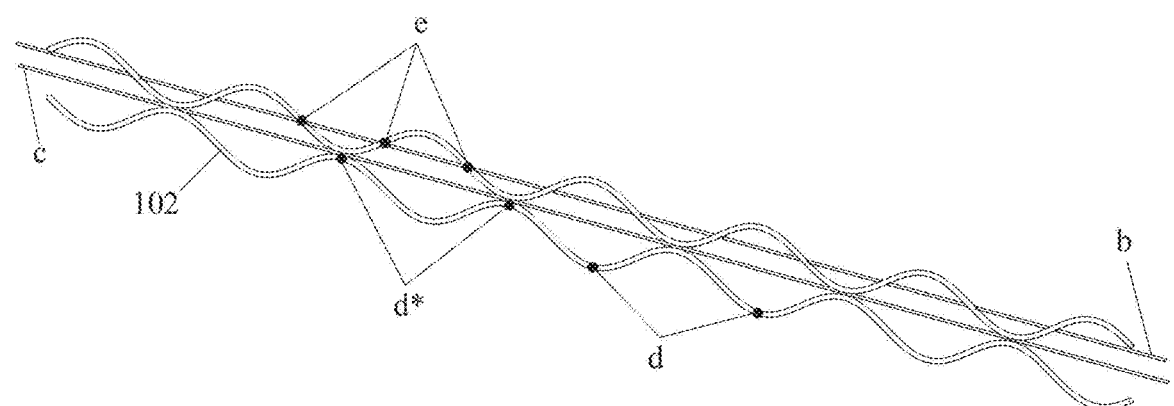
FIG. 7B is a perspective view showing the assembly's sinusoidal shaped members and identifying the location of the nodes and antinodes that punctuate the assembly's length.
Figure 7C:
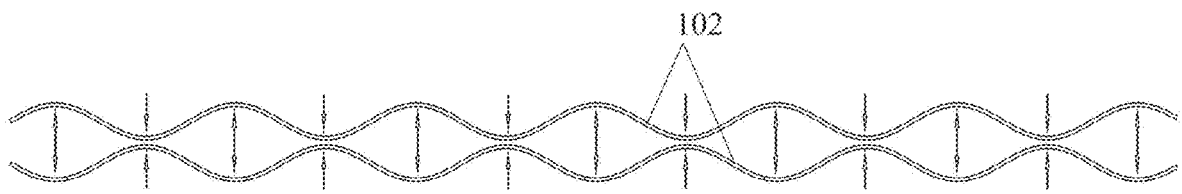
FIG. 7C is an orthogonal view depicting bending moments as force arrows along the sinusoidal shaped members' lengths.
Figure 7D:
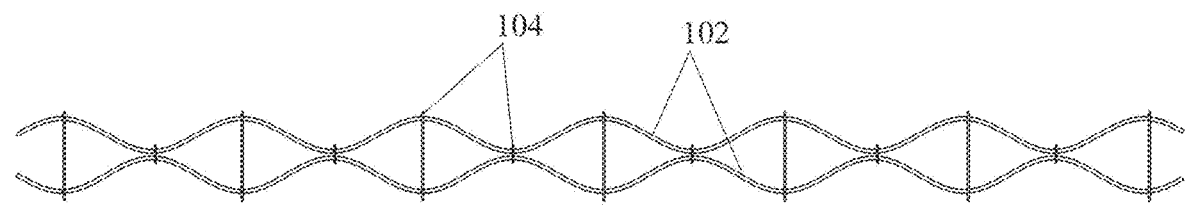
FIG. 7D is an orthogonal view depicting the sinusoidal shaped members and the unit support members that punctuate the assembly's length.

FIGS. 7B-D depict aspects of this exemplary pre-stressed assembly's sinusoidal structure. In FIG. 7B anti-nodes (d and d*) are shown as points along a sinusoidal member's length. Anti-nodes represent the location where the sinusoid undergoes the maximum displacement. Nodes (e) are shown as points at zero displacement and exist along each sinusoidal member's axis (b). The anti-nodes location along a sinusoidal member's length corresponds to its spatial frequency. Anti-nodes when in assembly are of two categories: distal anti-nodes (d) and proximal anti-nodes (d*). This is based on their relative position to the assembly's axis (c). The distal anti-nodes are the greatest distance from the assembly's axis, the proximal the least. Distal and proximal anti-nodes identify regions of the sinusoidal shaped member's geometry where connections may take place. There are instances where the anti-nodes within an assembly do not form connections. An assembly containing free (not connected to another sinusoidal shaped member) anti-nodes is termed unsaturated. A saturated sinusoidal assembly has all of its anti-nodes connected or interconnected to other sinusoidal shaped members. Two sinusoidal shaped members are said to connect; if more than two join, they are interconnected.

Figure 33A:
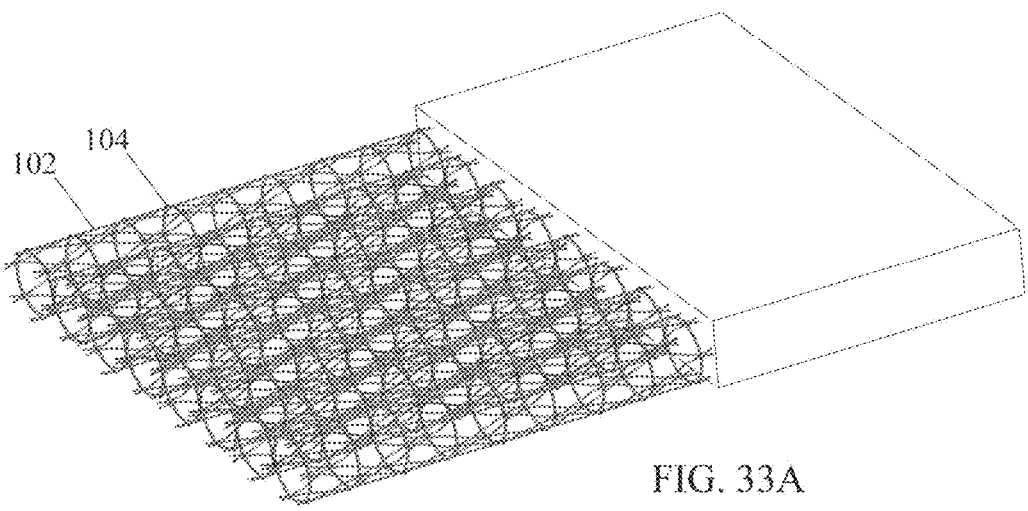
Figure 33B:
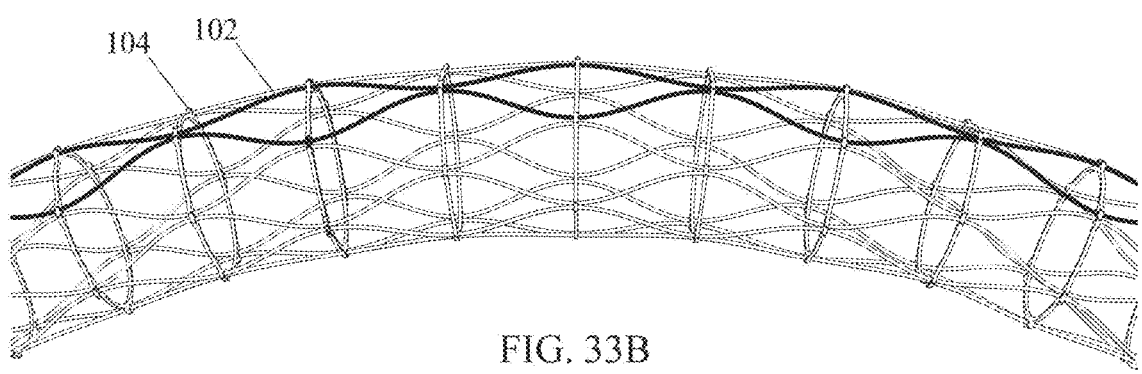
Figure 33C:
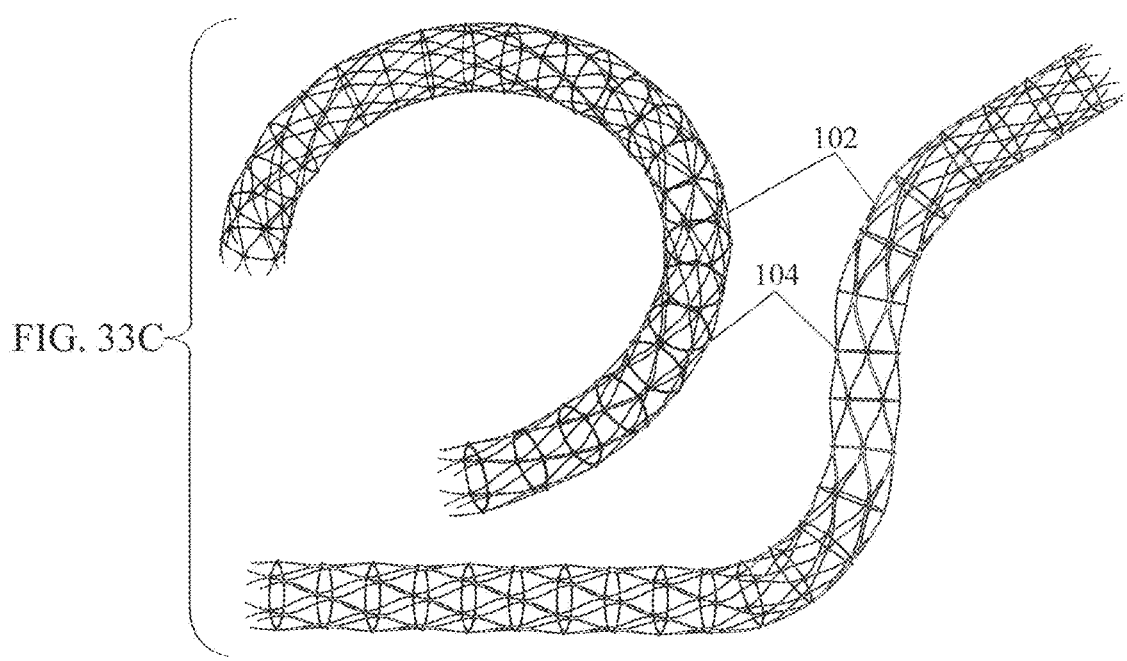

In FIG. 7C the orientation and magnitude of bending moments along the assembly's length are shown as force arrows. The distribution of first and/or second order bending moments along a sinusoidal shaped member's length defines its shape and flexural properties. First order bending (pre-stressing) shapes the member's wave; second order bending refers to the possible bending/deformation of the complete assembly. In FIG. 7C there is no deformation present. Second-order bending or lateral deflection of the sinusoidal members within an assembly is depicted in FIG. 33B-C.

In FIG. 7D two sinusoidal shaped members (102) are held in a pre-stressed state by support members (104); in this example, the support members are specifically designed to support two sinusoidal shaped members having identical amplitude, wavelength and transverse section. The support members' placement along the sinusoidal shaped member's length corresponds to its spatial frequency. In this example, the forces within the assembly are balanced and the sinusoidal shaped members are identical opposites. Their interaction can be thought of as destructive interference. The forces/moments within each sinusoidal member are of equal magnitude and act in opposite directions in assembly.

The two sinusoidal members depicted in FIGS. 7A and 7D are oriented anti-phase and connected anti-node to anti-node by support members. In this example, proximal (inner) anti-nodes (d*) and the distal (outer) anti-nodes (d) connect through the support members (104) to balance the sinusoidal shaped members (102) pre-stressing forces. Because the pre-stressed sinusoids in assembly contain identical internal forces/elastic potential energy, they are in static equilibrium, and because those forces are evenly distributed along the assembly's axis (c), there is no second order bending.

Figure 7E:
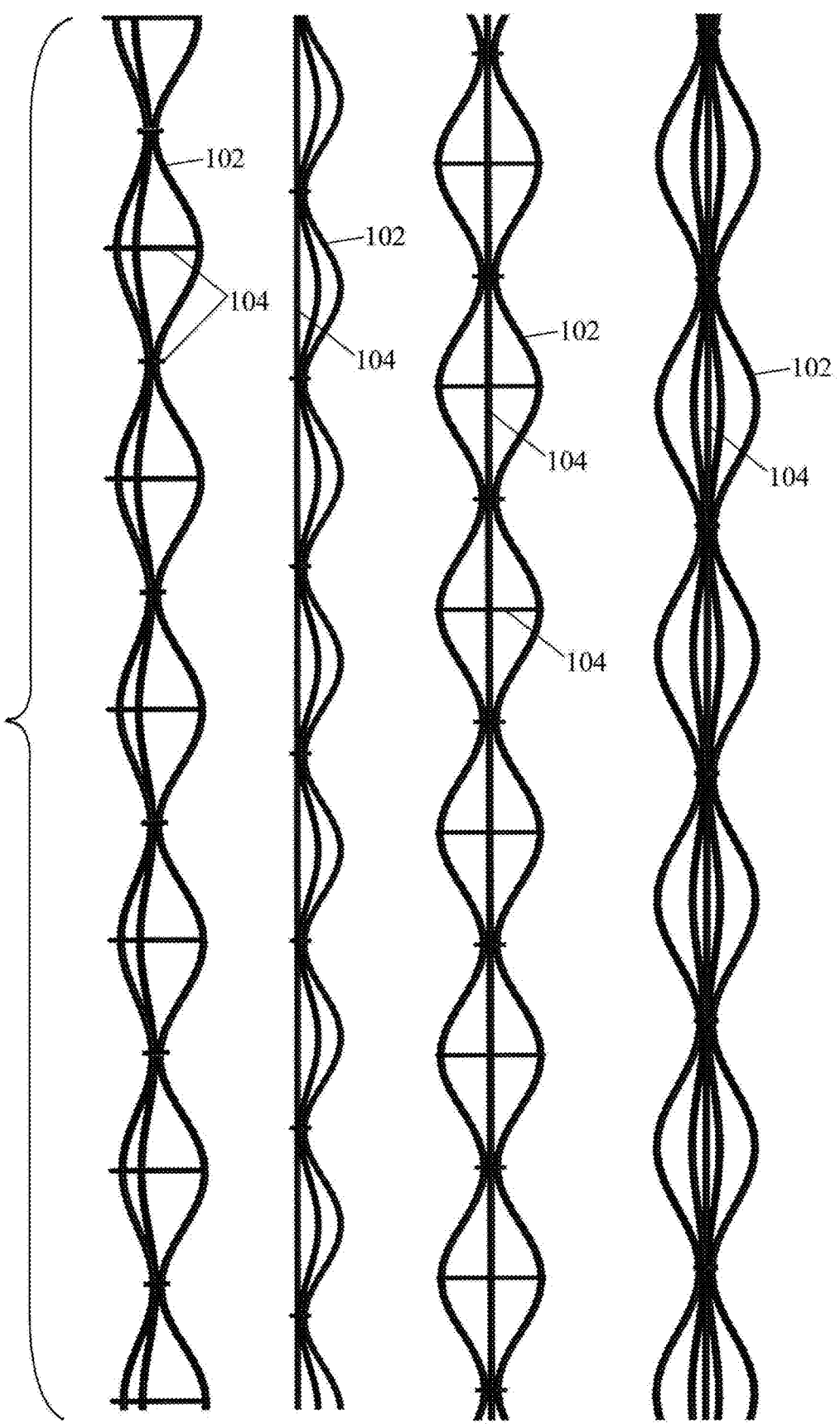
FIG. 7E is an orthogonal view of exemplary sinusoidal structures formed from various sinusoidal shaped members and various support members types.
Figure 7F:
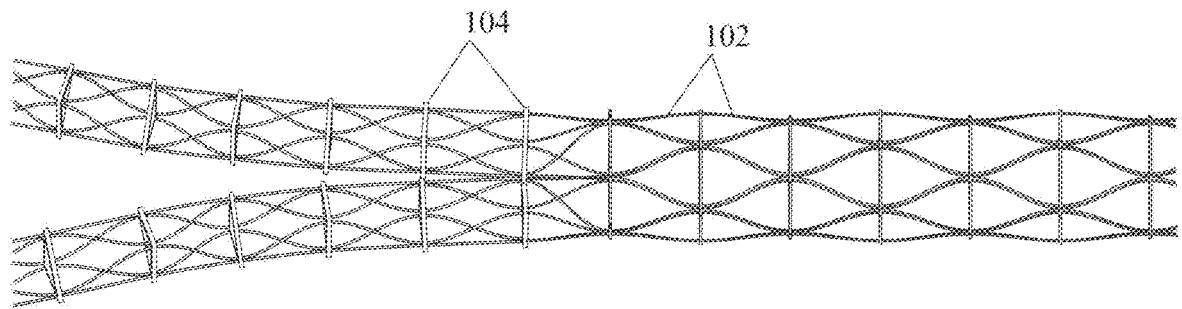
FIG. 7F is a front view of an exemplary sinusoidal structure that exhibits branching.
Figure 7G:
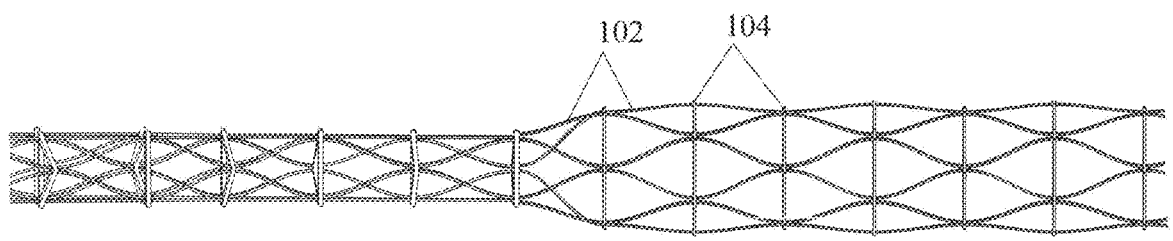
FIG. 7G is a side view of an exemplary sinusoidal structure that exhibits branching.
Figure 7H:
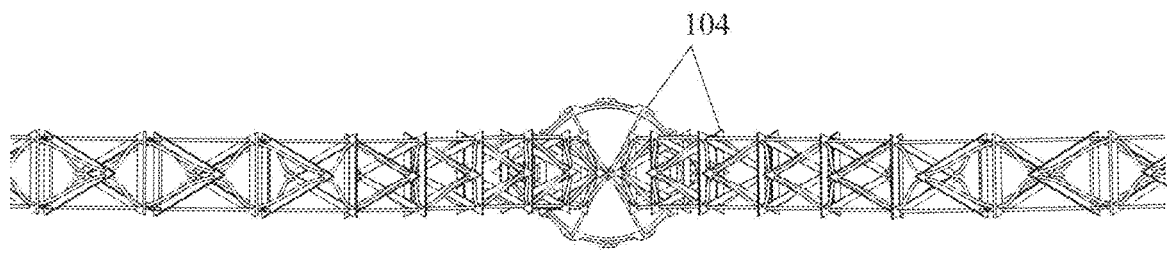
FIG. 7H is a top view of an exemplary sinusoidal structure that exhibits branching.

FIG. 7E depicts various exemplary pre-stressed sinusoidal structures formed from different types and orientations of support members and sinusoidal shaped members.

Figure 7I:
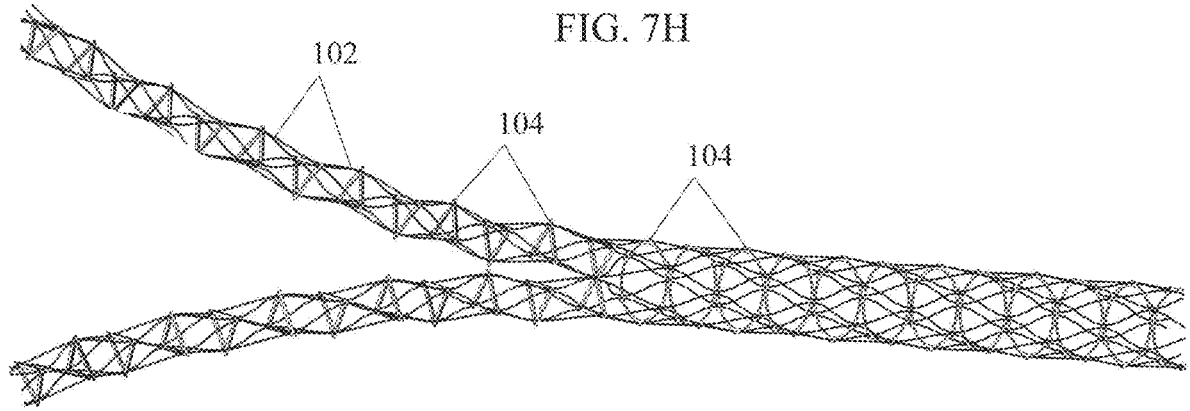
FIG. 7I is a perspective view of an exemplary sinusoidal structure that exhibits branching.

More complex sinusoidal assemblies are also possible. FIGS. 7F-I depict an exemplary sinusoidal assembly that exhibits dichotomous branching. This exemplary structure is composed of 12 sinusoidal shaped members held in a pre-stressed state and oriented using 6-gon support member that follow a trajectory that branches to form sister structures each composed of 6 sinusoidal shaped members held in position by 3-gon support members. FIGS. 7F-I depict the assembly's sinusoidal shaped members (102), each shaped from a single piece of elastic material that extends the length of the assembly. As these sinusoidal shaped members (104) traverse the length of the assembly, they separate into groups to form a branching structure. This separation of the members into groups is facilitated by the support member type and/or design variant used. FIG. 7I depicts the support member (102) types used before and after branching occurs. The sinusoidal shaped member's wave properties may altered as they follow their branching trajectory, specifically at the branching regions where the members separate into groups.

Assembly Orientation and Organization

The presented method of pre-stressing and building includes, but is not limited to, the relative placement (organization) and orientation of sinusoidal shaped members within an assembly in three basic types, planar, radial and n-gon. This method of pre-stressing is possible through the sinusoidal shaped members being oriented, connected and/or interconnected. These orientations are depicted herein. They are specifically presented in FIGS. 8A-F and FIGS. 9A-K in various views, including top views along the assembly's length and/or cross-sectional.

FIGS. 8A-F depict three methods of positioning and orienting sinusoidal shaped members in assembly, linearly, radially and as a closed form polygon respectively. The three exemplary assembly configurations depicted contain pre-stressed sinusoidal shaped members (102) and their associated support members (104). In these examples, the discrete support member unit's geometry is specifically designed to support and hold the sinusoidal shaped members in assembly in a pre-stressed state. The support member's design is specific to the geometry of the given assembly. These exemplary assembly configurations may serve as geometric templates for assemblies containing a plurality and variety of pre-stressed sinusoidal shaped members and support members.

Planar

Figure 8A:
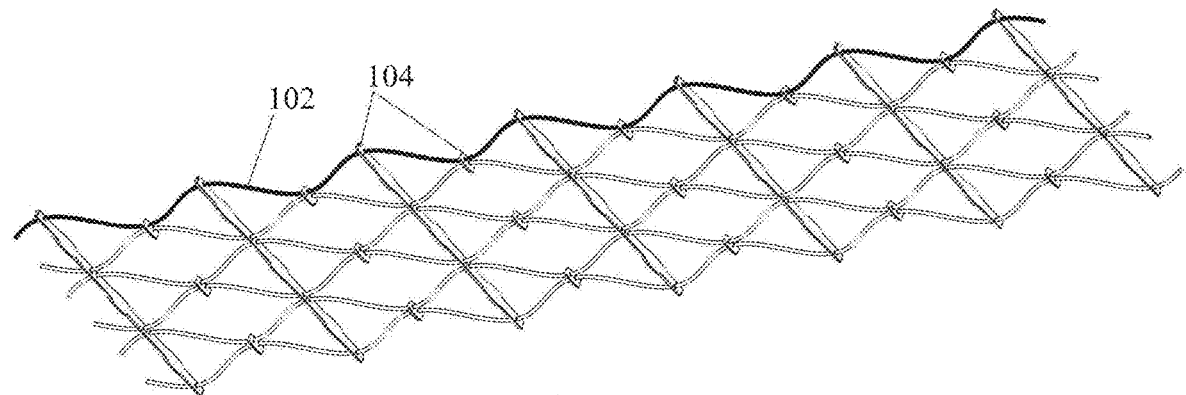
FIG. 8A is a perspective view of an exemplary sinusoidal planar assembly.
Figure 8B:
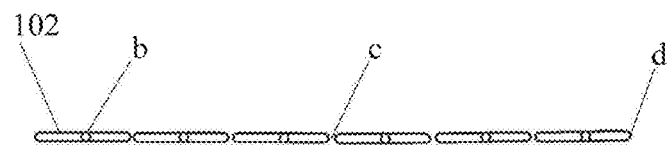
FIG. 8B is a lengthwise top view of the planar orientation and organization of the sinusoidal shaped members in assembly.

FIGS. 8A-B depict six sinusoidal shaped members (102) having planar orientation (parallel to the reference plane) connected longitudinally at their anti-nodes through support members (104). FIG. 8A depicts the sinusoidal plane having a single sinusoidal shaped member shaded. FIG. 8B depicts the planar orientation of the assembly's six sinusoidal shaped members from above lengthwise. Note: the structure's distal anti-nodes (d) may remain unconnected to other sinusoidal members.

Radial

Figure 8C:
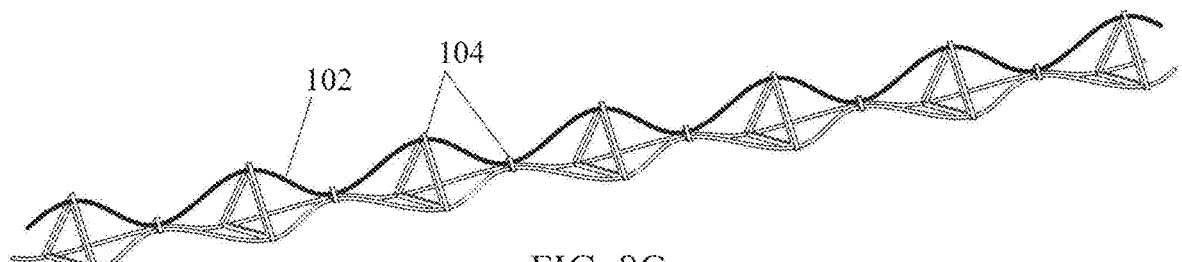
FIG. 8C is a perspective view of an exemplary radial assembly.
Figure 8D:
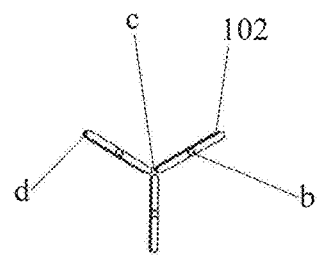
FIG. 8D is a lengthwise top view of the radial organization and planar orientation of the sinusoidal shaped members in assembly.

FIGS. 8C-D depict three sinusoidal shaped members (102) having radially symmetric orientation to the assembly's axis (c). The sinusoidal shaped members are connected longitudinally at their anti-nodes (d) through support members (104). Note: the assembly uses two different support member designs. FIG. 8C depicts the radial symmetric assembly having a single sinusoidal shaped member shaded. FIG. 8D depicts the radially symmetric configuration of the assembly's three sinusoidal shaped members from above lengthwise. Note: the structure's peripheral anti-nodes may remain unconnected to other sinusoidal shaped members.

Polygonal

Figure 8E:
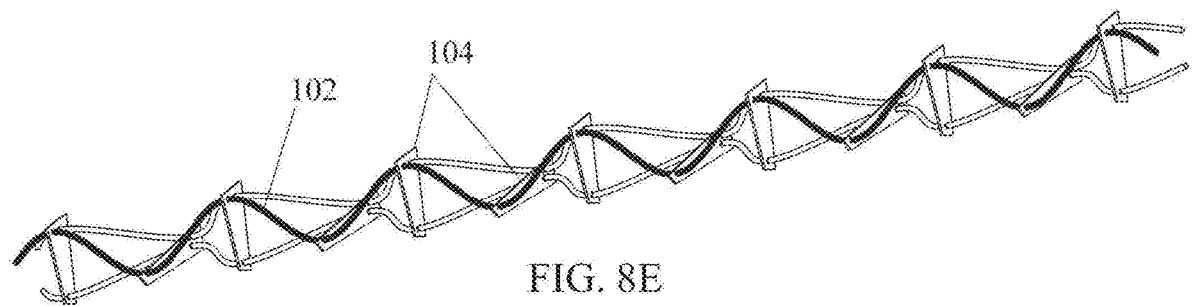
FIG. 8E is a perspective view of an exemplary closed form polygon assembly.
Figure 8F:
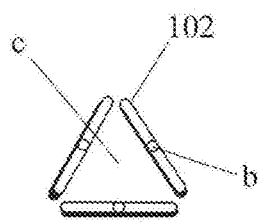
FIG. 8F is a lengthwise top view the 3-gon organization of the sinusoidal shaped members in assembly

FIGS. 8E-F depict three sinusoidal shaped members (102) having an equiangular n-gon orientation connected longitudinally at their anti-nodes (d) through support members (104). FIG. 8E depicts the 3-gon assembly having a single sinusoidal shaped member shaded. FIG. 8F depicts the equiangular regular 3-gon configuration of the assembly's sinusoidal shaped members from above lengthwise. From top view, the sides of the polygon are the profile of the sinusoidal shaped members' orientation and represent their amplitude. FIGS. 8E-F 3-gon assembly is one of many possible closed form polygon geometries. Note: polygonal co-planar sinusoidal organization that is open, closed, regular and irregular are possible.

Figure 9A:
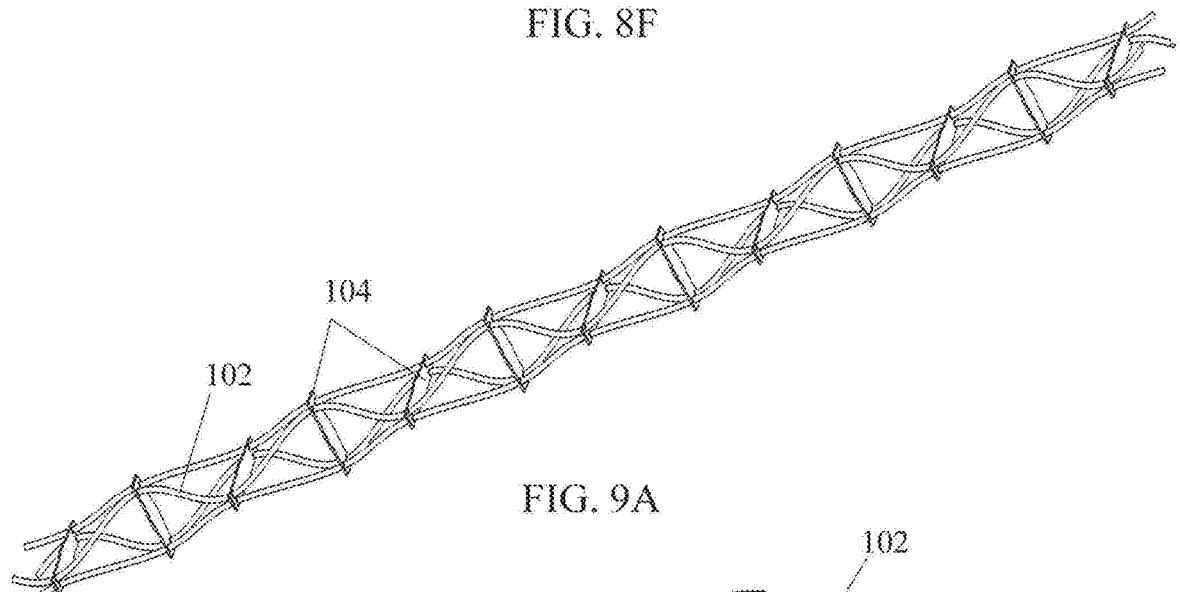
FIG. 9A is a perspective view or an exemplary 4-gon sinusoidal assembly.
Figure 9B:
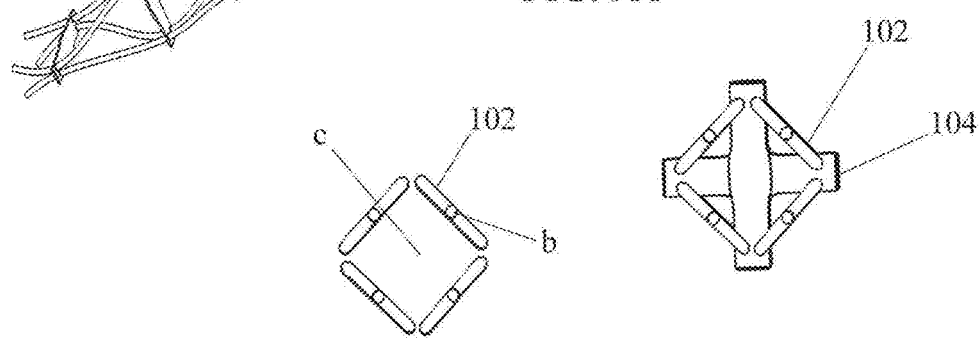
FIG. 9B depicts the sinusoidal shaped members 4-gon configuration in lengthwise top view.
Figure 9C:
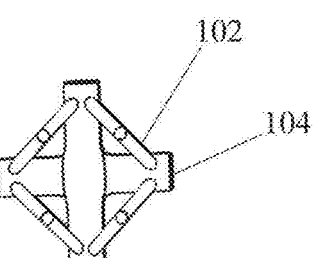
FIG. 9C depicts the sinusoidal shaped members and support member 4-gon configuration in lengthwise top view.
Figure 9D:
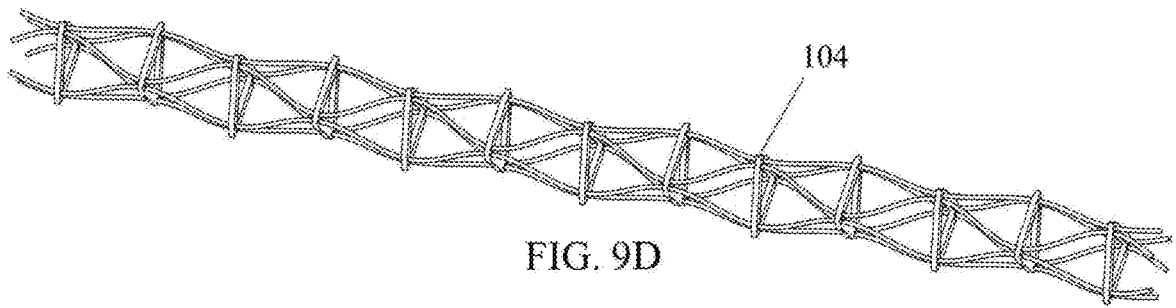
FIG. 9D is a perspective view or an exemplary 6-gon sinusoidal assembly.
Figures 9E, 9F:
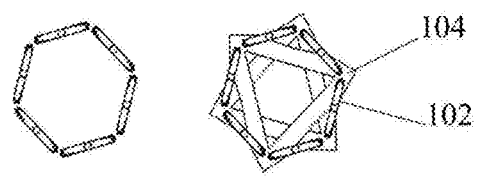
FIG. 9E depicts the sinusoidal shaped members 6-gon configuration in lengthwise top view.
FIG. 9F depicts the sinusoidal shaped members and support member 6-gon configuration in lengthwise top view.
Figure 9G:
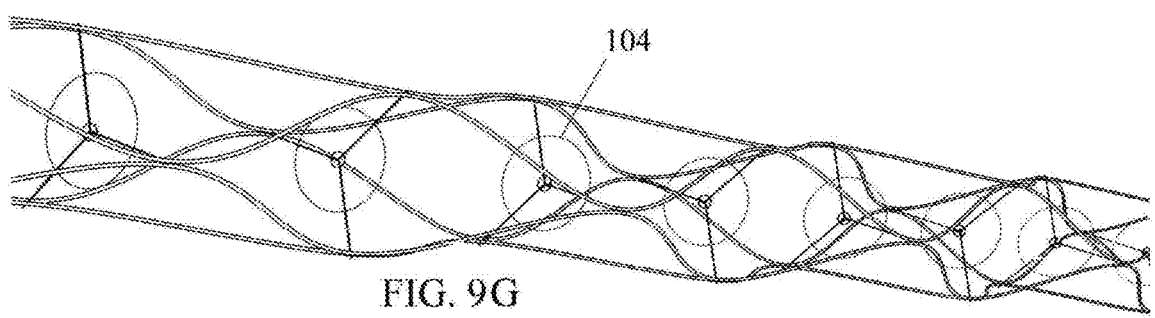
FIG. 9G depicts another closed form polygon assembly in perspective view using a different style of support member.
Figure 9H:
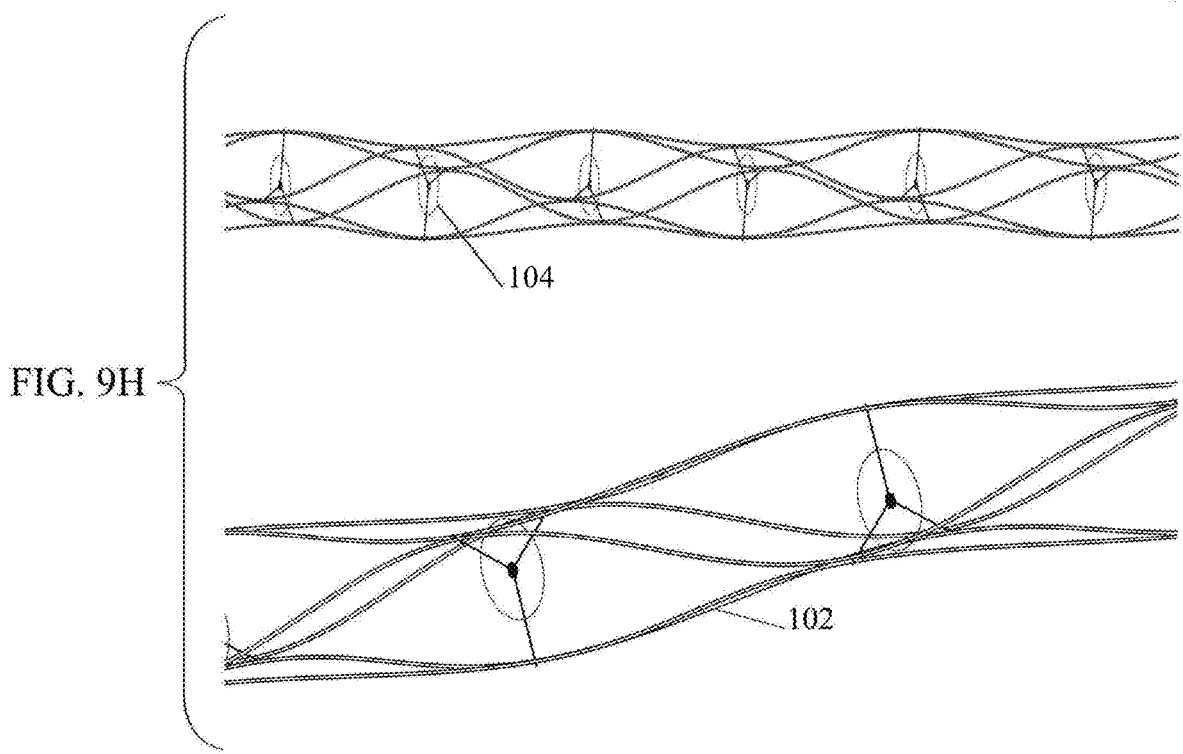
FIG. 9H shows line drawings of the 6-gon test specimen depicted in FIG. 9G.
Figure 9I:
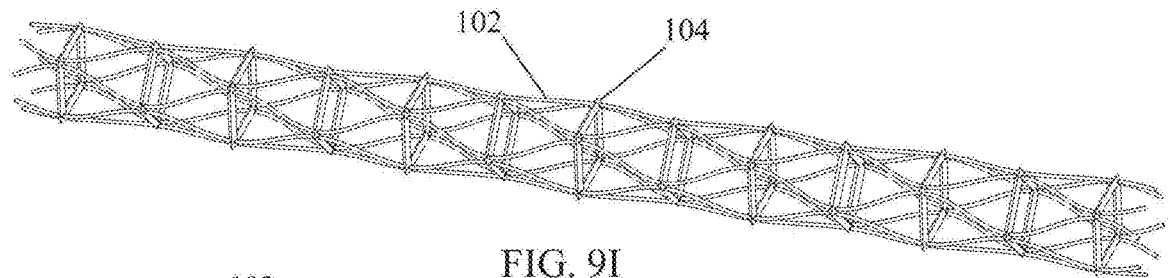
FIG. 9I is a perspective view or an exemplary 8-gon sinusoidal assembly.
Figure 9J:
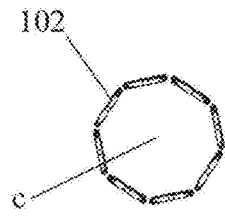
FIG. 9J depicts the sinusoidal shaped members' 8-gon configuration in lengthwise top view.
Figure 9K:
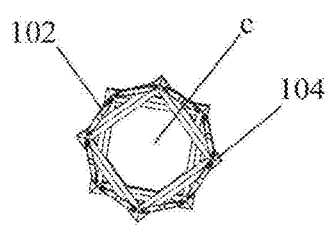
FIG. 9K depicts the sinusoidal shaped members' and support members' 8-gon configuration in lengthwise top view.

FIGS. 9A-K depict 4-gon, 6-gon and 8-gon sinusoidal shaped member configurations. Each of these assemblies is composed of identical sinusoidal shaped members in an equiangular/regular polygon configuration with equal/even numbers of sinusoidal shaped members in an anti-phase orientation. The pre-stressing forces are symmetrical to the assemblies' axes (c). Because the assemblies have evenly distributed internal forces (relative to the centroid axis), there is no distortion to their structure. There is no second order bending. The assemblies depicted in FIGS. 9A-K contain sinusoidal shaped members oriented to form tubular polygons. FIG. 9H are line drawings of a 6-gon test specimen and FIG. 9G is a representative drawing of that specimen. The 6-gon structures depicted in FIGS. 9D and 9G-H use different support member (104) variants to maintain their sinusoidal shaped members' pre-stressed state. The support members depicted in FIGS. 9G-H and FIGS. 15E-F experience similar forces.

The secondary structure is the shape of the assembly; that shape can be deflected or un-deflected. The secondary structure/shape is formed by the assembly's internal pre-stressing forces. A deflected assembly's structure could be a curve, irregular sphere, helix or other geometric shape. The term secondary structure is generally used to describe the shape of biomolecules. The pre-stressing forces within an assembly that can cause a secondary structure to form are similar to the intra-molecular forces (pre-stressing) within a molecule (assembly) that cause a protein to bend and impact its ability to fold and/or buckle.

The exemplary assemblies depicted in FIGS. 8A-F and FIGS. 9A-K may function as sub-assemblies and/or serve as geometric templates used to a form complex lattice and/or adaptable structures containing large numbers of discrete parts assembled according to a prescribed geometry.

Structures labeled as sub-assemblies can exist as discrete assemblies and sub-assemblies. They may also share parts with adjacent "sub-assemblies" when part of a greater lattice assembly, making them indiscrete structures when in the greater assembly. Sub-assemblies may serve as the actual building blocks for a lattice or be utilized as engineering design project tools in the conception of a lattice.

Figure 10A:
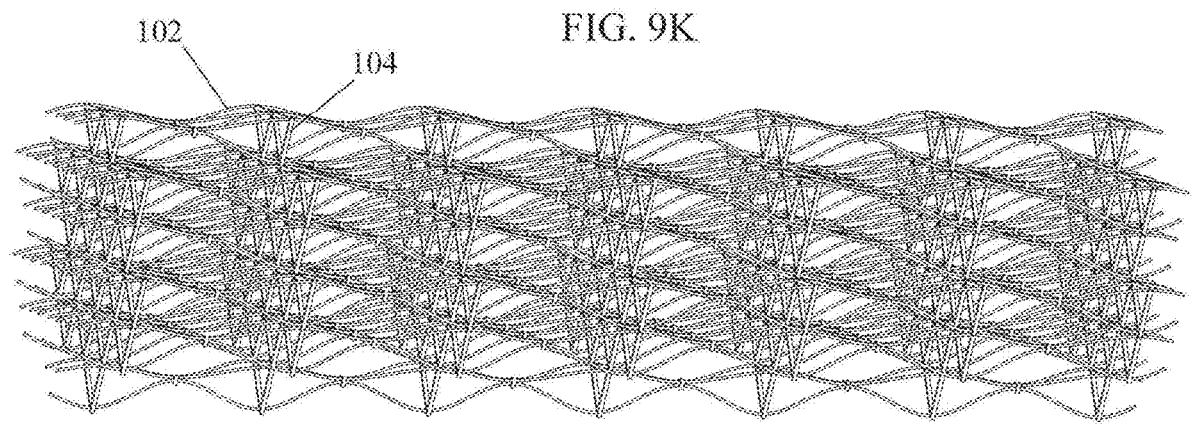
FIG. 10A is a perspective view of a flexural lattice assembly.
Figure 10B:
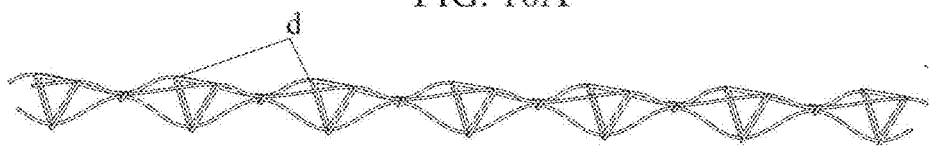
FIG. 10B is a perspective view showing one of the flexural lattice's twenty-one sub-assemblies.
Figure 10C:
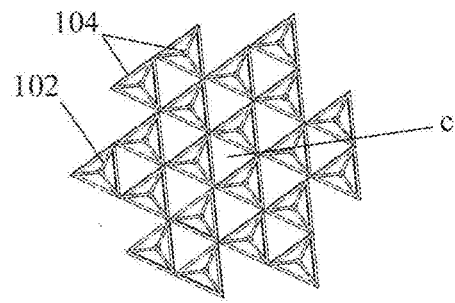
FIG. 10C is a lengthwise top view of the lattice assembly.

FIGS. 10A-C depict aspects of a pre-stressed flexural lattice structure. The lattice assembly depicted in FIG. 10A is formed from a number of sub-assemblies having radially symmetric geometry. A single component sub-assembly that forms the lattice is depicted in FIG. 10B. The sub-assemblies join one to another at their distal anti-nodes (d) through support members to form the lattice assembly. FIG. 10C depicts the lengthwise top view of this lattice.

Figures 11A, 11B:
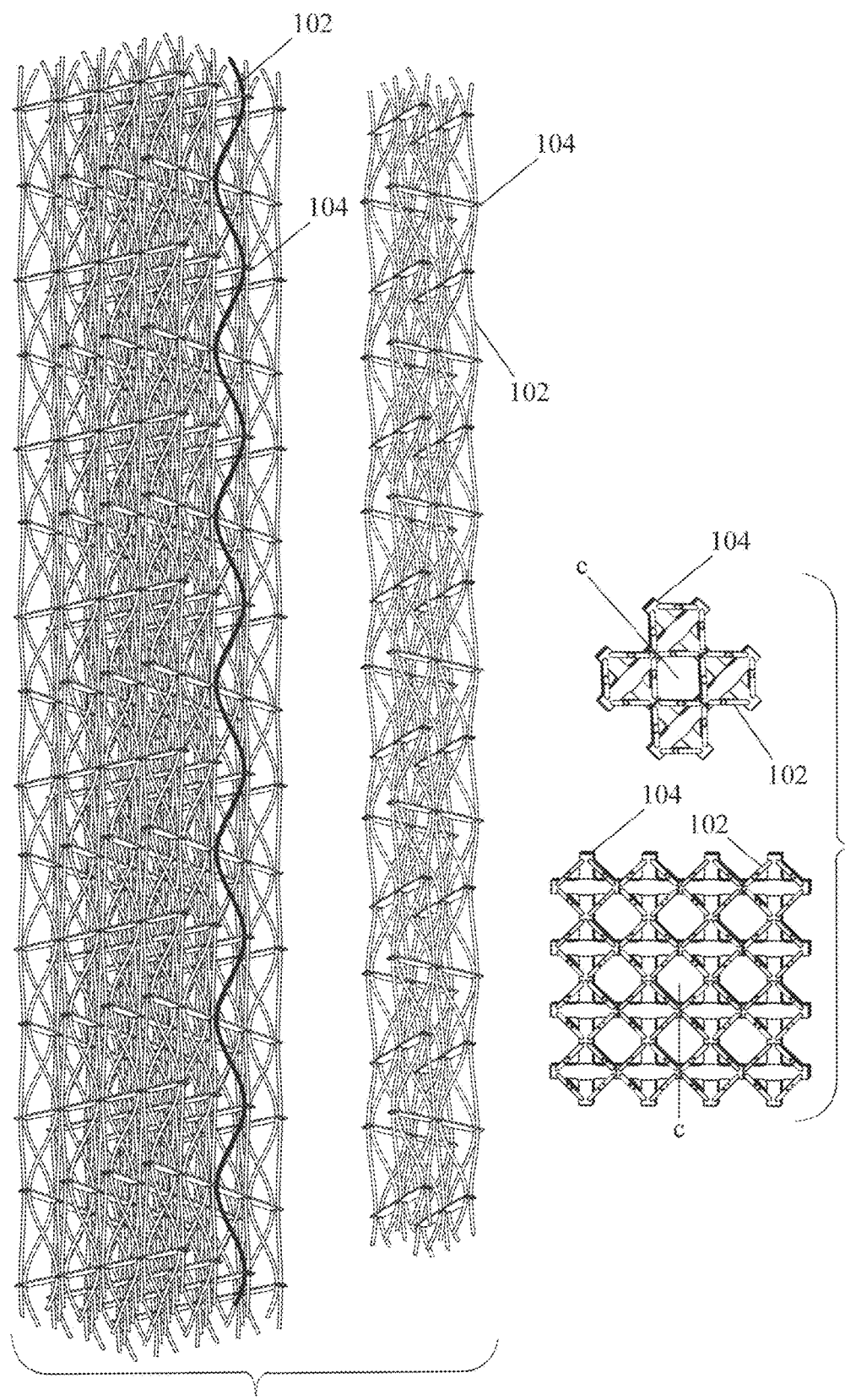
FIG. 11A shows perspective views of two flexural lattice assemblies built from 4-gon sub-assemblies.
FIG. 11B shows lengthwise top views of these lattice assemblies; this includes the sinusoidal shaped members and support members.

FIGS. 11A-B depict pre-stressed flexural lattice structures of regular 4-gon geometry. The lattice geometry is defined by the sinusoidal members' parallel orientation forming a regular four sided polygon pattern. A single sinusoidal support member in the assemblies is shaded. FIG. 11B depicts the lengthwise top views of the lattice structures.

Within the network of internal forces that may exist in a complex pre-stressed assembly, torques may exist that force an assembly to take on a secondary shape. Force couples can result in a torque and can also be put into equilibrium by a moment or another couple of equal magnitude and opposite direction anywhere in the same plane or in a parallel plane within the assembly.

Forces within Assembly

Sinusoidal shaped members in assembly have flexural properties. As depicted in FIGS. 12A-B, flexural regions (f) can exist between the support members (104) within an assembly. The assemblies are punctuated by flexural regions (f). The flexural regions are defined by an assembly's spatial frequency. The support members within the assembly have spatial frequency that corresponds to the sinusoidal shaped member's mathematical curve describing its smooth repetitive oscillation.

The portion of a sinusoidal shaped member that exists between support members composes its flexural regions. The lengths of the sinusoidal shaped members that exist between support members in assembly form that assembly's flexural regions. A flexural region can form a length of sinusoidal assembly encompassed by a number of support members. A flexural region's length can be defined by the distance between the terminal support members that punctuate it. A flexural region requires at least two support members.

The tubular (12-gon) assembly depicted in FIG. 12A has sinusoidal shaped members that are oriented along its length and ring type support members having period placement. In FIG. 12B the sinusoidal shaped members are also oriented along the length of a tubular (12-gon) assembly, but the support members used are struts/ties and as shown unable to maintain the pre-stressed shape depicted without additional support members. An example of a similar system being supported using an additional (inflatable) member is depicted in FIG. 18C.

FIG. 12C depicts circumferentially oriented sinusoidal shaped members (one is shaded) in a cylindrical/tubular assembly. The orientation of the sinusoidal shaped member in relation to an assembly's axis changes the orientation of the spatial frequency and flexural regions. The orientation of the flexural regions will affect an assembly's structural property. FIGS. 12A-B show one sinusoidal shaped member as shaded.

Figure 13A:
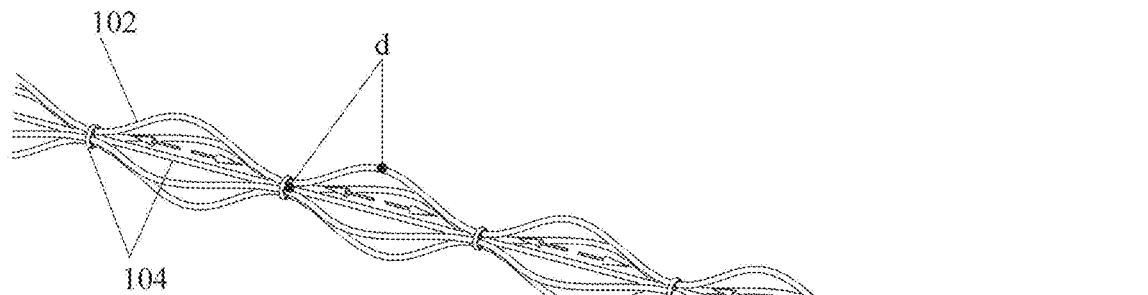
FIG. 13A is a perspective view of an assembly having radially oriented sinusoidal shaped member and free antinodes because it uses an axial support member.
Figure 13B:
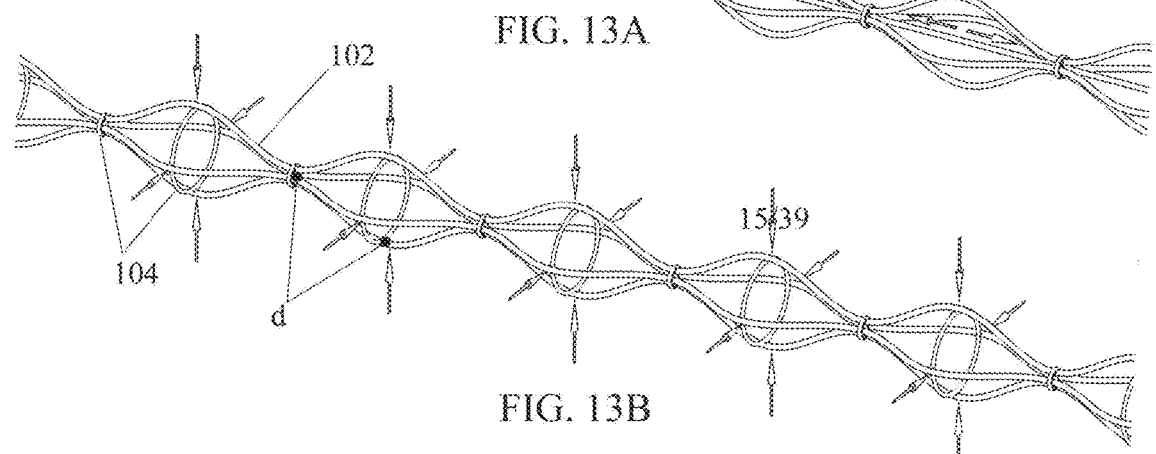
FIG. 13B is a perspective view of an assembly having radially oriented sinusoidal shaped member with antinodes attached to ring type support members.

As depicted in FIGS. 13A-B, an assembly may or may not contain an axial support member. FIG. 13A depicts an assembly having an axial support member (104) that extends the length of the structure. This central axial support member is under tension and functions similarly to the periodically placed ring shaped support members (104) depicted in FIG. 13B. These ring-shaped support members are under compression. The pre-pressing forces imposed on the support members by the sinusoidal shaped members are represented as force arrows. If the sinusoidal shaped members have identical dimensions and mechanical properties, the forces experienced by the support members depicted in FIG. 13A and the forces experienced by the support members depicted in FIG. 13B are equivalent.

The tensile stress experienced by the axial support member depicted in FIG. 13A can be uniformly distributed (normal stress) or periodically distributed (localized stress) along its length. If an axial support member is only fixed to the sinusoidal shaped member's ends and allowed to float within the rest of the assembly's length, the tensile force is evenly distributed along the assembly's length. If the axial support member is periodically fixed to the sinusoidal shaped member (102) at its anti-nodes (d), the axial support member's (104) tensile stress will be periodic, and in effect the axial support member becomes a series of members experiencing localized tensile stress. If the assembly experiences a transverse load or loads the axial member being fixed or unfixed to the sinusoidal shaped members' anti-nodes will affect the assembly's flexural strength. The assembly depicted in FIG. 13A has free anti-nodes and is considered an unsaturated assembly. Its linear support member's position conforms to the assembly's neutral axis.

Figure 14A:
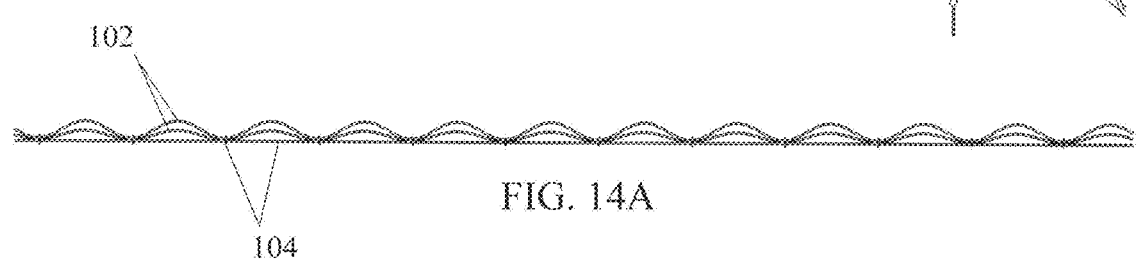
FIG. 14A is a orthogonal view of an un-deflected assembly.
Figure 14B:
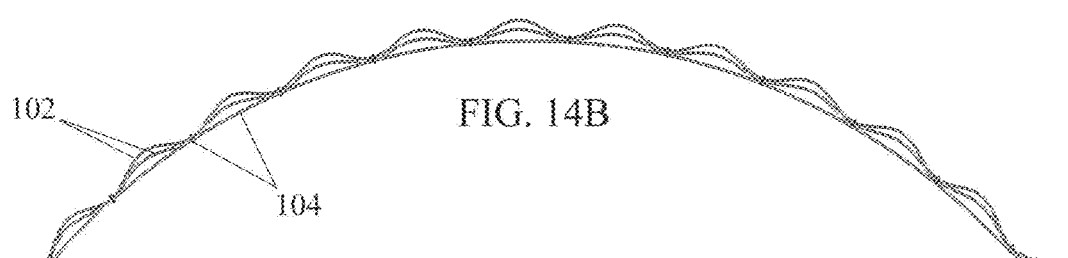
FIG. 14B is a orthogonal view of a deflected assembly.
Figure 14C:
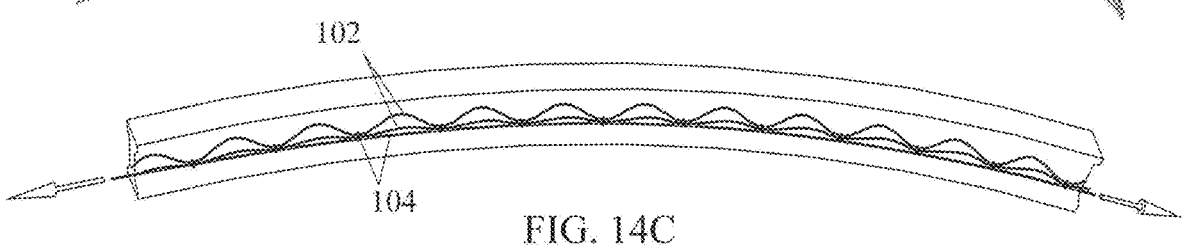
FIG. 14C is a perspective view of a deflected assembly imposing forces on a solid body.

Support members (104) in an assembly can vary in type and design, but all have a similar function. Support members function to hold the sinusoidal shaped members in a pre-stressed state and function to transfer forces among the elastically deformed sinusoidal shaped members within assembly. If an assembly's internal forces are evenly distributed and correspond to the assembly's center of mass/centroid axis, the assembly may be an un-deflected structure. If an assembly's internal forces are unevenly distributed and do not correspond with the centroid axis, the assembly will be a deflected structure. FIGS. 14A-B depict an assembly having pre-stressing forces (internal forces) that are unevenly distributed and do not correspond to its centroid axis. The uneven distribution of forces in relation to the assembly's centroid axis results from the sinusoidal shaped members (102) not transferring their pre-stressing force equally to the anti-phase oriented sinusoidal shaped members in the assembly. The transfer of those internal forces from one sinusoidal shaped member to another occurs through the support members (104). FIG. 14A depicts an assembly having pre-stressed sinusoidal shaped members that are oriented to cause the assembly's neutral axis and centroid axis not to converge. This causes the assembly to deflect as depicted in FIG. 14B. A deflected assembly could function as a shaped and pre-stressed structure designed to have specific degrees of freedom and/or function under specific load applications. For example, FIG. 14C depicts a deflected assembly being used to pre-stress a solid material beam. The pre-stressed and pre-deflected assembly is held and encased/cast within a solid material (like concrete or foam) shape that is designed to accept a directional load. The axial support member (104) extends the length of the pre-deflected assembly and is placed under tension prior to it being encased. The axial support member is later released transferring its internal forces to the surrounding material.

Support Members in Assembly

Support members can control the organization of the sinusoidal shaped members in assembly. Support members are the assemblies' scaffold. By analogy, support members (104) and scaffolding molecules serve similar functions and experience similar forces in assembly. An analog may be the role histone and non-histone scaffolding proteins play in the formation of the chromosomal structures. As in the scaffold loop model of chromosomes, where the scaffolding proteins determine the shape of the native meta-phase chromosomes and function as a basis for organizing the chromatin in specific domain loops. It is proposed that during chromosome condensation, domain loops organize under stress into a regular sinusoidal structure. Like sinusoidal shaped members and support members in assembly, the structure of a chromosome contains mechanical stress and that stress may be organized having a sinusoidal form.

FIGS. 15A-I presents examples of pre-stressed assemblies having a variety of support member designs. Support members may be flexural members subject to tension, compression and bending within their structure. A support member design functions to efficiently support, hold and shape sinusoidal members. Support members may experience compressive, tensile and/or shear forces. They may also have flexural strength. Support members (104) may take on a variety of forms based on their support function.

Support members may connect to and be fixed to sinusoidal shaped members or connect to and allow the sinusoidal members to articulate within their body, i.e. the sinusoidal shaped member may rotate within the support member or be fixed to it. Support member types may be but are not limited to linear struts, tension rings, compression rings, inflatable members and n-gon forms. Note: polygonal shaped support members that are open, closed, regular and irregular are possible.

Support member design and construction requires the consideration of multiple factors. The design and fabrication process will generally include considerations: 1) design requirements, 2) likely failure modes, 3) stress analysis, 4) material selection and behavior, 5) fabrication, and 6) testing.

FIGS. 15A-I present the variety of support member types and designs used to hold and support sinusoidal shaped members in assembly. FIGS. 15A, 15D, 15E, 15H and 15I depict complete assemblies having various engineered support member designs (15H-I depict unsaturated assemblies). FIGS. 15C, 15B, 15F and 15G show the orientation (all have the same orientation) of sinusoidal shaped members in assembly and also top views of the complete assembly including the support members.

FIGS. 15A-B depicts an assembly made up of nine sinusoidal shaped members and thirteen support members. These support members may be described as being a combination of regular n-gon struts. The slender sinusoidal shaped members in this assembly all have the same wave parameters and their pre-stressing forces are evenly distributed within the assembly. There is no deflection.

FIGS. 15C-D depicts an assembly with support members having the flexural-torsional properties of a ring or circular arch. An assembly's support members' versatility is seen in the context of the overall engineering design project goals. For example, in order to achieve a reduction in weight, increase in flexural strength, reduction in cost, specific load capacity, range of flexural behavior and flexural strength, the engineering design, material composition, and methods of fabrication must all be considered.

FIGS. 15E-F depicts an assembly made up of nine sinusoidal shaped members and thirteen support members (104). These support members can be described as having the tensile and compressive strength of a ring and/or strut.

FIG. 15G-I depicts assemblies formed from support members that do not require a connection be made to all the available anti-nodes (d) within the structure. In these assemblies, the sinusoidal shaped members maintain their pre-stressed shape while having free anti-nodes (d). An assembly having free anti-nodes is considered unsaturated and may have physical and behavioral properties that a saturated assembly does not. Assemblies having free anti-nodes may be well adapted to form flexural mechanisms.

FIG. 16A-D illustrates the articulation and flexural buckling of an unsaturated beam assembly in a progression sequence. Along with being more flexible than an assembly having saturated anti-nodes, an assembly with unsaturated/free anti-nodes may function as a device/mechanism that buckles and/or folds. The slender sinusoidal shaped members in assembly make this possible. As shown in FIGS. 16A-D, when a free anti-node region is increasingly compressed, the slender sinusoidal shaped member increasingly bends, twists and buckles to form a slender loop. This torsion flexural buckling behavior may function within an assembly as a singular flexure mechanism or function in groups as a method of morphing a lattice. A structure capable of buckling can have two stable states, unbuckled and buckled as depicted in FIGS. 16A and 16D. This state of being snap buckled is an equilibrium state that can be maintained in the assembly a length of time and may be reversible. The assembly may embody parts in different states of equilibrium including stable equilibrium, unstable (or labile) equilibrium, and metastable equilibrium. The state of stable equilibrium (the stable state) can be characterized by being brought out of the state of stable equilibrium by some external disturbance (force). When this disturbance is removed, the system will return to the initial state of equilibrium by itself. If a system is in a state of unstable equilibrium (the labile state), the system will not return to the initial state and will pass into a new state, a state of stable equilibrium. Even the slightest external disturbance (force) can be sufficient to move a system out of its state of labile (unstable) equilibrium. Finally, the state of relatively stable equilibrium (the metastable state) is defined as the state in which a system remains for a long period of time, and any slight disturbance causing the system to deviate from the metastable state does not result in the system passing into another state; as soon as the external disturbance (force) is removed, the system will return into the initial metastable state. On the other hand, a sufficiently strong disturbance will put the system out of the metastable state, and the system will pass into a new state of stable equilibrium. Thus, the metastable state is intermediate in relation to the stable and unstable states.

FIG. 17 depicts an assembly containing various support member (104) types and designs engineered to maintain its sinusoidal shaped members' pre-stressed state. By combining various types of support members, including but not limited to, n-gons, rings, struts, inflatables and axial support members in the same assembly, diverse structural and mechanical applications can be served. Those applications can range from complex morphing lattice structures to simple compliant mechanisms.

Unlike the previous examples, FIGS. 18A-B depicts an assembly having support members that are oriented parallel and/or not perpendicular to the longitudinal axis of the assembly. These support members do not transect the axis of the assembly and attach to the sinusoidal shaped members at their anti-nodes. FIG. 18A shows a single sinusoidal shaped member shaded within the assembly. FIG. 18B is a close up depicting the orientation of the support members in assembly. The ring type support members depicted in FIGS. 18A-B may have flexural strength, exhibit flexural behavior and store elastic potential energy when in assembly. A support member's orientation within an assembly is not limited to being orthogonal, perpendicular or parallel to the assembly's axis.

Support members having the ability to expand and contract may also function to maintain the sinusoidal shaped members in assembly. FIG. 18C depicts an assembly having an inflatable support member (104) that is axially oriented and applies the force required to maintain the shape of the pre-stressed sinusoidal structure. FIG. 18D depicts the assembly having relaxed members (104) and strut type support members (104) prior to the inflation of its inflatable support member and the application of force to the rest of the assembly. As force is applied to the structure, the strut and/or the support members experience tensile stress. The Inflatable tubular support member's diameter changes in sync with the wavelength and amplitude of the sinusoidal shaped members in assembly.

An inflatable support member design may take on a verity of shapes and the inflation dynamics of an inflatable structure may be enhanced when used to support a sinusoidal structure. The inflatable support member and the other components in assembly may interconnect during assembly to guide one another's formation.

Sinusoidal Shaped Members in Assembly

Amplitude

Figure 19A:
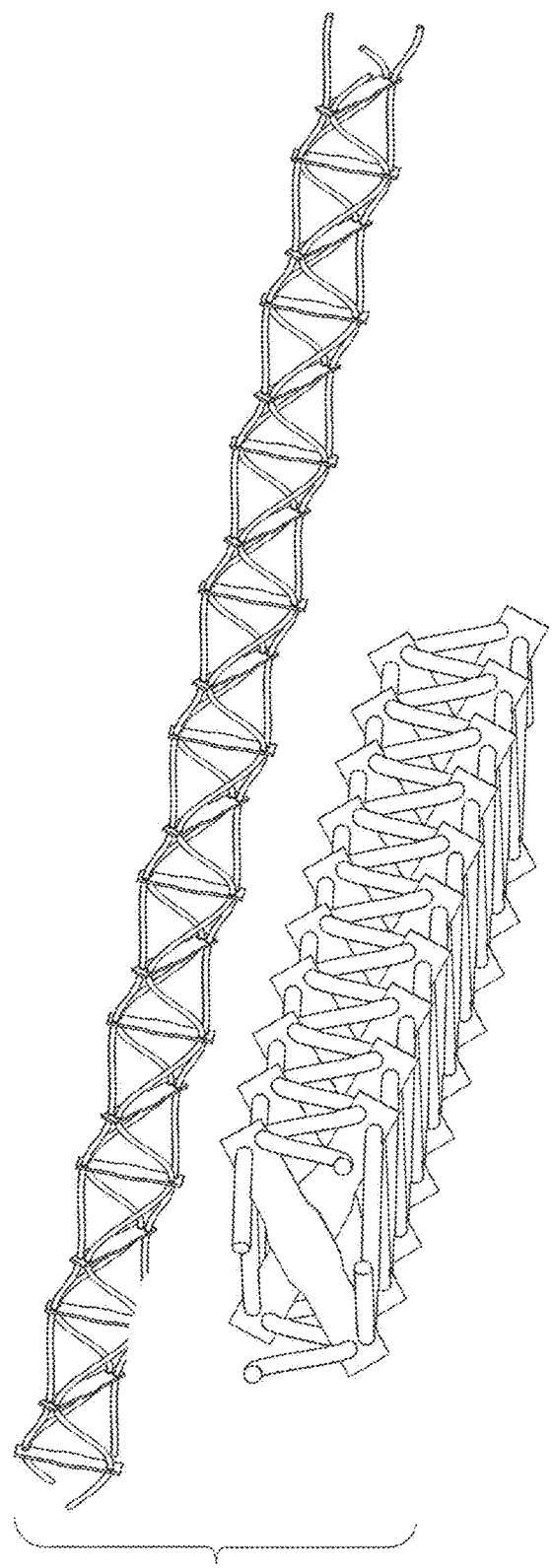
FIG. 19A shows two perspective views of a flexural beam assembly composed of sinusoidal shaped members having two different amplitudes.
Figure 19B:
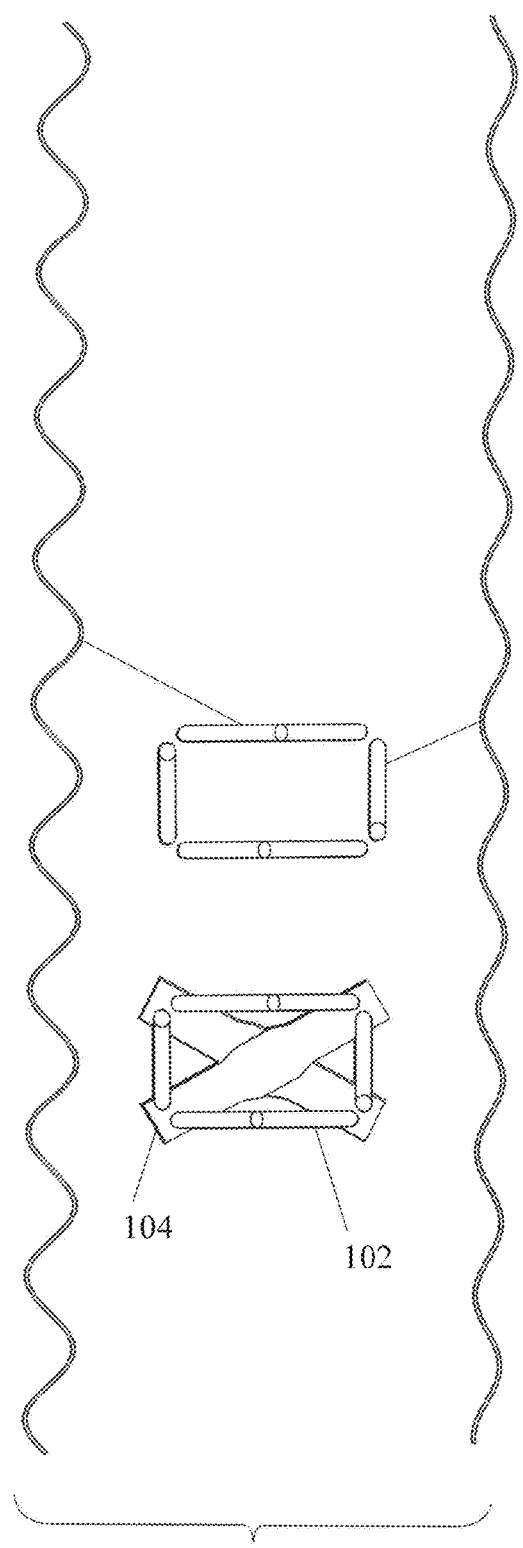
FIG. 19B shows orthogonal views of the sinusoidal members of different amplitudes and also lengthwise top views of the sinusoidal members in assembly.

Sinusoidal shaped members having the same spatial frequency may interconnect at their anti-nodes through support members independent of their amplitude to form an assembly. For example, FIGS. 19A-B depict four pre-stressed sinusoidal shaped members in assembly, all having the same wavelength and two different peak to peak amplitudes. In this example, strut support members are used to connect and hold the members in a pre-stressed state. The sinusoidal shaped members (102) in assembly depicted in FIG. 19A are pre-stressed into two different shapes and specific amplitudes. There are two sinusoidal shaped members of the specific amplitudes represented in the assembly. Their amplitudes may reflect the amount of stored potential energy their elastically deformed material contains if the members all have the same material properties. FIG. 19B depicts the two different amplitudes represented by the sinusoid members in assembly and top views of the assembly. The sinusoidal shaped members of the same amplitude values are oriented parallel to one another to form a prismatic beam assembly having rectangular cross-section. In this polygon orientation, the pre-stressing forces are symmetric in relation to the centroid axis and neutral axis of the assembly. The orientation of even/balanced number of sinusoidal members having identical amounts of stored elastic energy along the assembly's axis allows the structure to be pre-stressed, balanced and un-deflected. Combinations of sinusoidal shaped members with different amplitudes cannot form equilateral or regular polygon cross-sections.

Wavelength/Spatial Frequency

Sinusoidal shaped members having the same amplitude may interconnect at their anti-nodes independent of their wavelength and/or spatial frequency to form an assembly. For example, FIGS. 20A-B depict six pre-stressed sinusoidal shaped members in assembly, all having the same amplitude and two different wavelengths. In this example, strut support members connect, support and hold the sinusoidal members in a pre-stressed state. The sinusoidal shaped members (102) in assembly depicted in FIG. 20A are pre-stressed to form shapes having two different wavelengths. There are four members of one wavelength and two of another. FIG. 20B depicts the top view of the assembly. The sinusoidal shaped members having different spatial frequency are oriented parallel to one another to form a prismatic beam assembly having 6-gon cross-section. In this regular polygon orientation, the pre-stressing forces are symmetric to the axis of the assembly. The orientation of an even number of sinusoidal members having identical amounts of stored elastic energy along the assembly's axis allows the structure to be pre-stressed, balanced and un-deflected. Combinations of sinusoidal shaped members having different amplitudes cannot form equilateral or regular polygon cross-sections.

Sinusoidal shaped members having different spatial frequencies and different amplitudes may also connect to form an assembly. The interconnection of sinusoidal shaped members having a range of physical wave parameters may result in the deformation of these members' sinusoidal shape, for example, the skewing of the interconnected wave forms in assembly. The distortion or skewing of the sinusoidal members results from the transfer and equalization of forces from one member to another within the assembly.

Phase Relationship

Sinusoidal shaped members having predetermined wavelengths and/or amplitudes along with the required support member designs could be interconnected independent of phase relationship to form an assembly. The possible combinations and orientations of sinusoidal shaped members and support members is vast.

Sinusoidal shaped members of the same wavelength may connect at their anti-nodes while having different phase relationships. For example, FIGS. 21A-B depict radially symmetric assemblies containing four identical sinusoidal shaped members. In FIG. 21A the sinusoidal shaped members in assembly all have an anti-phase relationship. In FIG. 21B the sinusoidal shaped members in assembly form wave pairs having an anti-phase relationship and these pairs are also 180 degrees out of phase. In both these examples (FIGS. 21A-B) the assembly's proximal anti-nodes (central) (d*) connect to an axial support member (104) and the distal anti-nodes (peripheral) (d) are free and not connected to a support member (104). FIG. 21A depicts the assembly's sinusoidal shaped members being attached at their anti-nodes in anti-phase and held in a pre-stressed state by support members. FIG. 21B depicts the assembly's two pairs of pre-stressed sinusoidal shaped members 180 degree out of phase and connected at their anti-nodes through an axial support member (104) that is under tension. The sinusoidal shaped member forming pairs are connected anti-phase. The two wave pairs are oriented 90 degrees in relation to one another along the assembly's axis. These sinusoidal shaped members are 180 degrees out of phase and not skewed or distorted in the assembly. The pre-stressing forces in FIGS. 21A-B are symmetric to the assembly's axis. The axial support members depicted in FIGS. 21A-B are shown shaded.

Figure 22A:
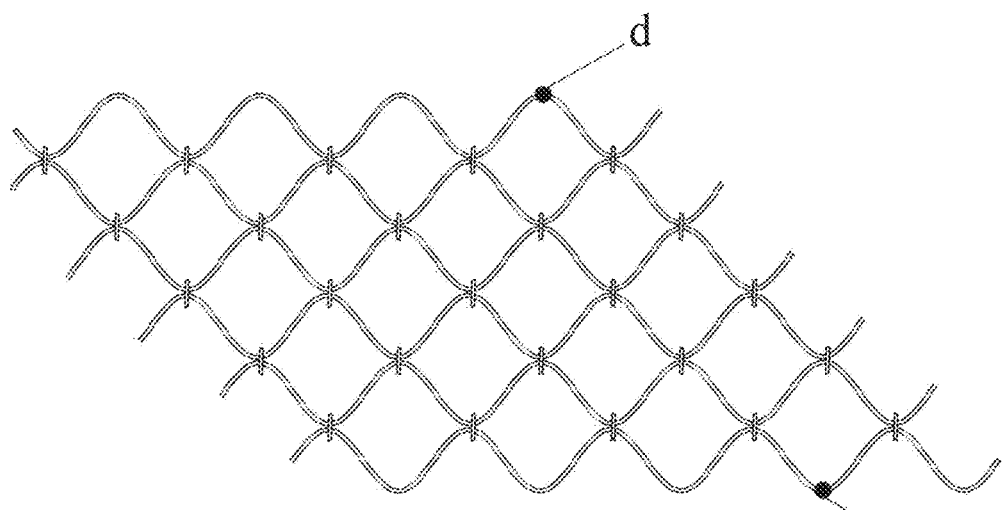
FIG. 22A is an orthogonal view of a sinusoidal plane organized to form a sinusoidal structure with members that are out of phase.
Figure 22B:
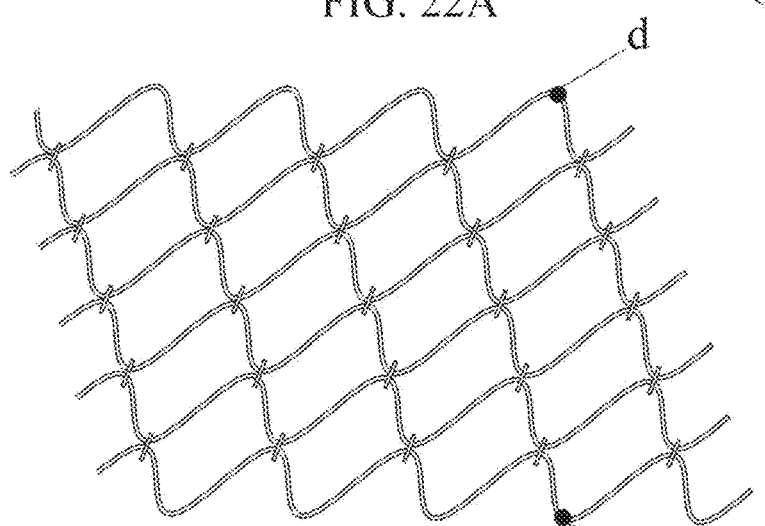
FIG. 22B is an orthogonal view of the sinusoidal plane being deformed to become an n-gon tube.
Figure 22C:
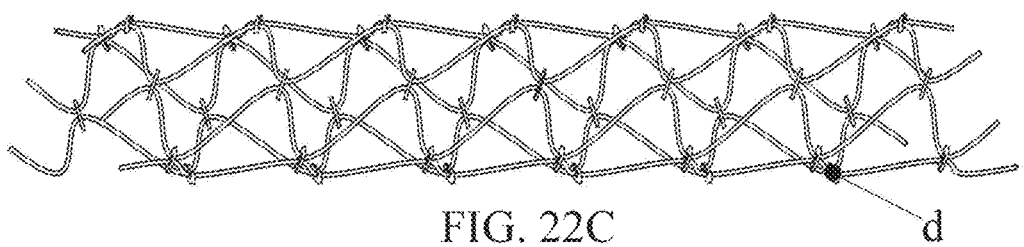
FIG. 22C is an orthogonal view of the sinusoidal plane formed into a tube composed of skewed sinusoidal members.
Figure 22D:
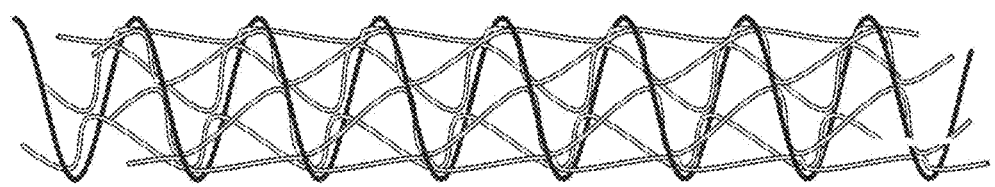
FIG. 22D is an orthogonal view of a sinusoidal tube depicting its helical secondary structure.

Another method of connecting sinusoidal shaped members out of phase is by distorting them. An example would be the formation of a closed (helical) polygonal assembly from a planar structure. FIG. 22A-D illustrates the sequential articulation of a plane formed from sinusoidal shaped members that are out of phase into a closed n-gon (tube). The out of phase sinusoidal shaped members orient to form a closed n-gon shape that is helical and pre-stressed. Unlike FIG. 21B this method of connecting sinusoidal shaped members out of phase distorts their wave form in assembly. Points identify reference anti-nodes (d) that can be followed to show the trajectory of the plane's distortion and the sinusoidal shaped members out of phase relationship in assembly. FIG. 22A depicts the assembly as an undistorted plane prior to it becoming closed, out of phase and distorted. The six identical pre-stressed sinusoidal shaped members are connected at their anti-nodes. FIG. 22B depicts the sinusoidal shaped members planar assembly distorted out of phase a total of 360 degrees. FIG. 22C depicts the plane as a closed form 360 degrees out of phase. The sinusoidal waveforms must distort to accommodate the out of phase relationship. The sinusoidal members are skewed in the assembly and form a sawtooth waveform. FIG. 22D superimposes a helical shape over the assembly to emphasize the geometry created by the sinusoidal shaped members' out of phase relationship. The assembly's helical geometry may give it useful flexural properties (flexural strength and flexural modulus) not found in assemblies without a secondary structure.

Period

Figures 23A, 23B, 23C, 23D, 23E:
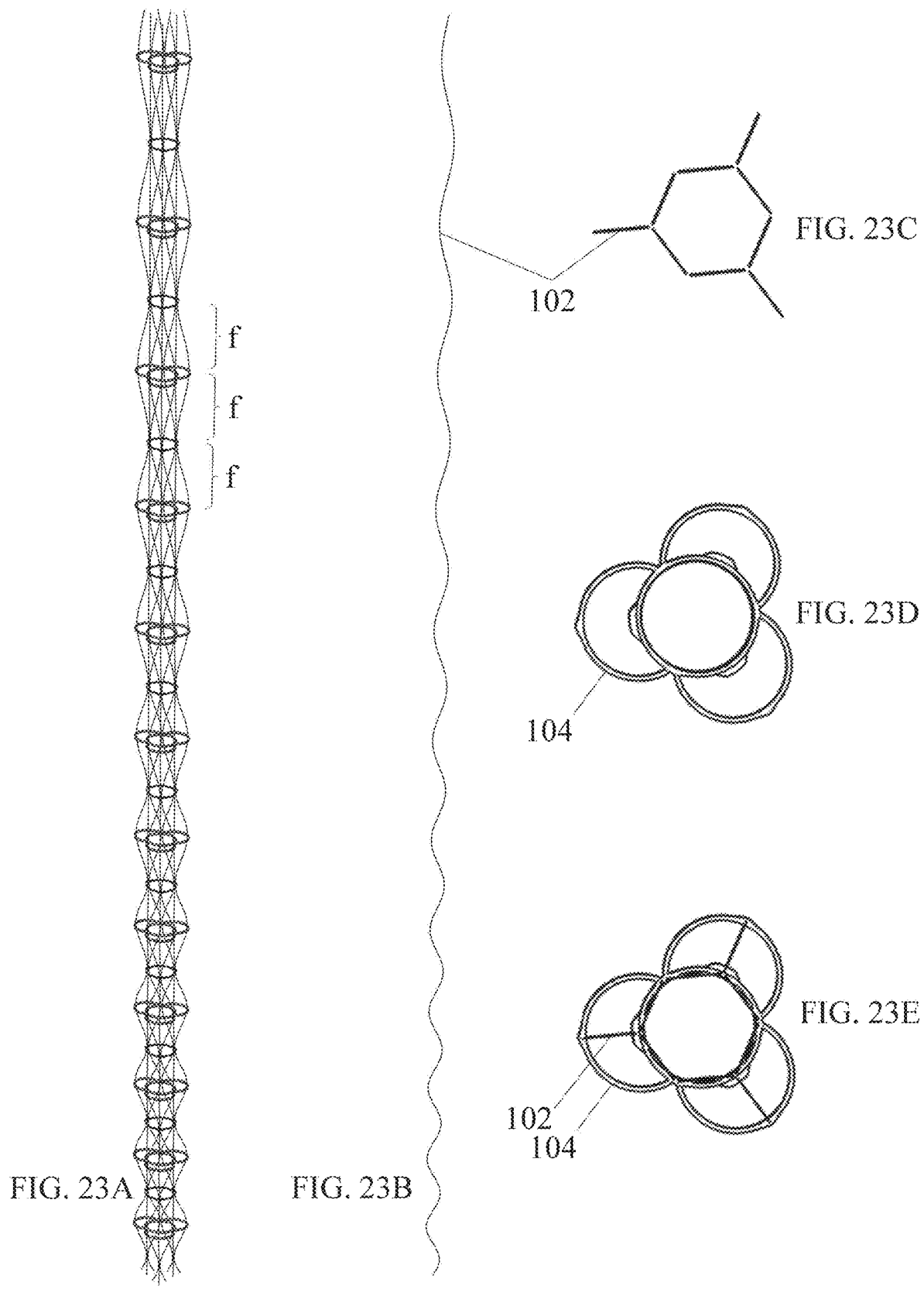
FIG. 23A is a perspective view of a prismatic beam assembly formed from damped sinusoidal shaped members and support members.
FIG. 23B is an orthogonal view of one of the assembly's damped sinusoidal shaped members.
FIG. 23C is a lengthwise top view of the assembly's sinusoidal shaped members.
FIG. 23D is a lengthwise top view of the assembly's support members.
FIG. 23E is a lengthwise top view of the sinusoidal shaped members and support members.

Sinusoidal shaped members having spatial frequency/wavelength that is not of a regular period along their length may connect to form an assembly. A damped oscillation is not a periodic function, and therefore a damped sinusoidal shaped member's spatial frequency is not uniform along its length. FIGS. 23A-E depict damped sinusoidal shaped members used to form a prismatic beam. FIG. 23B depicts a constituent damped sinusoidal shaped member unit. The beam is formed from three radially symmetric sub-assemblies. Each sub-assembly is composed of three damped sinusoidal members. FIG. 23C depicts the nine sinusoidal shaped members' orientation in assembly from above lengthwise. FIG. 23D depicts the support members in assembly from above lengthwise. FIGS. 23A and 23E depict the assembly in total. One of its twenty-two flexural regions/areas (f) is labeled.

A non-prismatic beam assembly composed of damped sinusoidal shaped members is depicted in FIGS. 23F-A. Each damped sinusoidal members in the assembly is formed from a tapered relaxed member. A constituent tapered and damped sinusoidal shaped member is shown in FIG. 23F. The sinusoidal shaped members in assembly are specifically depicted in FIG. 23G. The structure's sinusoidal members are polygonally organized but are not co-planar. The support members are specifically depicted in FIG. 23H. The design and location of its support members results in the assembly's damped period and non-prismatic shape. FIG. 23I depicts the tapered assembly in total and show its flexural regions (f) corresponding to a damped function.

Figure 23J:
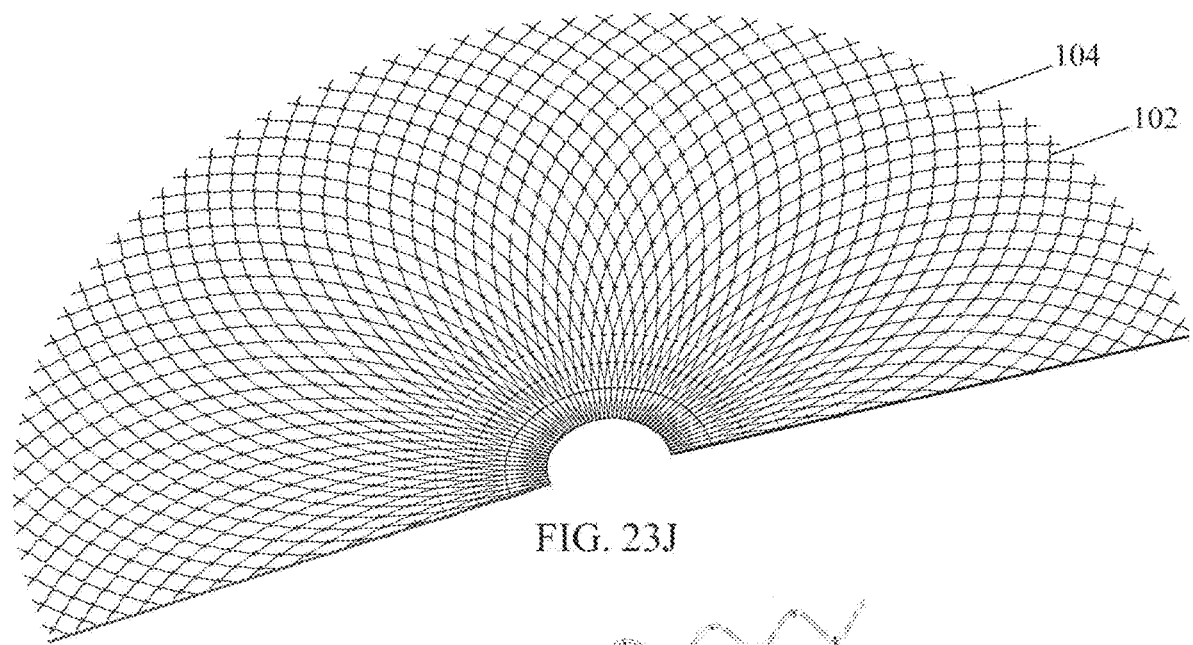
FIG. 23J is a perspective view of damped sinusoidal shaped members forming an assembly having a fan shape and planar geometry.
Figure 23K:
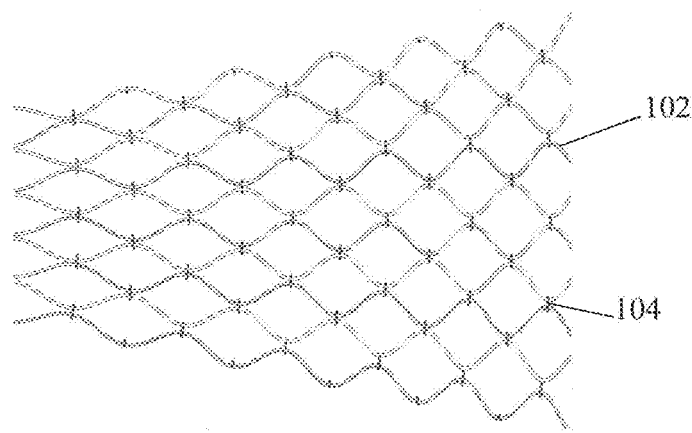
FIG. 23K is a line drawing of a fan shape planar geometry test specimen formed from damped sinusoidal shaped members and axial support members.

Damped sinusoidal shaped members forming exemplary pre-stressed planar assemblies are depicted in FIGS. 23J-K. In FIG. 23J a fan shaped structure's component sinusoids attach at their anti nodes. As the shape expands/spreads the sinusoids amplitude increases and 0 wavelength decreases. A variation on this pre-stressed fan shaped member orientation is depicted in a line drawing of a test specimen. The test specimen depicted in FIG. 23K has sinusoidal shaped members connected harmonically. Note: the harmonic sinusoids form connections at their nodes and anti-nodes.

Sinusoid Dimensions and Orientations

Figure 24A:
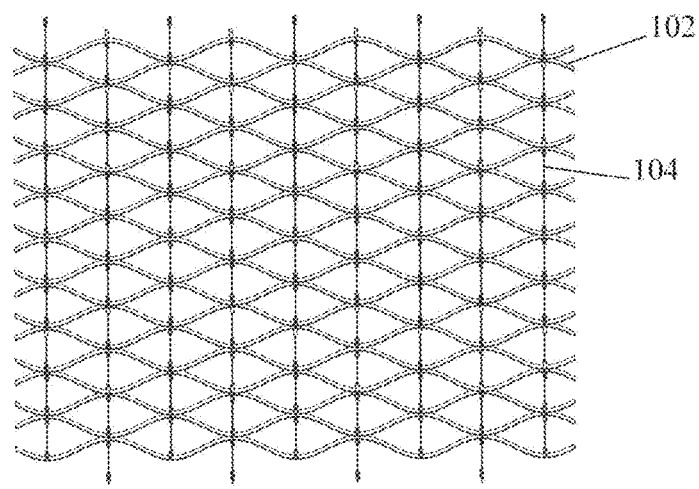
FIG. 24A is a perspective view of an assembly built from sinusoidal shaped members having depth (a rectangular cross section), oriented to form a plane.

Sinusoidal shaped members having differences in length-width-depth dimensions can be used to form assemblies. FIGS. 24A-E depict sinusoidal shaped member of various dimensions and orientations in assembly. FIG. 24A depicts sinusoidal shaped members (102) having rectangular cross-sections in a planar orientation. The sinusoidal shaped members are connected longitudinally at their anti-nodes (d) through support members (104). FIGS. 24B-C depicts sinusoidal shaped members (102) having rectangular cross-sections in a radially symmetric orientation connected longitudinally at their anti-nodes through support members (104). FIGS. 24D-E depicts sinusoidal shaped members (102) having rectangular cross-sections in an n-gon configuration connected longitudinally at their anti-nodes through support members (104). This assembly is made up of congruent regular polygon shapes and may form a 4-gon tessellation. The sinusoidal shaped members in this columnar lattice assembly maintain their pre-stressed state through ring-shaped support members (104). The 4-gon sub-assemblies that can be seen as composing the lattice are congruent and share sinusoidal members.

Figure 25A:
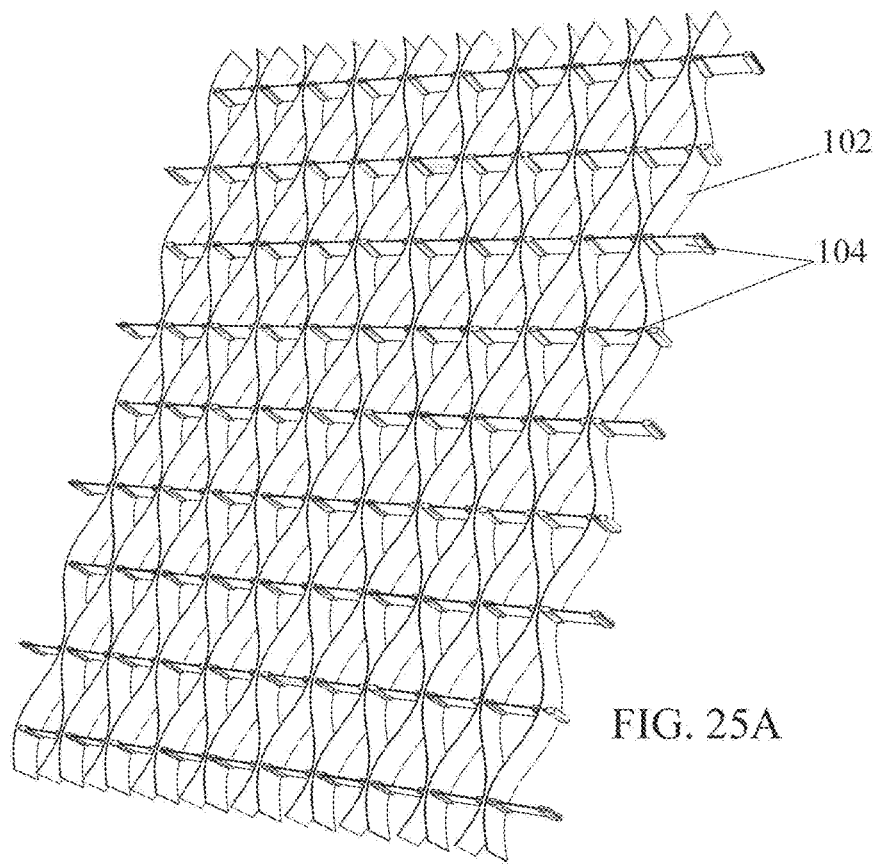
FIG. 25A is a perspective view of a planar assembly formed from sinusoidal shaped members having depth and a rectangular cross section.
Figure 25B:
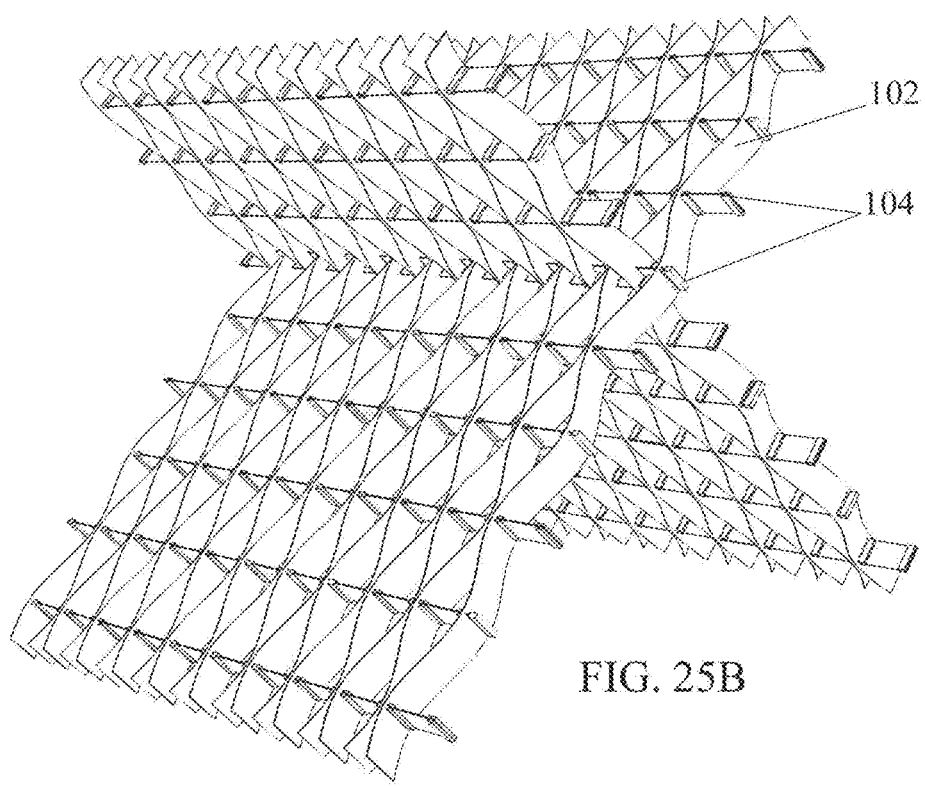
FIG. 25B is a perspective view of planes formed from sinusoidal shaped members having axes intersecting in assembly forming geometric lattices.

Sinusoidal shaped members and support members can be oriented across multiple axes within a pre-stressed assembly. FIGS. 25A-B depict pre-stressed sinusoidal shaped members (102) having a rectangular cross-section being connected through support members (104). FIGS. 25A and 24A depict a sinusoidal assembly in the form of a plane. Flexural regions (f) punctuate the assemblies. FIG. 25B depicts two planes intersecting at 90 degrees. The planes' axes intersect as a "woven" assembly. A plurality of interconnected planar assemblies may form a lattice with flexural properties.

Figure 26A:
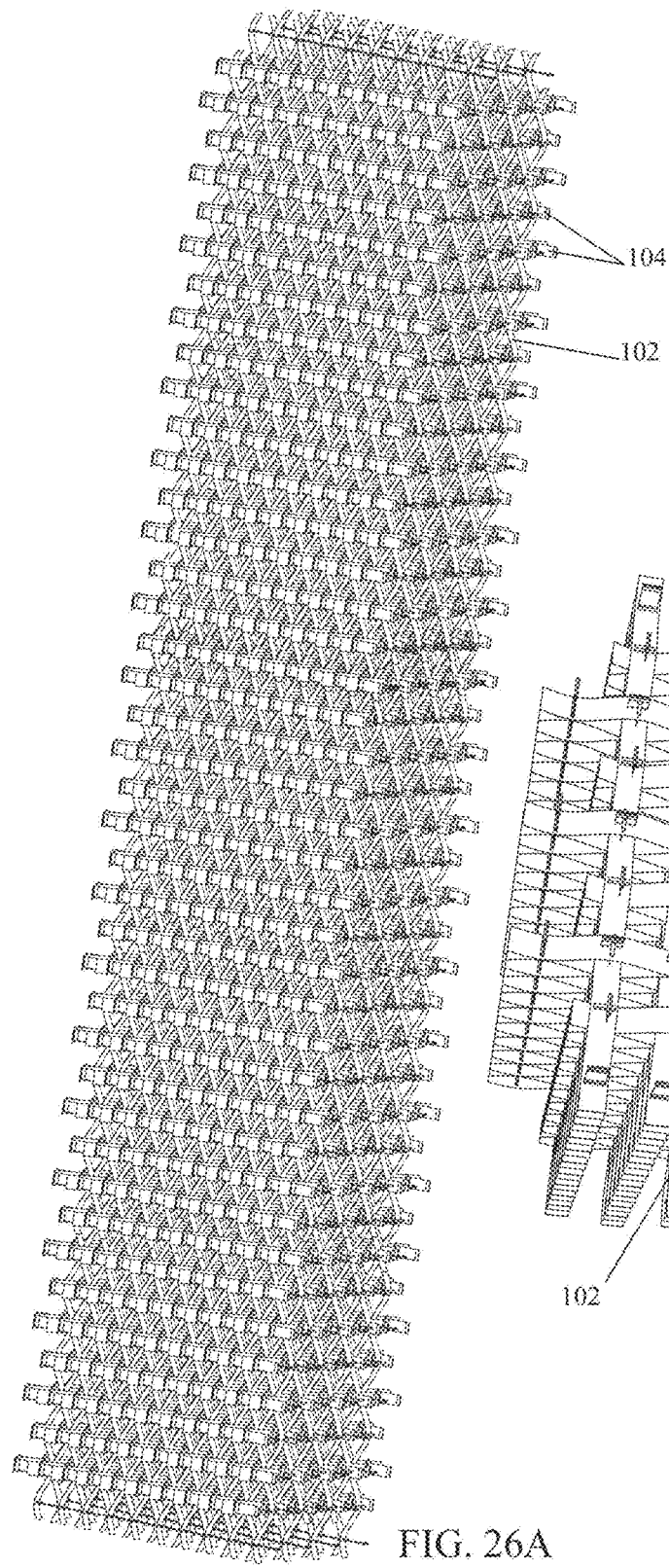
FIG. 26A is a perspective view of a lattice structure having a large number of multi axis flexural regions giving the assembly high performance flexural elastic properties.
Figure 26B:
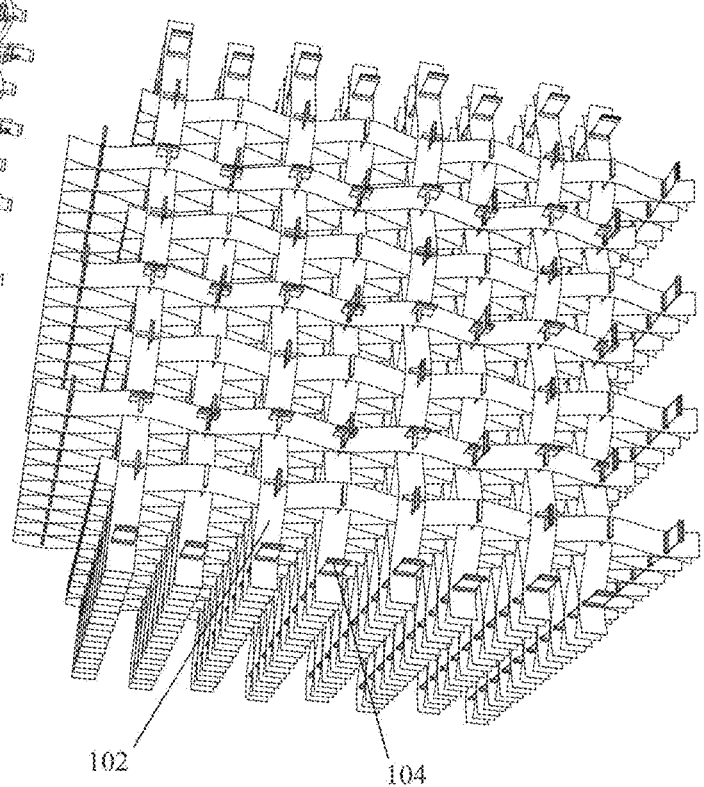
FIG. 26B is perspective view cross-section detail.

FIGS. 26A-B depict a woven lattice as an exemplary flexural structural beam that is illustrative of the principles of the invention. The beam's flexural lattice embodies the invention's anisotropic structural properties. The large number of flexural regions within the beam would give it extraordinary flexural strength. For example, pre-stressed composite or alloy material sinusoidal shaped members in a lattice assembly may function as "tissue" tendons. Tendons stretch and then recoil during locomotion, storing and returning elastic strain energy; dense sinusoidal lattice structures may serve a similar energy saving function when applied as a locomotive mechanism that loses and regains kinetic energy.

Applications

The present invention demonstrates the applicability of pre-stressed sinusoidal shaped members to form engineering design projects for structural and mechanical applications. Exemplary assemblies for functional applications are presented herein. The engineering design process is used to produce an assembly that meets the specific application's requirements.

Figure 27A:
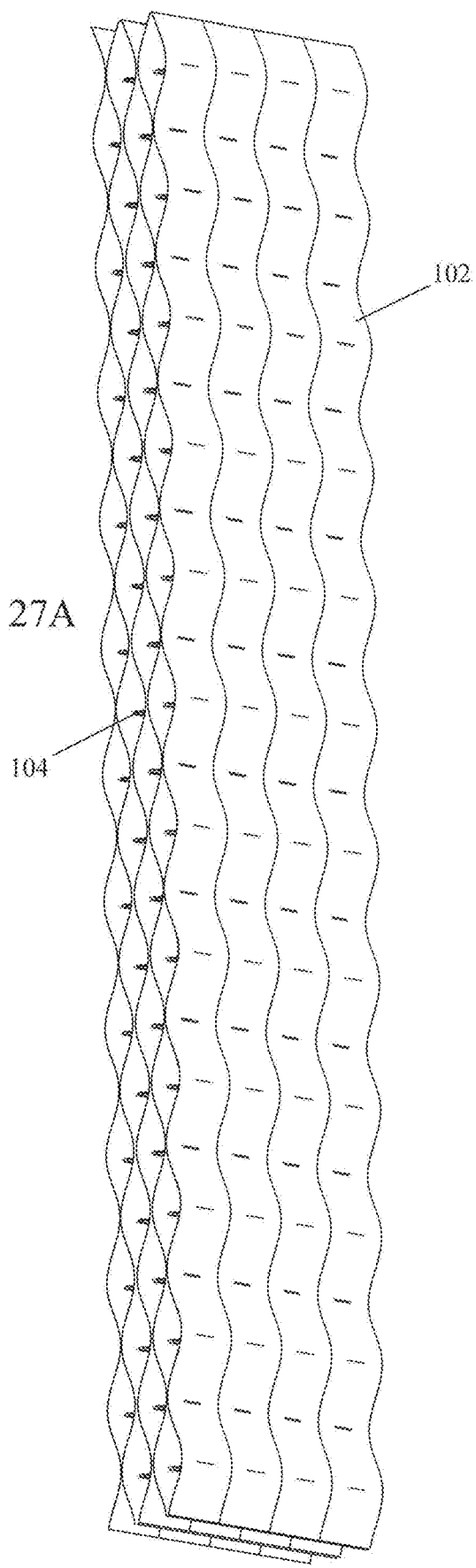
FIG. 27A is a perspective view of an assembly having specific degrees of freedom as un-deflected.
Figure 27B:
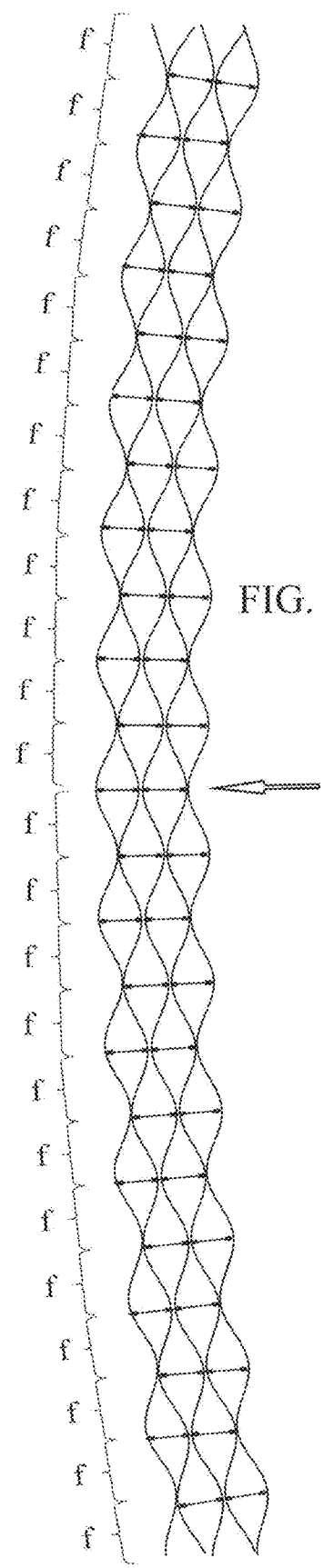
FIG. 27B is a orthogonal view of an assembly having specific degrees of freedom as deflected.

This method of pre-stressing material may be used to form assemblies having flexural properties and specific degrees of freedom. FIGS. 27A-B depict a sinusoidal beam assembly having compliant directions that permit specified motions and prevent motion in all other directions. FIG. 27B depicts the assembly in side view from above being deflected by a force. The beam's deflection is an accumulative deflection manifested through the plurality of flexural regions (f). The greater the number of flexural regions per unit length, the smoother the deflection curve.

A flexure is a flexible element or combination of elements engineered to be compliant in specific degrees of freedom. A flexure can be a part of a sinusoidal shaped member or the assembly it composes.

Compliant mechanisms are flexible structures that utilize elastic deformation to achieve their desired motions. A compliant mechanism's flexural behavior can come from the deflection of its constituent flexural members and in turn the flexure elements that compose them. Compliant mechanisms built using this invention can be formed from sinusoidal flexure members composed of contiguous flexure elements. These parts go to form a flexure system. The flexure system's members and the elements that compose them have flexural properties.

Figure 28A:
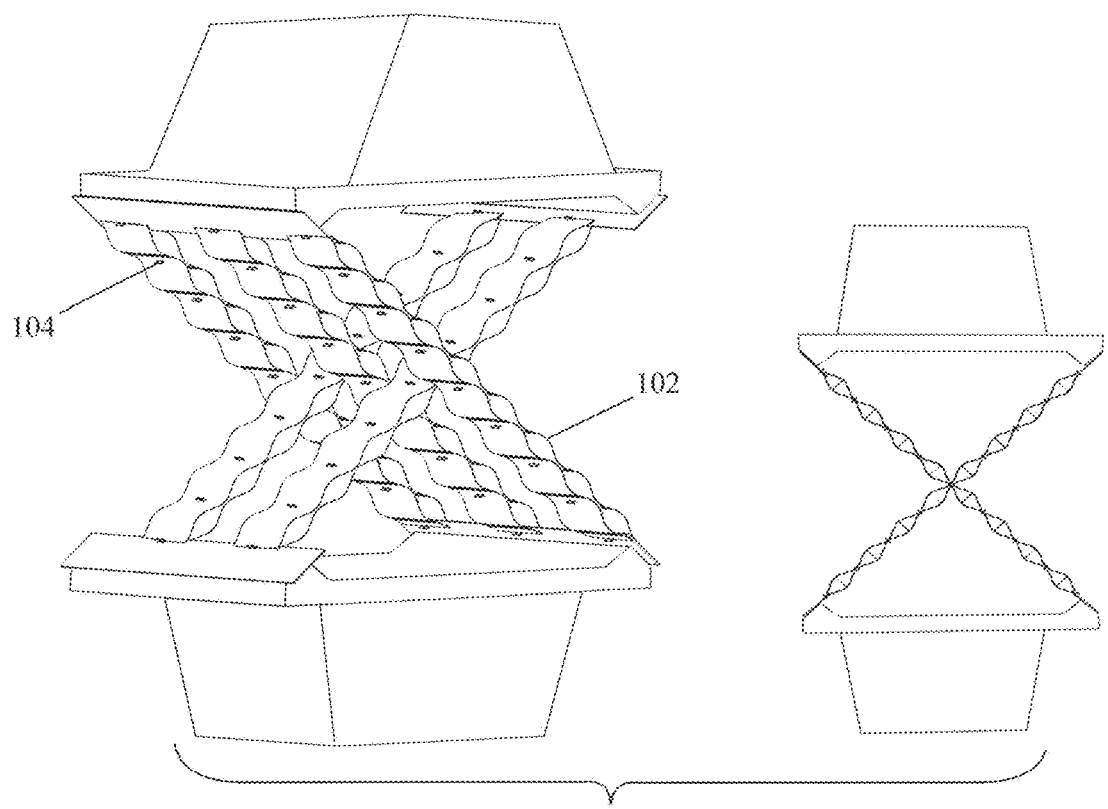
FIG. 28A is a perspective and side view of a flexure system in assembly built from a number of pre-stressed sinusoidal shaped members.
Figure 28B:
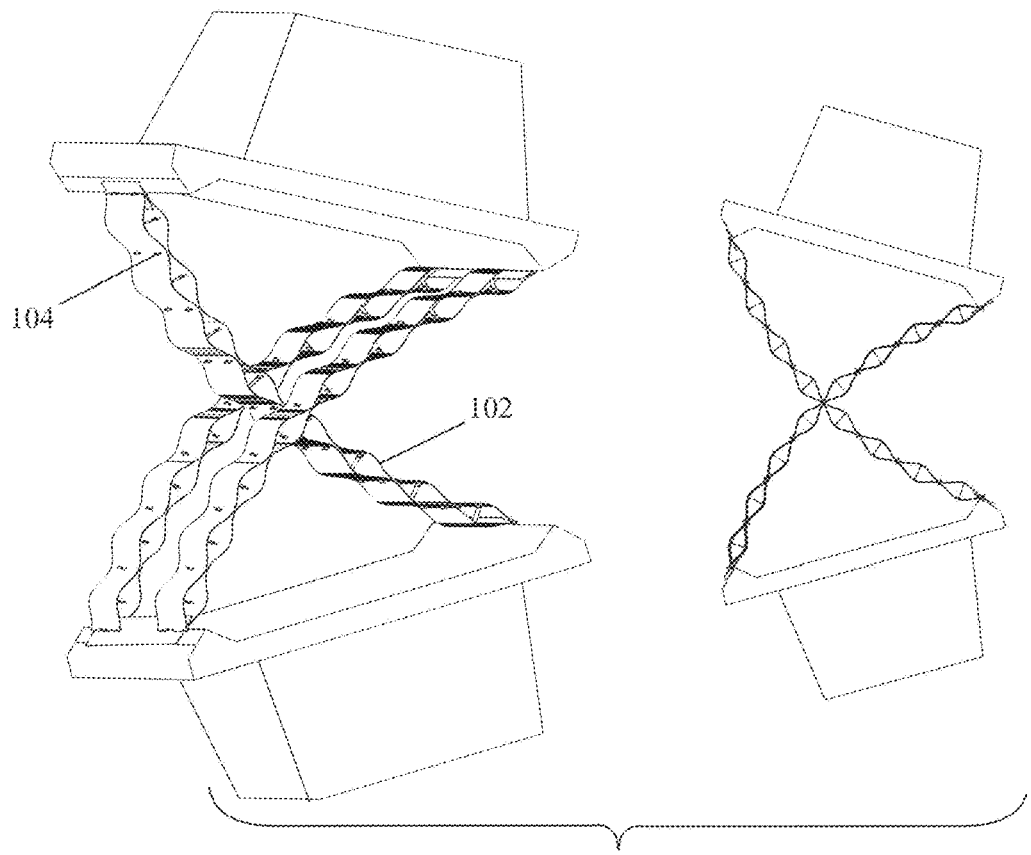
FIG. 28B is a perspective and side view of a flexure system being articulated.

FIGS. 28A-B depict cross-axis flexural pivots built from pre-stressed sinusoidal shaped member flexures. Several of these flexure joints could constitute a mechanism. The pre-stressed members' dimensionality and sinusoidal geometry may help to improve a flexure pivot's support stiffness which is generally greatly reduced during large deflections. Flexure pivots may be used efficiently as precision machine elements due to their excellent resolution characteristics, low-cost characteristics, and ease with which they may be fabricated. Because of the strain energy associated with the bending of the flexible members, compliant mechanisms often have higher actuation effort compared to traditional mechanisms. Static balancing is one way of reducing this actuation energy. The pre-stressing/static balancing of flexures through the use of the system's sinusoidal shaped members may reduce a compliant mechanism's actuation energy.

Figure 29A:
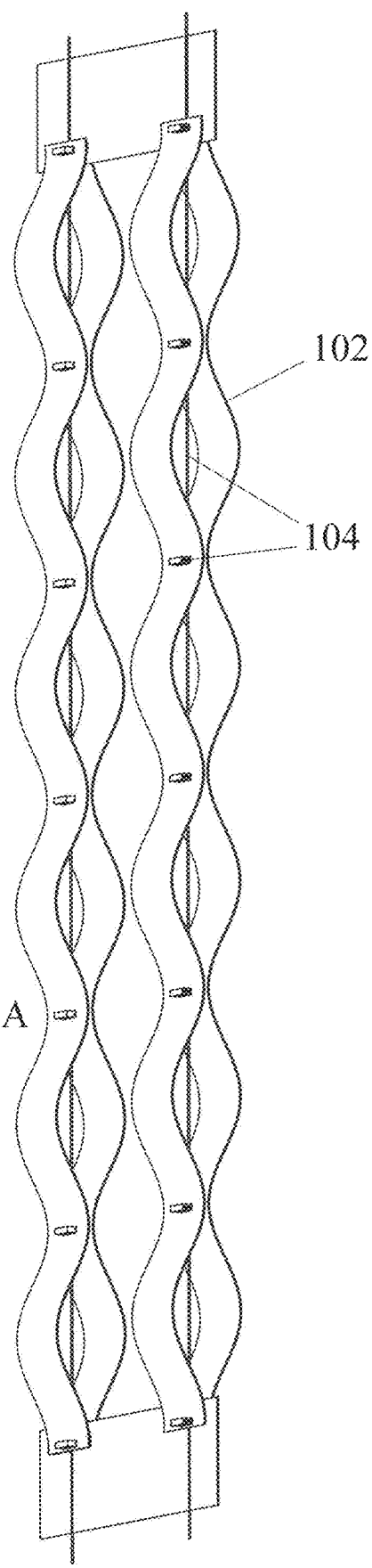
FIG. 29A is a perspective view of pre-stressed flexures formed from four sinusoidal shaped members having a rectangular cross-section held in assembly by axial and strut support members.
Figure 29B:
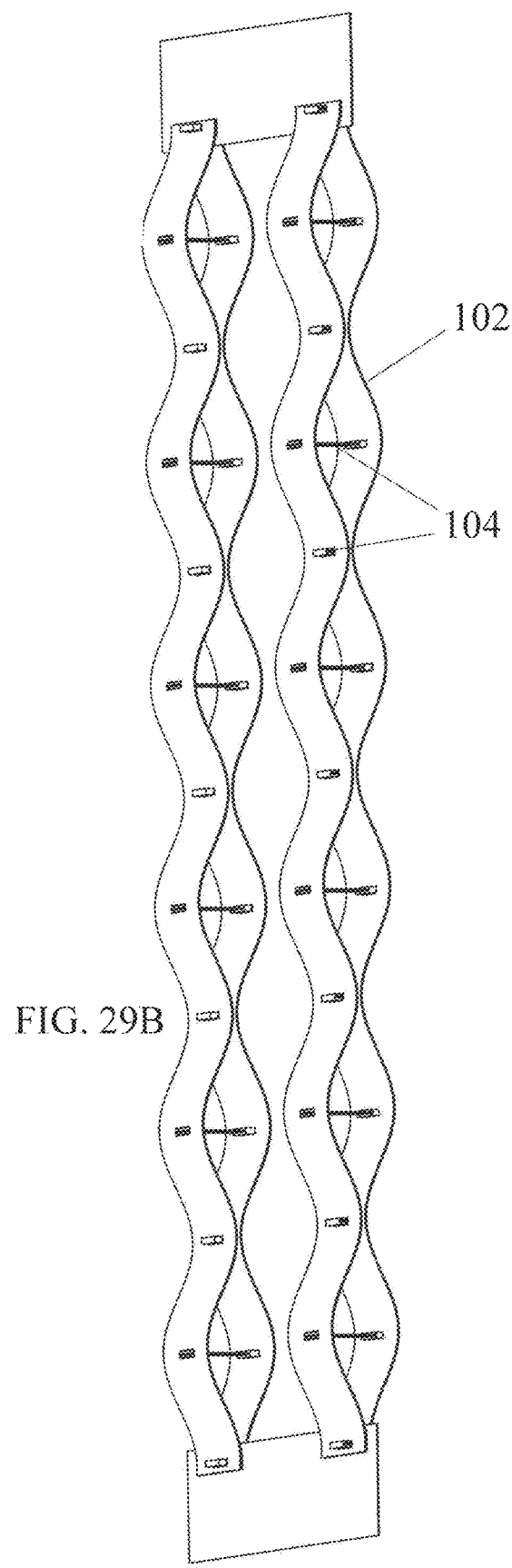
FIG. 29B is a perspective view of pre-stressed flexures formed from four sinusoidal shaped members having a rectangular cross-section held in assembly by strut support members.

The flexure depicted in FIG. 29A uses axial support members (104) and strut support members (104) to maintain its sinusoidal shaped members' pre-stressed state. The flexure depicted in FIG. 29B uses strut support members to maintain its sinusoidal shaped members' (102) pre-stressed state. These assemblies can be seen as series flexures. A flexure composed of a series of flexural regions (f) may have advantages over other types of flexure designs. Factors that determine a mechanism's flexibility (and thus, its range of motion) are: the type of support members used, material type (its elastic properties and strength), boundary conditions (how it is attached to whatever needs movement), and its geometry (thickness and length for rectangular cross sections). The sinusoidal shaped member's cross-sectional geometry and the sinusoids wave parameters are both considered the flexure's geometry.

Figure 30A:
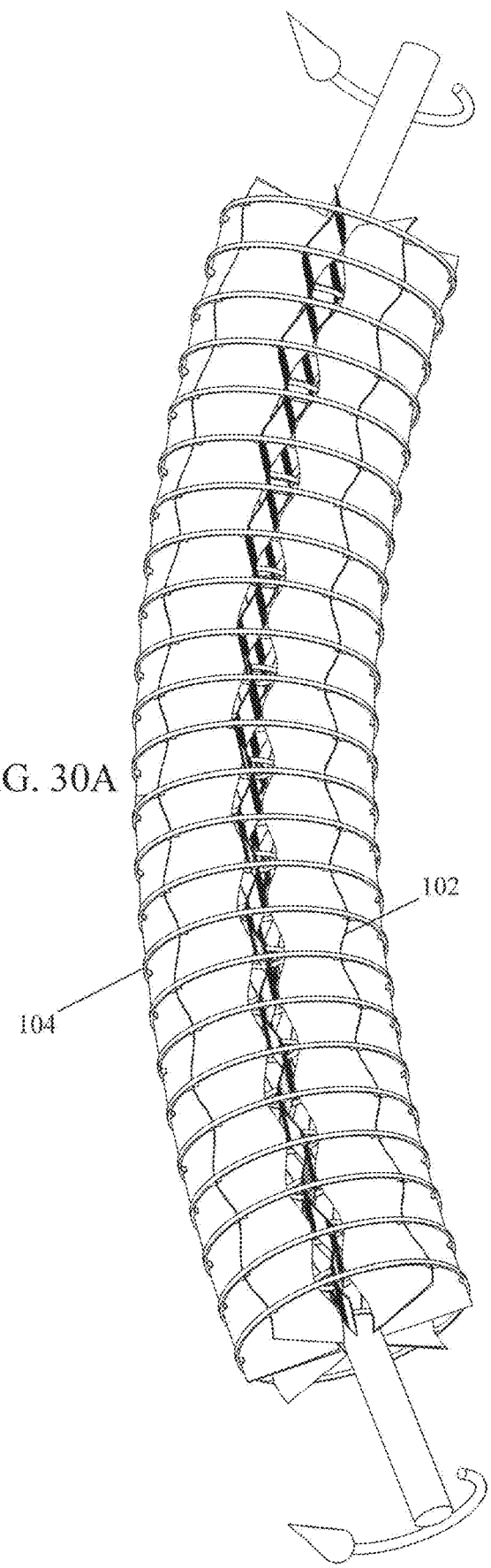
FIG. 30A is a perspective view depicting a sinusoidal structure as a flexure coupler that is being articulated.
Figure 30B:
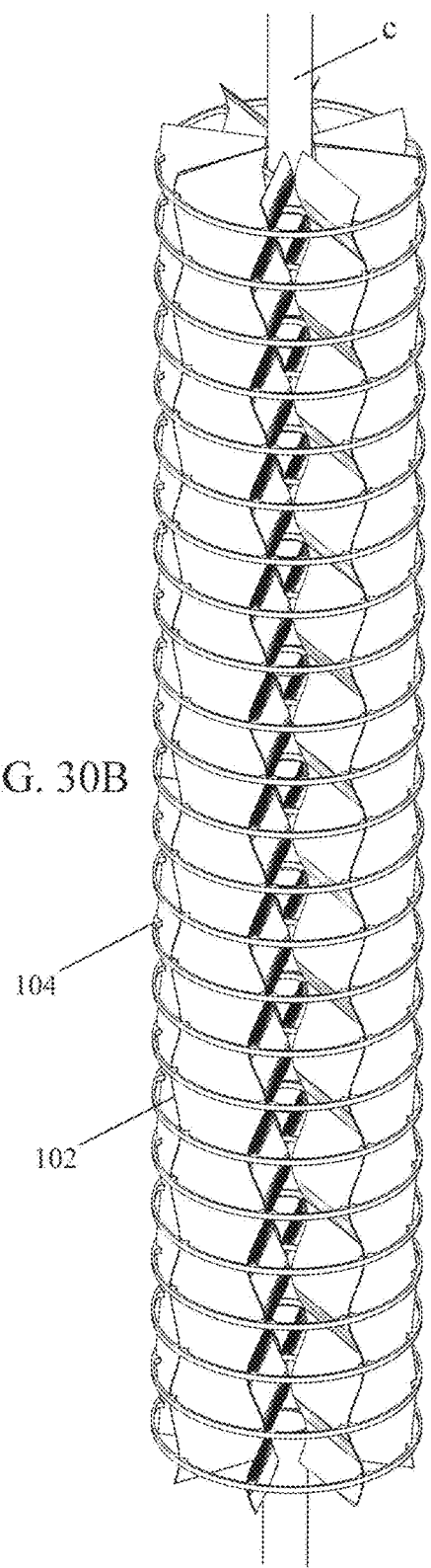
FIG. 30B is a perspective view depicting a sinusoidal structure as a flexure coupler in its relaxed state.

Flexure systems are important to precision motion and positioning applications used within precision motion stages. A flexure system is a flexural system composed of many flexures that transmit loads by way of a material's basic stress states of compression, shear and tensile stress. FIGS. 30A-B depict a lightweight flexure coupler. This system of pre-stressing composite and/or alloy material assemblies may be used to form exemplary flexure mechanism components. Their pre-stressed state and compliance characteristics may provide exceptionally smooth precision motion characteristics.

Figures 31A, 31B:
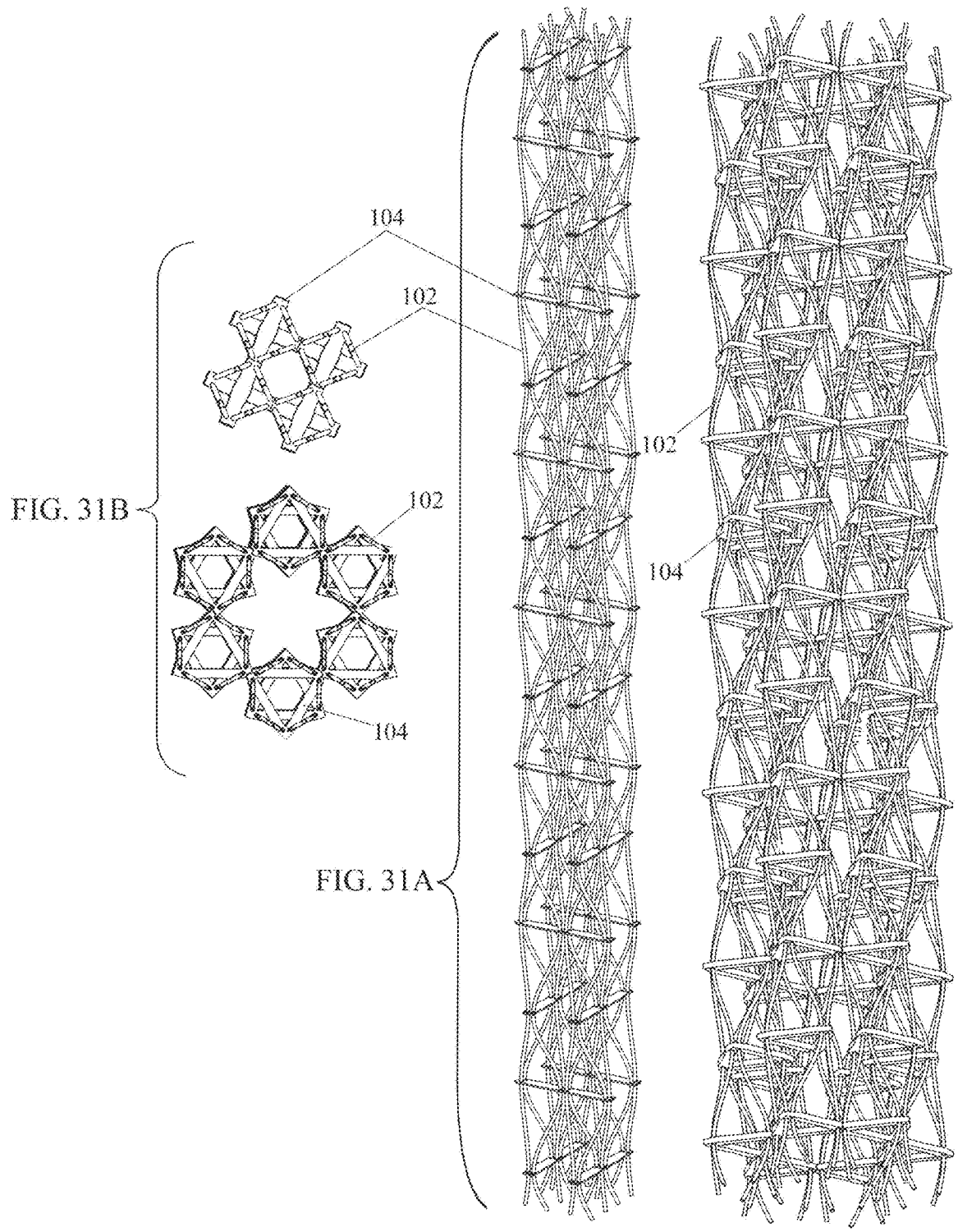
FIG. 31A depicts perspective views of exemplary pre-stressed lattice structures that may be used to reinforce a solid material.

Pre-stressed lattice structures may function to reinforce and/or pre-stress concrete beams or other solid material shapes. FIGS. 31A-B depict specifically engineered sinusoidal lattice assemblies having pre-determined structural and behavioral properties tailored to reinforcing and/or pre-stressing a concrete beam. A pre-stressed sinusoidal assembly encased in a solid material beam/shape may affect that beam's oscillatory characteristics and natural frequency.

Figure 32A:
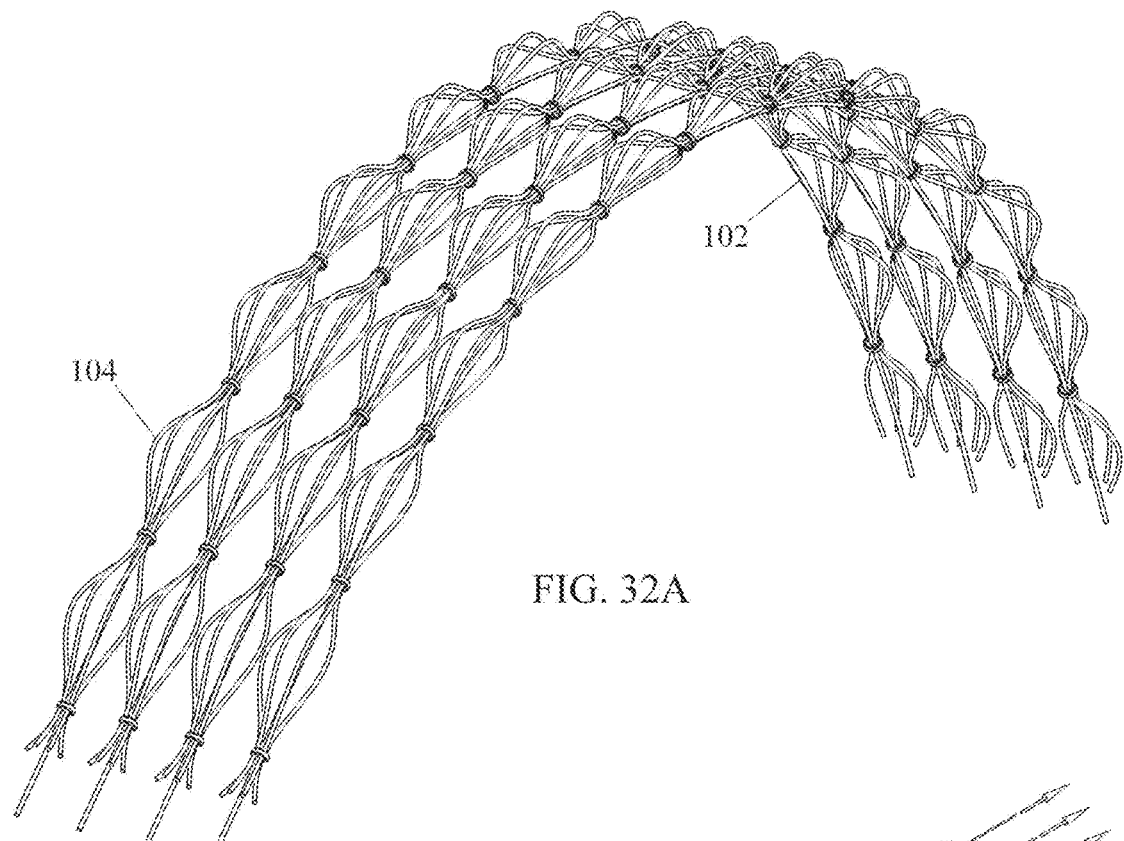
Figure 32B:
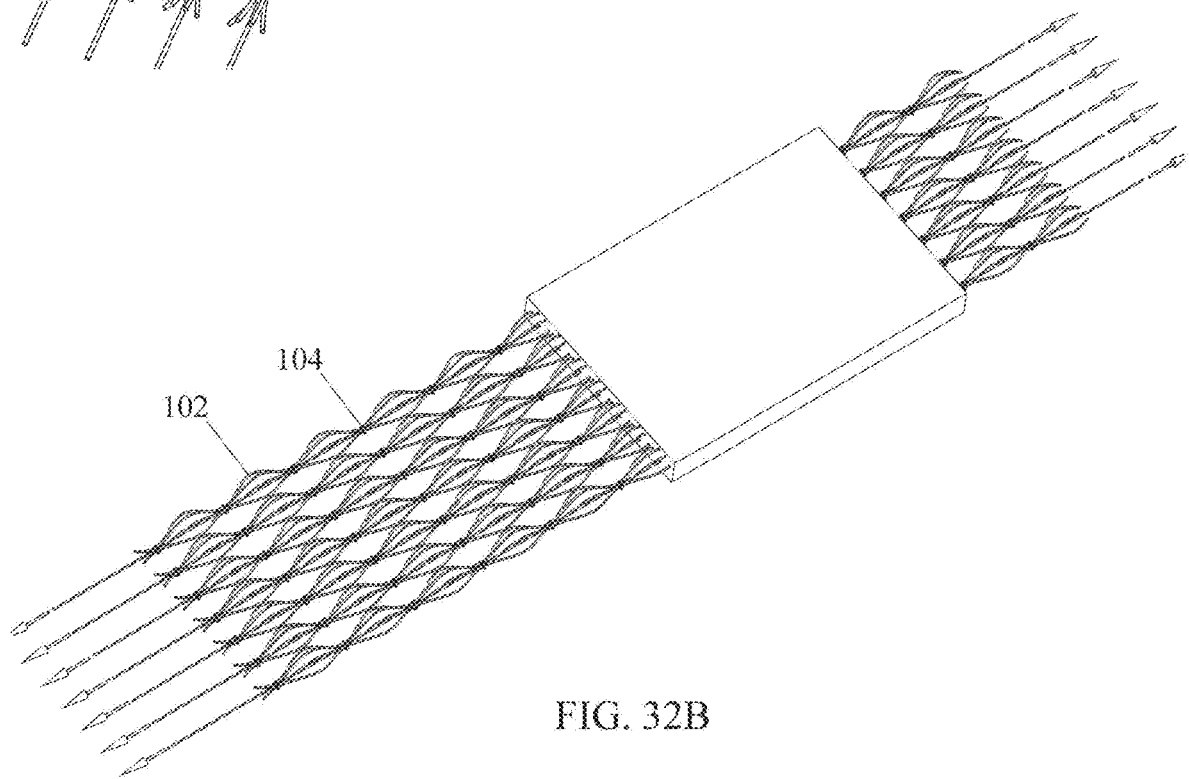

A pre-stressed assembly may be engineered to deflect in a predetermined way. This is achieved by determining the required pre-stressing force distribution characteristics within the assembly. A sinusoidal assembly's deflection may be used to enhance the effect of the pre-stressing forces imposed on the concrete member it is encased in. As depicted in FIGS. 32A-B a number of axial support members (104) may be placed under tension to normalize the assembly's deflection prior to be being encased in concrete. The tension placed on the axial support members is then released. This allows the residual deflection of the pre-stressed concrete member to respond to external loads.

Pre-stressed lattice structures encased in a solid may not exhibit deflection or be directionally compliant. FIG. 33A depicts a pre-stressed un-deflected planar structure formed from interconnected 12-gon sub-assemblies engineered to reinforce a material slab on grade.

The assembly's pre-stressing forces are evenly distributed and the assembly's centroid axis and neutral axes (c) are congruent and the structure is not deflected.

Pre-stressed lattice structures having flexural properties may also function as stand-alone structural components used to build larger structural systems for applications on earth and in space. Such applications could include terrestrial bridges, towers and buildings to expansive deployable structures in water and in space.

Sinusoidal shaped members in assembly may form structures having a variety of three-dimensional shapes. These shaped structures may be connected to form more complex assemblies having tertiary and quaternary structure.

One method of forming assemblies having a predetermined three dimensional shape is through modulating the distribution of the structure's potential energy/pre-stressing energy during the assembly process. If that potential energy is not evenly distributed across the assembly's cross-sectional shape, the centroid axis and the neutral axis are incongruent and the assembly will take on a deflected secondary shape. FIGS. 33B-C depict assemblies having a secondary three dimensional structure that mirrors their stress profile. Their curved shape results from their sinusoidal shaped members being given different amounts of stored potential energy during assembly. In FIG. 33B the sinusoidal members having the greatest potential energy are shaded.

The increased potential energy and longer wavelength of the shaded member in assembly causes the structure to curve. By designing a sinusoidal structure composed of interconnected sinusoidal shaped members having specific wave properties, the structures could be designed to follow specific irregular three dimensional trajectory paths, as depicted in FIG. 33C.

Figure 34A:
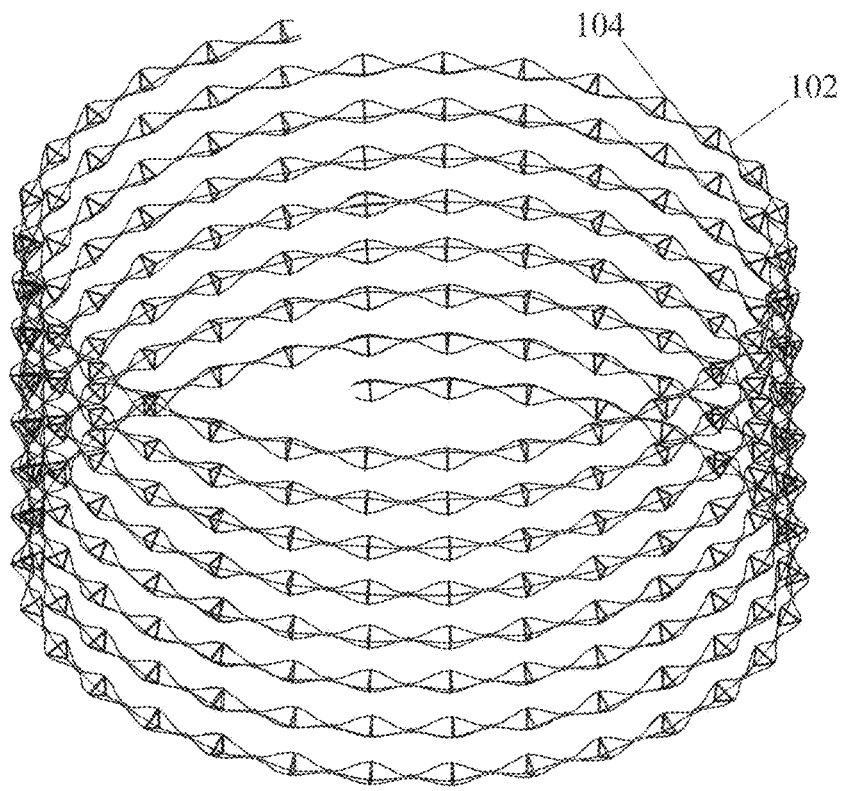
Figure 34B:
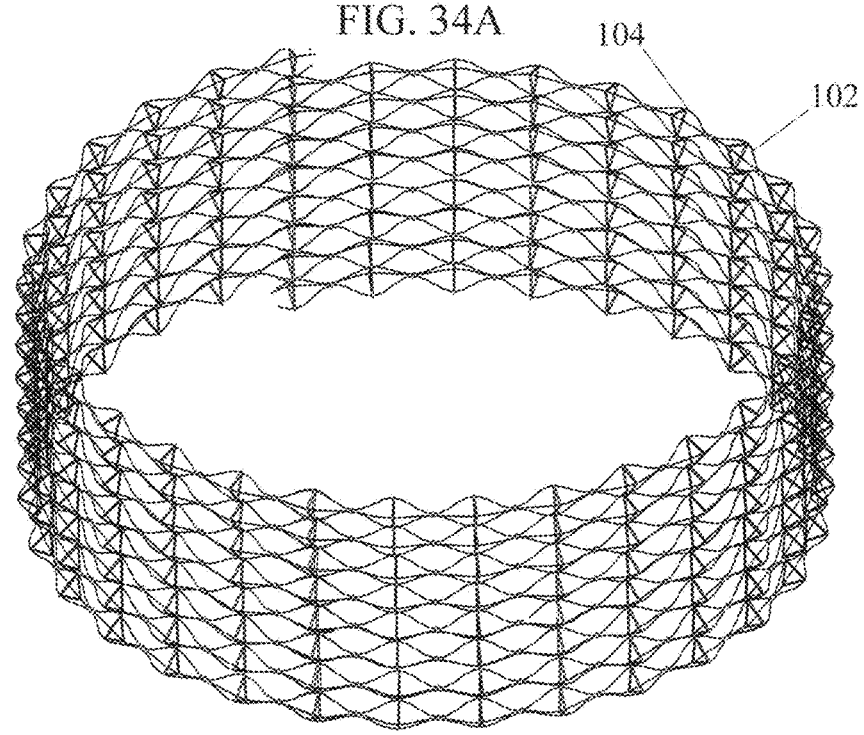
Figure 34C:
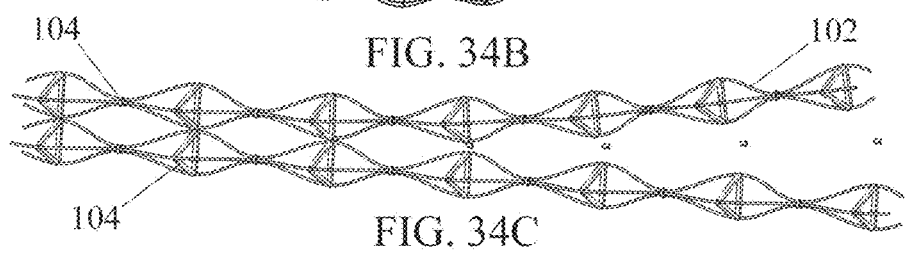

An assembly could also follow a predefined geometrical path as depicted in FIGS. 34A-C. FIGS. 34A-C and FIGS. 8C-D both depict assemblies composed of three sinusoidal shaped members having radially symmetric organization; they differ in that FIG. 34A-C is formed to follow a path. FIG. 34A depicts a sinusoidal assembly that follows a curved helical path.

In FIG. 34B the spirals of the helical path are attached to form a tube. The attachment of the helix's adjacent spirals is depicted in FIG. 34C where turns of the helix are "zippering" together to form a hollow tube. The attachment of the sinusoidal assembly's helical spirals may use a locking mechanism/method that allows for their reversible attachment. Such locking methods may also be used to attach sub-assemblies to one another and also be used to attach sinusoidal shaped members to one another through the support members. The locking mechanism(s) may involve a part of the sinusoidal shaped member and/or part of the support member and may require complimentary parts like clips, pins or adhesives.

Assemblies having a secondary structure may be seen as sub-assemblies (a shape) that can interconnect to form tertiary and quaternary structures.

Figure 35B:
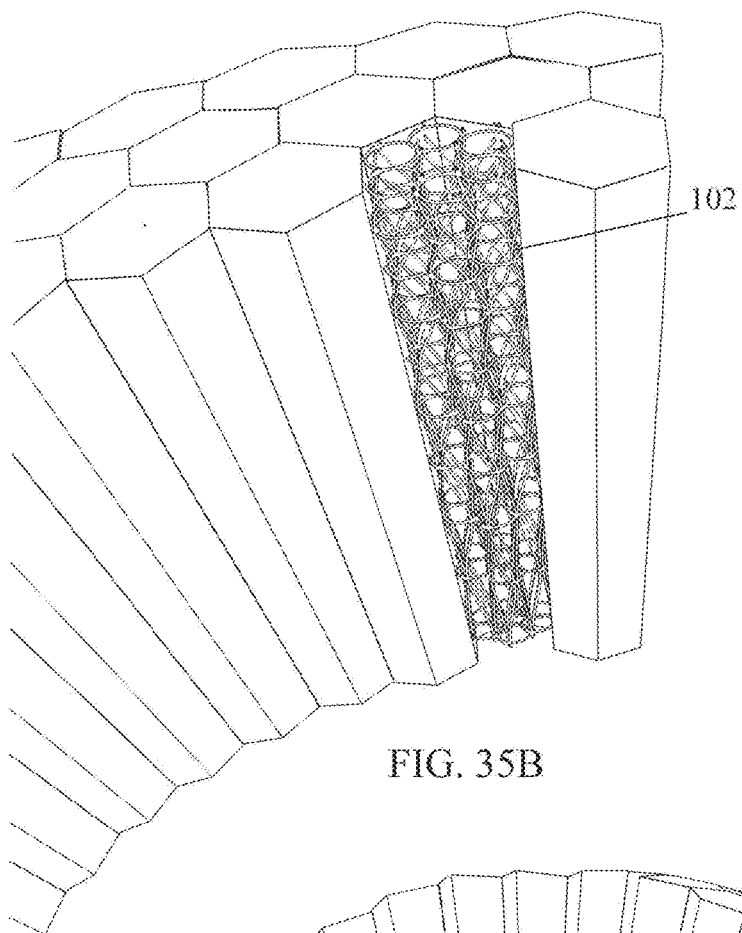
Figure 35A:
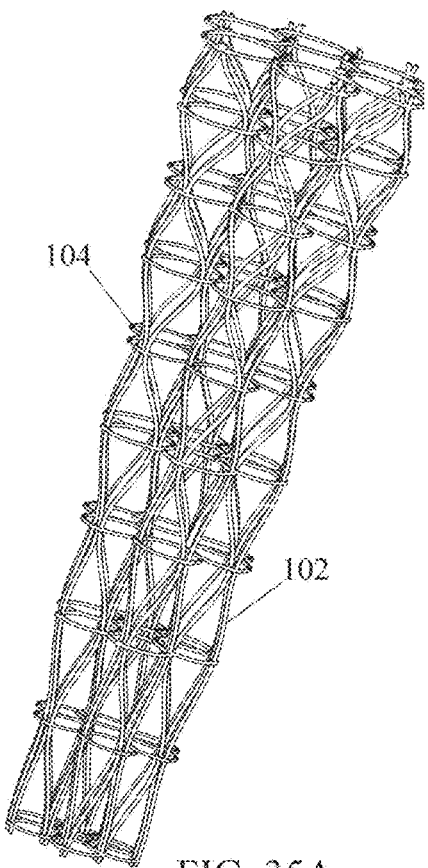
Figure 35C:
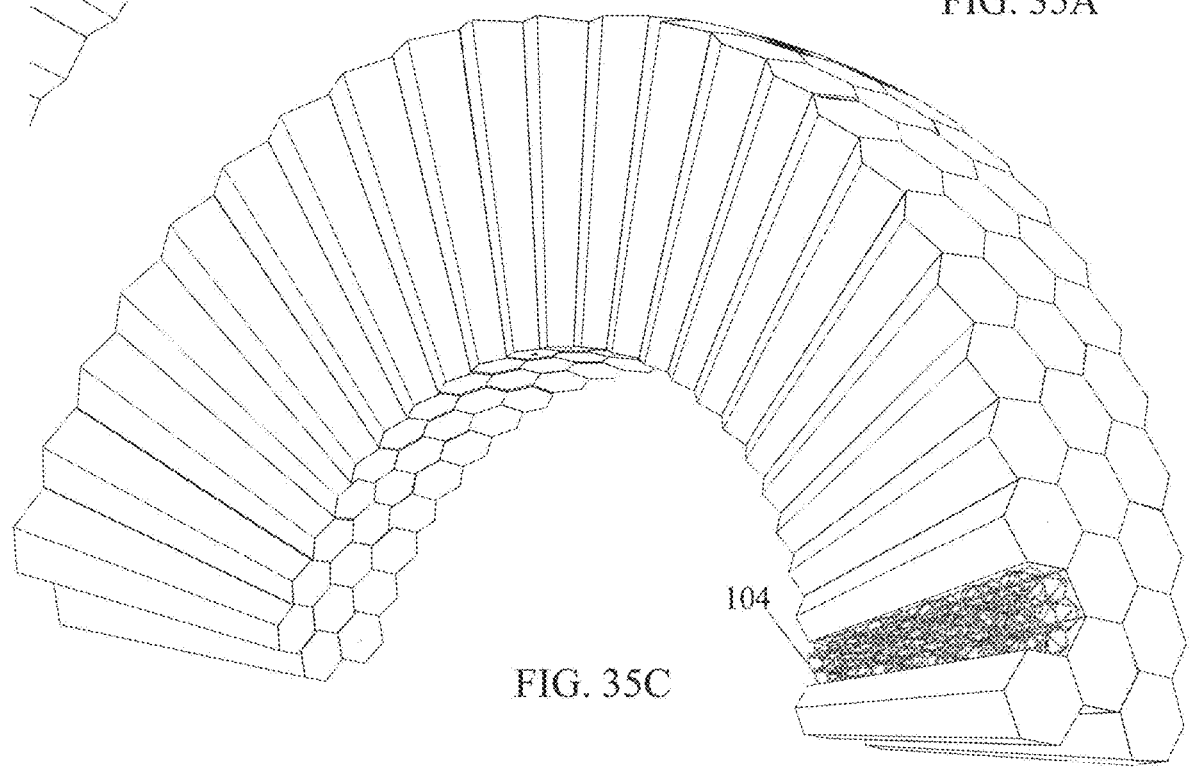

Sinusoidal shaped members displaying amplitude characteristics that vary along their length may form sub-assemblies that can interconnect to form curved three-dimensional surfaces and shapes. FIGS. 35A-C depicts non-prismatic sub-assemblies (tapered building blocks) interconnecting to form a curved surface. This surface could function to form a pre-stressed dome structure or a variety of predetermined modeled surfaces. FIG. 35A depicts a tapered non-prismatic sinusoidal sub-assembly. FIG. 35B shows the fundamental tapered 6-gon shape of said sub-assemblies. FIG. 35C depicts the tapered shapes assembled.

By analogy, observed wave behavior as found in nature can be applied to the invention and its use of three-dimensional physical waves. For example, when a particle is moved from its original position (e.g. by an excitation) a restoring force then acts on it. This force can be calculated by the Hooke's law and acts in the direction of the original position. This leads to a propagation of energy through the medium. Because the particles in matter are linked to each other, the displacement of one particle leads to a displacement of its surrounding particles. Transverse and longitudinal waves are types of elastic waves that need a propagation medium. Similarly, a three-dimensional physical wave shaped from linked partials of matter comprising a material having elastic properties can become a vehicle of energy storage and transfer. The principles of superposition, destructive and constructive interference can all be applied to the interaction/interference that takes place among prestressed energy rich sinusoidal shaped members in an assembly. The support members serve as the conduit that allows the members' internal forces to entangle and reach a static equilibrium within the assembly. The more even the distribution of internal forces within the assembly, the less deflection present in the greater structure.

As an overview, the parts and identifying characteristics of the system are presented in FIGS. 36A-E. FIGS. 36A-C depict an exemplary support member, relaxed member and sinusoidal shaped member respectively. FIG. 36D depicts a single sinusoidal shaped member with its associated support members. FIG. 36E depicts the assembly in total. The parts and characteristics listed below are labeled in the FIGS.

Material Parts
- (100) Relaxed member: Relaxed member variants have dimensions and are composed of elastic material.
- (102) Sinusoidal shaped member: Sinusoidal shaped member variants are flexural members having different wave parameters and dimensions.
- (104) Support member: Support member variants may be but are not limited to axial support members, ring support members, n-gon support members, inflatable support members and strut support members.

Definitions of Sinusoid Characteristics (a) Spatial frequency: Spatial frequency is the characteristic of any structure that is periodic across a position in space.
(b) Sinusoidal axis: The Sinusoidal axis is the sinusoidal shaped member's neutral axis.
(c) Assembly axis: The Assembly's axis is the assembly's neutral axis.
(d) Distal Anti-node: Distal Anti-nodes are located on the assembly's periphery.
(d*) Proximal Anti-node: Proximal Anti-nodes are located central to the assembly.
(e) Node: Nodes are points on the sinusoidal shaped member that follow its neutral axis.
(f) Flexural regions: Flexural regions are located between support members.

While preferred embodiments of the invention are disclosed herein, many other implementations will occur to one of ordinary skill in the art and are all within the scope of the invention. Each of the various embodiments described above may be combined with other described embodiments in order to provide multiple features. Furthermore, while the foregoing describes a number of separate embodiments of the apparatus and method of the present invention, what has been described herein is merely illustrative of the application of the principles of the present invention. Other arrangements, methods, modifications, and substitutions by one of ordinary skill in the art are therefore also considered to be within the scope of the present invention, which is not to be limited except by the claims.

What is claimed:

1. A flexure for structural and mechanical applications having an assembly axis comprising at least two prestressed sinusoidal members with residual tension and compression along a length of each of said at least two prestressed sinusoidal members and formed of an elastic material comprising a metal matrix composite or an alloy that allows for reversible deformation without compromising a strength of said at least two prestressed sinusoidal members, each of said at least two prestressed sinusoidal members supported by a first support member at a distal antinode and connected together longitudinally at a proximal antinode by a locking mechanism on a second support member, holding the at least two prestressed sinusoidal members in tension and compression.

2. The flexure of claim 1 wherein the alloy is a shape memory alloy, super alloy or high entropy alloy.

3. The flexure of claim 1 wherein each of said sinusoidal members is formed from a discrete, straight, relaxed linear member.

4. The flexure of claim 3 wherein the discrete, straight, relaxed linear member has prismatic or non-prismatic geometry.

5. The flexure of claim 4 wherein the prismatic or non-prismatic geometry of the discrete, straight, relaxed linear member or an elastic property varies along a length, a width or a depth of the discrete, straight, relaxed linear member.

6. The flexure of claim 1 wherein the first support member is under compressive force or the second support member is under a tensile force.

7. The flexure of claim 6 wherein the first support member under the compressive force is a ring, n-gon, linear strut or inflatable member.

8. The flexure of claim 6 wherein the second support member under the tensile force is an axial member under a tension.

9. The flexure of claim 8 wherein each of the at least two prestressed sinusoidal members are fixed to the axial member at ends of the at least two prestressed sinusoidal members such that the tensile force is evenly distributed along a length of the at least two prestressed sinusoidal members.

10. The flexure of claim 8 wherein the axial member is periodically attached to the at least two prestressed sinusoidal members at an antinode.

11. The flexure of claim 1 wherein the first support member is under a compressive force and a plurality of first support members are spaced apart at a spatial frequency that corresponds to a wavelength of said at least two prestressed sinusoidal members.

12. A flexure for structural and mechanical applications having an assembly axis comprising at least two prestressed sinusoidal members with residual tension and compression along a length of each of said at least two prestressed sinusoidal members and formed of an hyperelastic material that allows for reversible deformation without dissipation of energy, being disassemblable and reassemblable into said flexure, each of said at least two prestressed sinusoidal members supported by a first support member at a distal antinode and connected together longitudinally at a proximal antinode by a flexural locking mechanism on a second support member.

13. The flexure of claim 12 wherein each of said at least two prestressed sinusoidal members is formed from a discrete, straight, relaxed linear member.

14. The flexure of claim 12 wherein the at least two prestressed sinusoidal members have a same wavelength and phase.

15. The flexure of claim 14 wherein the at least two prestressed sinusoidal members have a same amplitude.

16. The flexure of claim 12 wherein the at least two prestressed sinusoidal members have a different wavelength, amplitude or phase.

17. The flexure of claim 12 wherein an internal force is evenly distributed and corresponds to a center of mass/centroid axis of the flexure such that the flexure is an un-deflected structure.

18. The flexure of claim 12 wherein an internal force is unevenly distributed and falls outside center of mass/centroid axis of the flexure such the flexure is deflected.

19. A planar, radial or polygonal flexural assembly formed from two or more flexures of claim 12 connected at antinodes of the at least two prestressed sinusoidal members.

* * * * *